(12) United States Patent
Bhogal et al.

(10) Patent No.: US 11,300,457 B2
(45) Date of Patent: Apr. 12, 2022

(54) TEMPERATURE PROBE HUBS

(71) Applicant: Weber-Stephen Products LLC, Palatine, IL (US)

(72) Inventors: Nikhil Bhogal, San Francisco, CA (US); Mathias Schmidt, Emeryville, CA (US); Kevin Glennon, Hoffman Estates, IL (US); Angela Schilt, Mundelein, IL (US); Jose Martinez, Franklin Park, IL (US); Nicholas Edward Beyrer, San Francisco, CA (US)

(73) Assignee: WEBER-STEPHEN PRODUCTS LLC, Palatine, IL (US)

( * ) Notice: Subject to any disclaimer, the term of this patent is extended or adjusted under 35 U.S.C. 154(b) by 276 days.

(21) Appl. No.: 16/696,739

(22) Filed: Nov. 26, 2019

(65) Prior Publication Data

US 2020/0408606 A1 Dec. 31, 2020

Related U.S. Application Data

(60) Provisional application No. 62/868,625, filed on Jun. 28, 2019.

(51) Int. Cl.
*G01K 5/34* (2006.01)
*G01K 13/02* (2021.01)
(Continued)

(52) U.S. Cl.
CPC .............. *G01K 5/34* (2013.01); *G01K 1/024* (2013.01); *G01K 1/026* (2013.01); *G01K 1/028* (2013.01);
(Continued)

(58) Field of Classification Search
CPC .......... G01K 5/34; G01K 1/024; G01K 1/026; G01K 1/028; G01K 1/08; G01K 13/02; G01K 2207/06
See application file for complete search history.

(56) References Cited

U.S. PATENT DOCUMENTS 4,619,271 A * 10/1986 Burger .................. G01K 13/20
600/549
4,642,785 A 2/1987 Packard et al.
(Continued)

FOREIGN PATENT DOCUMENTS

| EP | 2418668 | 2/2012 |
|---|---|---|
| KR | 20100013067 | 9/2011 |
| KR | 101704836 | 2/2017 |

OTHER PUBLICATIONS

International Searching Authority, "International Search Report and Written Opinion," issued in connection with International Patent Application No. PCT/US2019/064155, dated Mar. 26, 2020, 11 pages.

(Continued)

*Primary Examiner* — Nathaniel T Woodward
*Assistant Examiner* — Philip L Cotey
(74) *Attorney, Agent, or Firm* — Hanley, Flight & Zimmerman, LLC

(57) ABSTRACT

Temperature probe hubs are disclosed. An example temperature probe hub includes a housing and a control button. The housing includes a base. The base has a central portion, a peripheral portion bounding the central portion, and a filler extending between the central portion and the peripheral portion. The filler is configured to move the central portion relative to the peripheral portion in response to a compressive force applied to the filler. The control button is located within the housing. The control button is configured to be (Continued)

actuated in response to movement of the central portion of the housing relative to the peripheral portion of the housing.

22 Claims, 31 Drawing Sheets

(51) Int. Cl.
    *G01K 1/024* (2021.01)
    *G01K 1/02* (2021.01)
    *G01K 1/08* (2021.01)

(52) U.S. Cl.
    CPC ............... *G01K 1/08* (2013.01); *G01K 13/02* (2013.01); *G01K 2207/06* (2013.01)

(56) References Cited

U.S. PATENT DOCUMENTS

| | | | |
|---|---|---|---|
| 5,165,798 A * | 11/1992 | Watanabe | G01K 13/20 374/208 |
| D389,754 S | 1/1998 | Skubala | |
| D393,600 S | 4/1998 | Keller | |
| 7,753,582 B2 | 7/2010 | Lopez et al. | |
| D718,069 S | 11/2014 | Marion et al. | |
| 8,931,400 B1 | 1/2015 | Allen | |
| 9,316,544 B2 * | 4/2016 | Hasegawa | G01K 7/00 |
| 9,427,107 B2 | 8/2016 | Reinhart | |
| 9,653,842 B2 | 5/2017 | Savage et al. | |
| D795,093 S | 8/2017 | Stanton et al. | |
| 9,799,199 B2 | 10/2017 | Allen | |
| 10,339,783 B2 | 7/2019 | Allen, Sr. | |
| D884,497 S | 5/2020 | Tang | |
| D926,056 S | 7/2021 | Lagerstedt et al. | |
| 2004/0170216 A1 * | 9/2004 | Russak | G01K 13/20 374/208 |
| 2010/0027582 A1 | 2/2010 | Lane et al. | |
| 2013/0037397 A1 * | 2/2013 | Tittle | H01H 13/06 200/302.2 |
| 2014/0303451 A1 * | 10/2014 | Beiswenger | A61B 5/02416 600/301 |
| 2015/0027868 A1 * | 1/2015 | Gao | H01H 13/063 200/341 |
| 2015/0115044 A1 * | 4/2015 | Claber | G01K 1/08 236/49.3 |
| 2015/0160076 A1 | 6/2015 | Liao et al. | |
| 2015/0260581 A1 * | 9/2015 | Fadell | G08B 17/00 307/117 |
| 2016/0334106 A1 | 11/2016 | Reinhart | |
| 2017/0209027 A1 * | 7/2017 | Raj | A61B 1/00135 |
| 2017/0232940 A1 * | 8/2017 | Kuo | B60S 5/00 141/1 |
| 2017/0307446 A1 | 10/2017 | Hegedus et al. | |
| 2018/0005508 A1 | 1/2018 | Allen, Sr. | |
| 2018/0005509 A1 | 1/2018 | Allen, Sr. | |
| 2018/0331463 A1 | 11/2018 | Xiao et al. | |
| 2020/0408606 A1 | 12/2020 | Bhogal et al. | |
| 2020/0408609 A1 | 12/2020 | Bhogal et al. | |

OTHER PUBLICATIONS

International Searching Authority, "International Search Report and Written Opinion," issued in connection with International Patent Application No. PCT/US2019/064153, dated Mar. 26, 2020, 10 pages.

United States Patent and Trademark Office, "Notice of Allowance and Fee(s) Due," issued in connection with U.S. Appl. No. 29/696,653, dated May 19, 2021, 7 pages.

IP Australia, "Certificate of Registration," issued in connection with Australian Design Registration 201916761, dated Feb. 25, 2020, 9 pages.

Canadian Intellectual Property Office, "Notice of Registration," issued in connection with Canadian Design Registration 191409, dated Jun. 16, 2021, 11 pages.

China National Intellectual Property Administration, "Notice of Decision of Grant," issued in connection with Chinese Design Application No. 201930653628.5, dated Mar. 23, 2020, 4 pages.

China National Intellectual Property Administration, "Design Certificate," issued in connection with Chinese Design Application No. 201930653628.5, dated May 12, 2020, 3 pages.

European Union Intellectual Property Office, "Certificate of Registration No. 007134556-0001," registered Oct. 29, 2019, 5 pages.

United States Patent and Trademark Office, "Non-Final Office Action," issued in connection with U.S. Appl. No. 16/696,732, dated Oct. 15, 2021, 6 pages.

United States Patent and Trademark Office, "Notice of Allowance," issued in connection with U.S. Appl. No. 16/696,732, dated Nov. 23, 2021, 8 pages.

* cited by examiner

SECTION A-A

SECTION B-B

SECTION E-E

SECTION E-E

SECTION F-F

SECTION G-G

SECTION E-E

SECTION H-H

SECTION E-E

SECTION H-H

TEMPERATURE PROBE HUBS

RELATED APPLICATIONS

This application claims priority to U.S. Provisional Patent Application No. 62/868,625, filed Jun. 28, 2019, entitled "Temperature Probe Hubs." The entirety of U.S. Provisional Patent Application No. 62/868,625 is hereby incorporated by reference herein.

FIELD OF THE DISCLOSURE

This disclosure relates generally to sensor hubs and, more specifically, to temperature probe hubs.

BACKGROUND

A temperature probe may be used to sense and/or measure the temperature of a food item as the food item is actively being cooked. For example, a temperature probe inserted into a piece of meat may sense and/or measure the temperature of the meat as the meat is cooked via heat generated by a cooking device (e.g., a grill, an oven, etc.). The temperature probe may include and/or be connected to a probe cable, and the probe cable may include and/or be connected to a jack plug configured to be plugged into a jack of a processing device having an associated display.

When the temperature probe is connected to the processing device, temperature data sensed and/or measured by the temperature probe may be presented on the display of the processing device for viewing by an end user. The temperature data may additionally or alternatively be wirelessly transmitted from the processing device to a remotely located computing and/or communication device (e.g., a smartphone, a tablet, a laptop computer, a desktop computer, a server, a wireless access point, etc.) which may subsequently process, display, and/or further transmit the received temperature data or some derivation thereof.

The processing device described above may in some instances be implemented as a temperature probe hub configured to simultaneously receive a plurality of jack plugs of a corresponding plurality of temperature probes. In such implementations, the display of the temperature probe hub is typically configured to present temperature data corresponding to each of the temperature probes that are connected to the temperature probe hub. In some implementations, the display of the temperature probe hub may simultaneously present the temperature data for all of the connected temperature probes. In other implementations, the display of the temperature probe hub may present temperature data for a selected one of the connected temperature probes at any given time, with the selected one of the connected temperature probes being determined based on an input communicated from an end user to the temperature probe hub via a user interface of the temperature probe hub.

Certain examples are shown in the above-identified figures and described in detail below. In describing these examples, like or identical reference numbers are used to identify the same or similar elements. The figures are not necessarily to scale and certain features and certain views of the figures may be shown exaggerated in scale or in schematic for clarity and/or conciseness.

Descriptors "first," "second," "third," etc. are used herein when identifying multiple elements or components which may be referred to separately. Unless otherwise specified or understood based on their context of use, such descriptors are not intended to impute any meaning of priority or ordering in time but merely as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Example temperature probe hubs disclosed herein include features that provide numerous advantages over conventional temperature probe hubs. For example, temperature probe hubs disclosed herein include one or more drain(s) configured to remove fluid (e.g., from rain, snow, a spilled beverage, etc.) that may enter one or more probe jack(s) of the temperature probe hub. In some examples, removal of fluid from the probe jack(s) via the drain(s) advantageously prevents the fluid from remaining in the probe jack(s) and/or the housing of the temperature probe hub absent intervention from an end user to remove the fluid.

As another example, temperature probe hubs disclosed herein include a base having a filler configured to move a central (e.g., inwardly located relative to a periphery) portion of the base relative to a peripheral portion of the base in response to a compressive force applied to the filler. In some examples, movement of the central portion of the base via the filler advantageously actuates an internally-located control button of the temperature probe hub to perform one or more control operations (e.g., displaying specific data, powering on, etc.) of the temperature probe hub.

The above-identified features as well as other advantageous features of example temperature probe hubs disclosed herein are further described below in connection with the figures of the application. As used herein, the term "configured" means sized, shaped, arranged, structured, oriented, positioned and/or located. For example, in the context of a first object configured to fit within a second object, the first object is sized, shaped, arranged, structured, oriented, positioned and/or located to fit within the second object.

Figure 1:
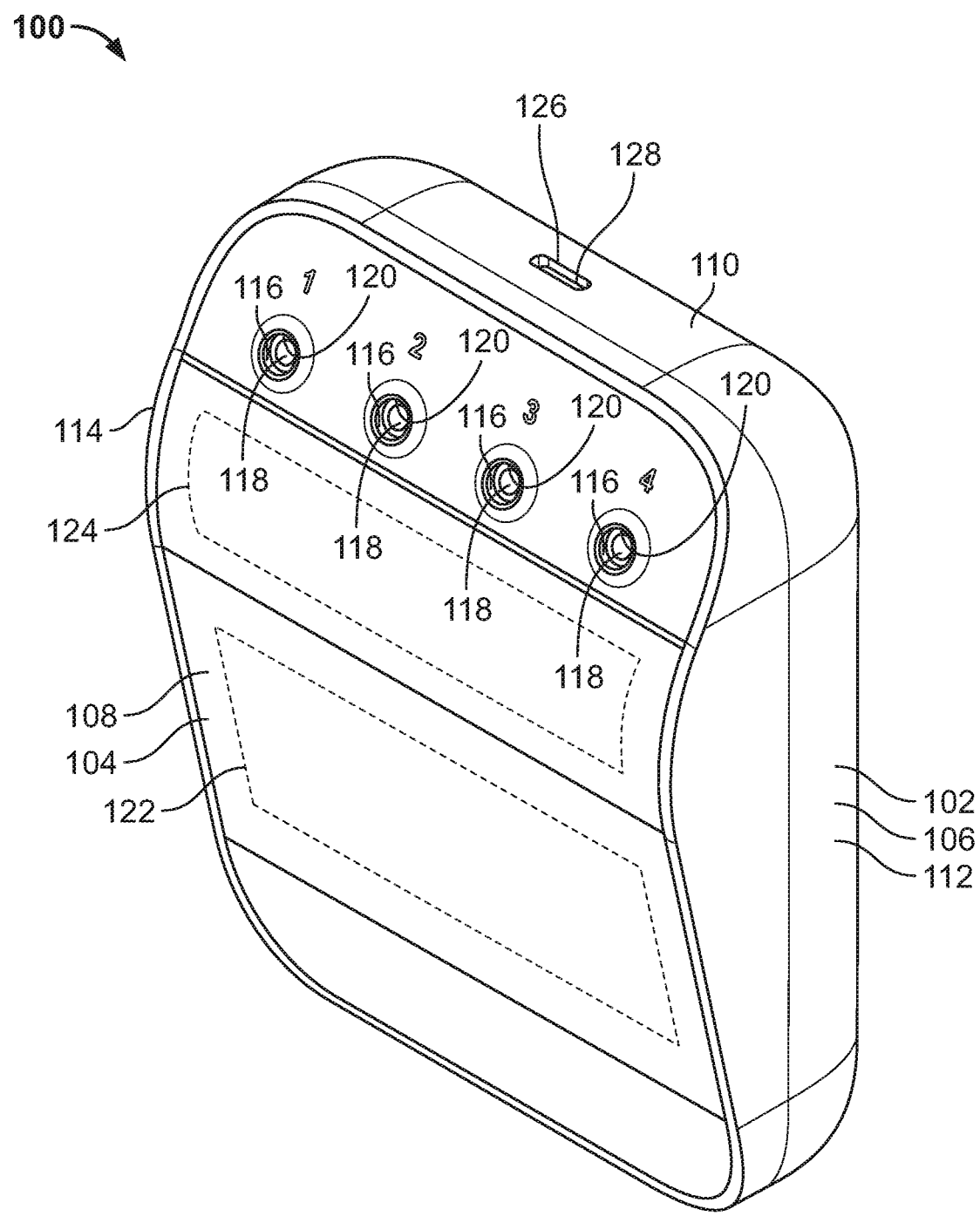
FIG. 1 is a first perspective view of an example temperature probe hub constructed in accordance with teachings of this disclosure.
Figure 2:
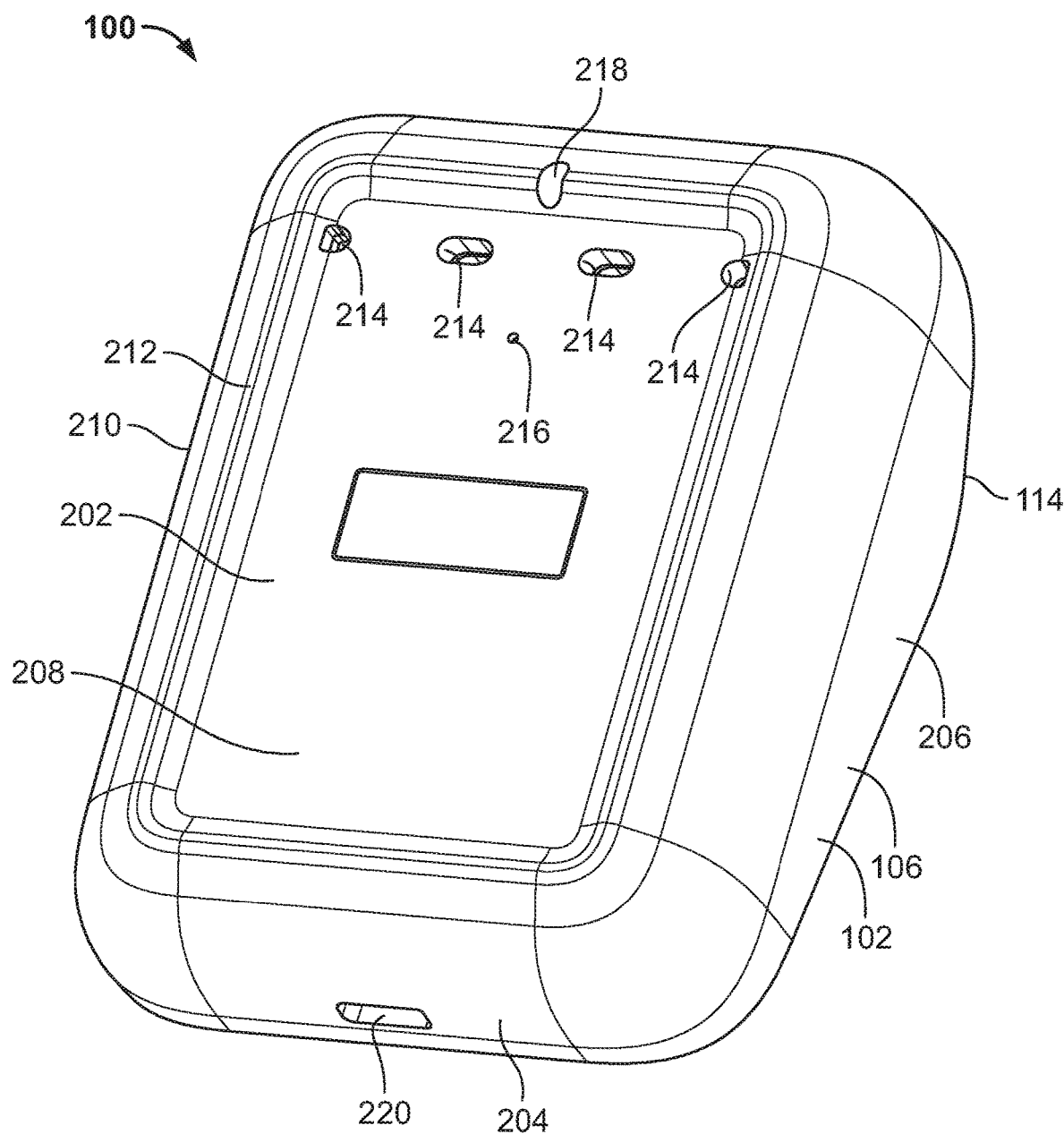
FIG. 2 is a second perspective view of the temperature probe hub of FIG. 1.
Figure 3:
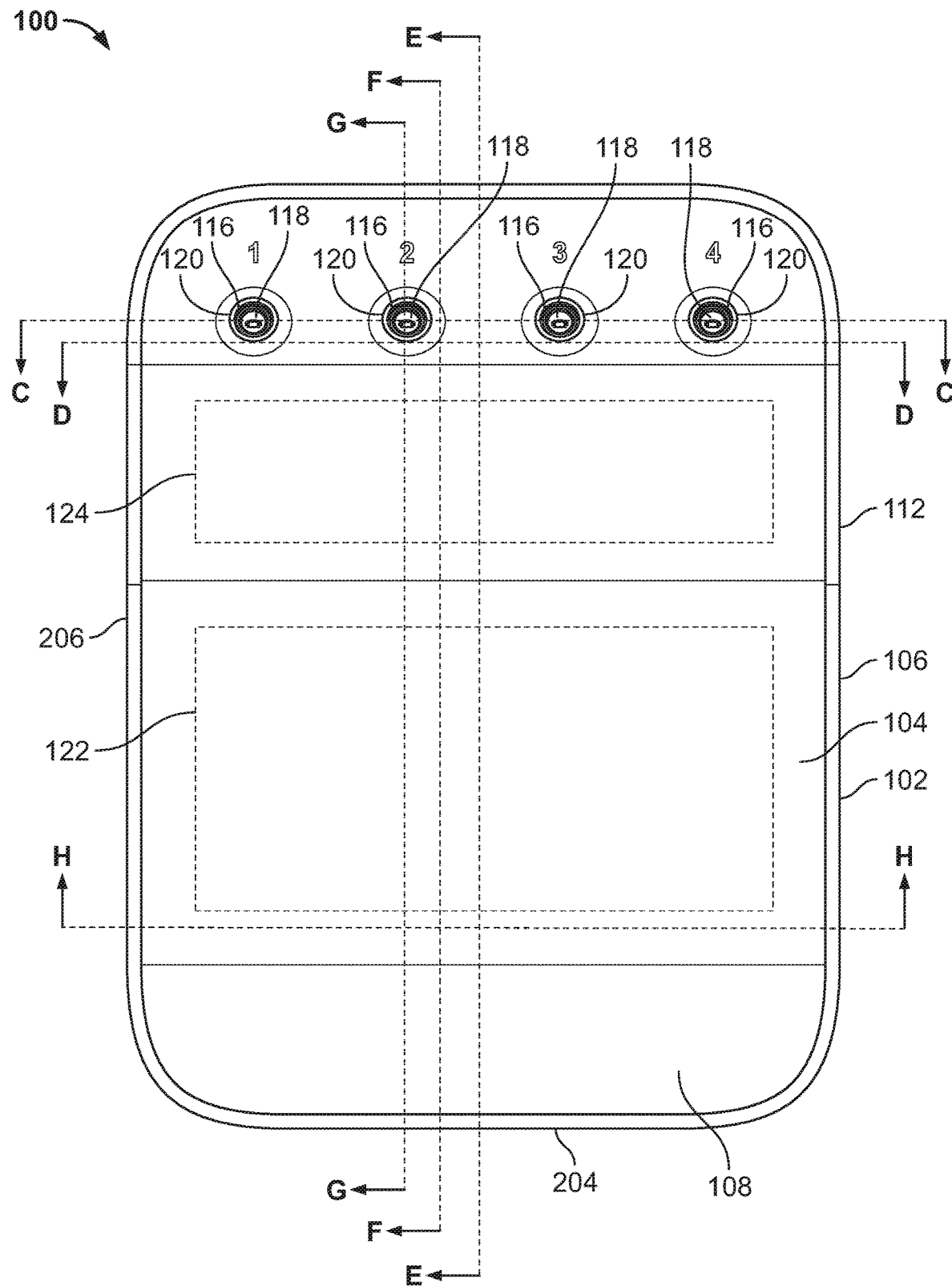
FIG. 3 is a top view of the temperature probe hub of FIGS. 1 and 2.
Figure 4:
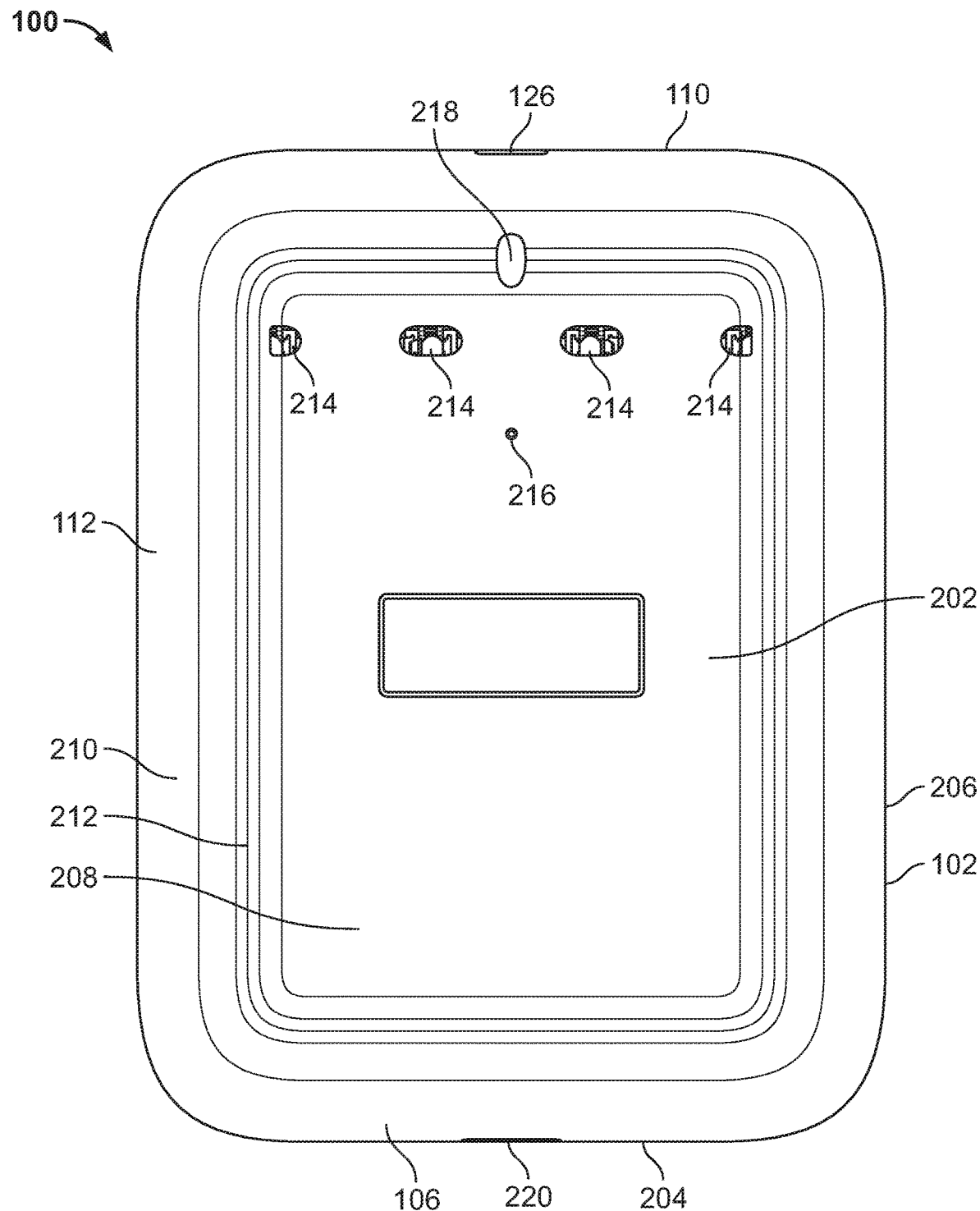
FIG. 4 is a bottom view of the temperature probe hub of FIGS. 1-3.
Figure 5:
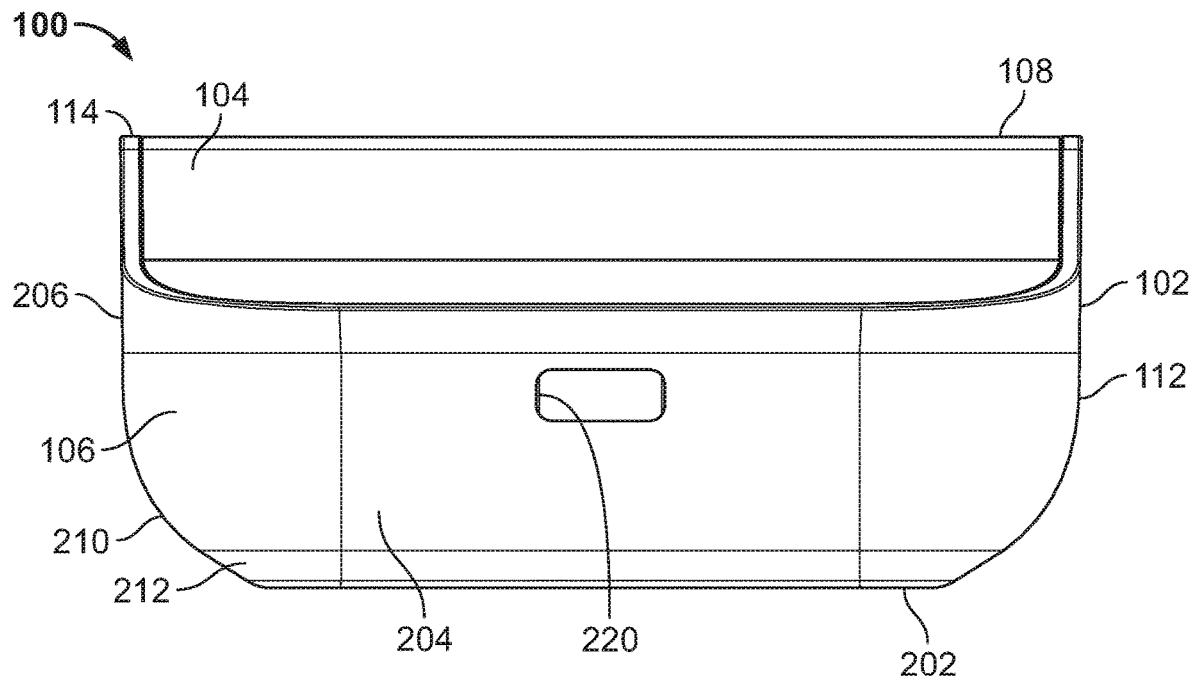
FIG. 5 is a first end view of the temperature probe hub of FIGS. 1-4.
Figure 6:
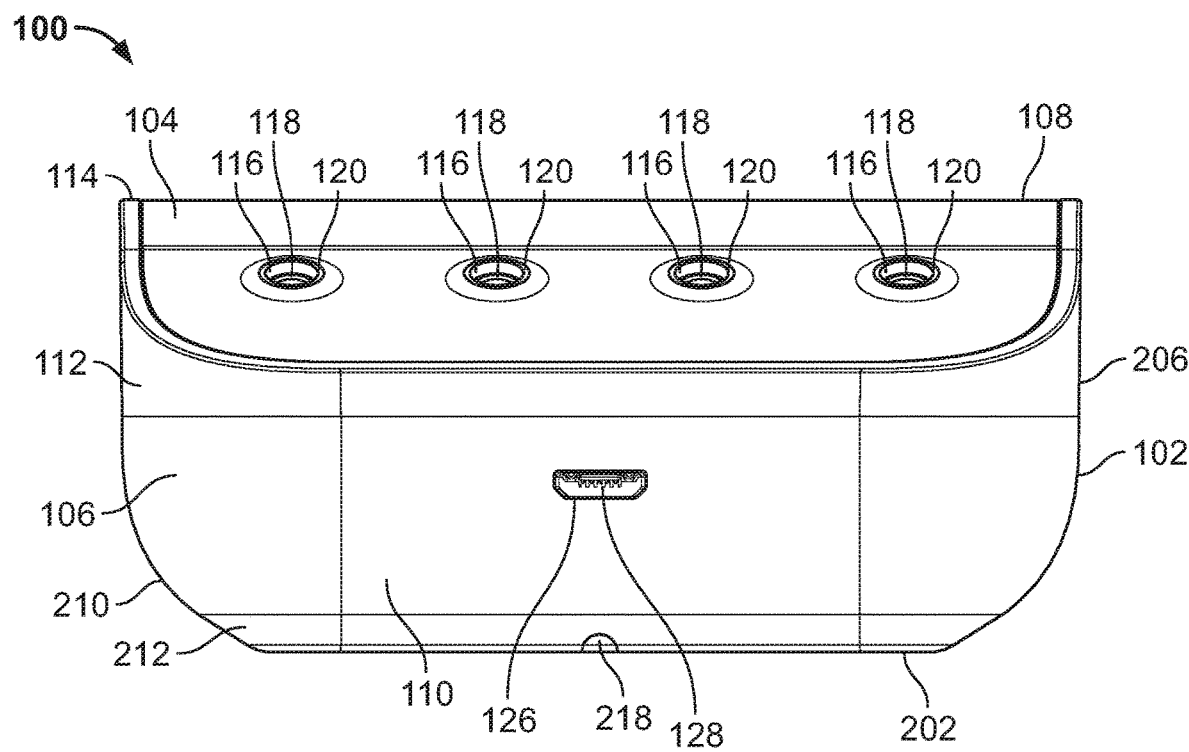
FIG. 6 is a second end view of the temperature probe hub of FIGS. 1-5.
Figure 7:
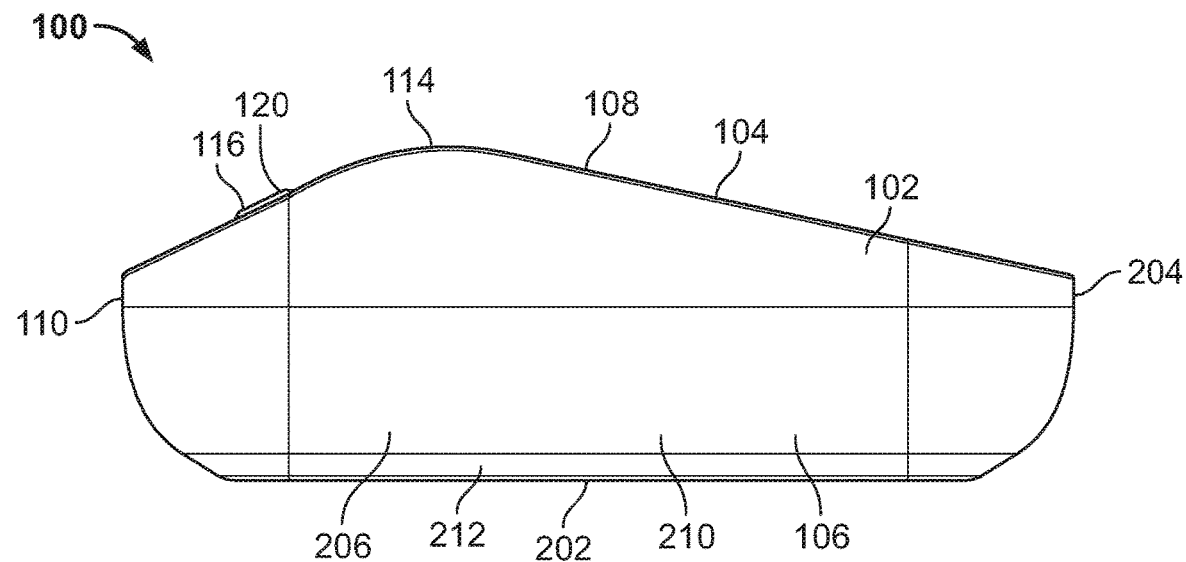
FIG. 7 is a first side view of the temperature probe hub of FIGS. 1-6.
Figure 8:
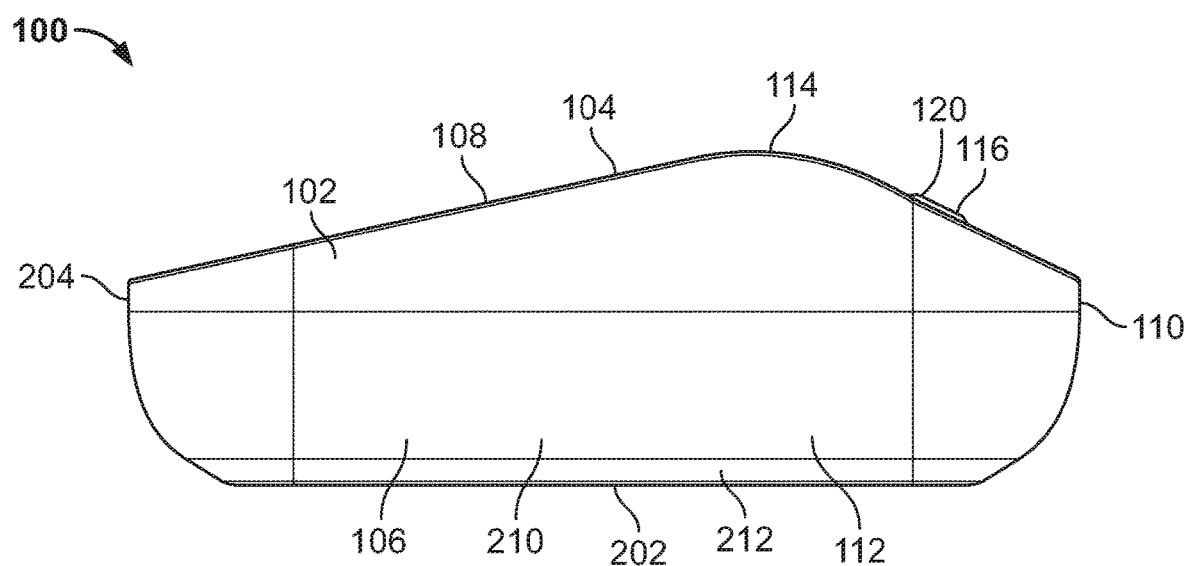
FIG. 8 is a second side view of the temperature probe hub of FIGS. 1-7.

FIG. 1 is a first perspective view of an example temperature probe hub 100 constructed in accordance with teachings of this disclosure. FIG. 2 is a second perspective view of the temperature probe hub 100 of FIG. 1. FIG. 3 is a top view of the temperature probe hub 100 of FIGS. 1 and 2. FIG. 4 is a bottom view of the temperature probe hub 100 of FIGS. 1-3. FIG. 5 is a first (e.g., front) end view of the temperature probe hub 100 of FIGS. 1-4. FIG. 6 is a second (e.g., rear) end view of the temperature probe hub 100 of FIGS. 1-5. FIG. 7 is a first (e.g., left) side view of the temperature probe hub 100 of FIGS. 1-6. FIG. 8 is a second (e.g., right) side view of the temperature probe hub of FIGS. 1-7.

The temperature probe hub 100 of FIGS. 1-8 includes an example housing 102 formed by an example cap 104 and an example base 106. In the illustrated example of FIGS. 1-8, the housing 102 is a contoured rectangular box-shaped structure defined by an example upper wall 108, an example lower wall 202, an example first end wall 204, an example second end wall 110, an example first side wall 206, and an example second side wall 112. As shown in FIGS. 1-8, the corners and lower edges defined by the lower wall 202, the first end wall 204, the second end wall 110, the first side wall 206, and the second side wall 112 of the housing 102 are rounded. The upper wall 108 of the housing 102 has a concave downward shape extending from the first end wall 204 to the second end wall 110 of the housing 102, and including an example apex 114 located between the first end wall 204 and the second end wall 110. In other examples, the housing 102 can be shaped in a manner that differs from that shown in FIGS. 1-8.

In the illustrated example of FIGS. 1-8, the cap 104 of the housing 102 forms the upper wall 108 of the housing 102, and the base 106 of the housing 102 forms the lower wall 202, the first end wall 204, the second end wall 110, the first side wall 206, and the second side wall 112 of the housing 102. The cap 104 is configured to fit within the peripheral boundaries of the base 106 as defined by the first end wall 204, the second end wall 110, the first side wall 206, and the second side wall 112 of the housing 102. In other examples, the cap 104 can instead be configured to extend beyond the peripheral boundaries of the base 106 as defined by the first end wall 204, the second end wall 110, the first side wall 206, and the second side wall 112 of the housing 102. In some such other examples, the cap 104, as opposed to the base 106, can form the first end wall 204, the second end wall 110, the first side wall 206, and/or the second side wall 112 of the housing 102, or one or more portion(s) thereof. For example, the cap 104 can include a lip that forms and/or extends downwardly over at least a portion of the first end wall 204, the second end wall 110, the first side wall 206, and/or the second side wall 112 of the housing 102.

The cap 104 of FIGS. 1-8 includes example probe jack openings 116 (e.g., through holes) that are configured to align with corresponding example probe jacks 118 located within the housing 102 of the temperature probe hub 100. Each of the probe jack openings 116 of the cap 104, and each of the corresponding probe jacks 118 of the temperature probe hub 100 is configured to receive a jack plug of a temperature probe (e.g., a food temperature probe, an ambient temperature probe, etc.) that is configured to be removably coupled and/or removably connected to the temperature probe hub 100 via any of the probe jacks 118. The probe jack openings 116 of the cap 104 of FIGS. 1-8 further constitute example drain inlets 120 for drains that pass and/or extend through the housing 102 of the temperature probe hub 100 of FIGS. 1-8, as further described below. In the illustrated example of FIGS. 1-8, the cap 104 includes four probe jack openings 116 and/or drain inlets 120, and the temperature probe hub 100 includes four probe jacks 118. In other examples, the temperature probe hub 100 can include a different number (e.g., 1, 2, 3, 5, 6, etc.) of probe jacks 118, and the cap 104 of the temperature probe hub 100 can include a corresponding different number of probe jack openings 116 and/or drain inlets 120.

The cap 104 of FIGS. 1-8 has an opacity that enables light from one or more light-emitting, light-projecting, and/or light-transferring device(s) located within the housing 102 of the temperature probe hub 100 of FIGS. 1-8 to be visible (e.g., visible to a user) through the cap 104 and/or, more generally, through the upper wall 108 of the housing 102 of the temperature probe hub 100. In the illustrated example of FIGS. 1-8, the cap 104 includes a first example display region 122 and a second example display region 124. As shown in FIGS. 1-8, the first display region 122 of the cap 104 is located between the apex 114 of the cap 104 and the first end wall 204 of the housing 102, and the second display region 124 of the cap 104 is located along the apex 114 of the cap 104.

In the illustrated example of FIGS. 1-8, the first display region 122 of the cap 104 is configured to display cooking status information, temperature unit information, connectivity status information, and/or battery status information emitted and/or projected from a display device located within the housing 102 at a position beneath the first display region 122 of the cap 104. In some examples, the cooking status information displayed at the first display region 122 of the cap 104 includes a food temperature measured by a temperature probe connected to the temperature probe hub 100 of FIGS. 1-8, or alternatively includes an estimated remaining cooking time for a food item associated with the temperature probe. In some examples, the temperature unit information displayed at the first display region 122 of the cap 104 includes a temperature unit icon (e.g., "° F." or "° C.") indicating a temperature unit associated with the cooking status information described above. In some examples, the connectivity status information displayed at the first display region 122 of the cap 104 includes a network connection icon indicating whether and/or to what extent the temperature probe hub 100 of FIGS. 1-8 is wirelessly connected to a network (e.g., a Wi-Fi network, a Bluetooth network, etc.). In some examples, the battery status information displayed at the first display region 122 of the cap 104 includes a battery charge status icon indicating whether and/or to what extent a rechargeable battery of the temperature probe hub 100 of FIGS. 1-8 is charged.

In the illustrated example of FIGS. 1-8, the second display region 124 of the cap 104 is configured to display probe connection status information and/or probe selection status information emitted and/or projected from one or more arm(s) of a light pipe operatively coupled to one or more corresponding light-emitting diode(s) (LED(s)), with the arm(s) of the light pipe being located within the housing 102 at a position beneath the second display region 124 of the cap 104. In some examples, the probe connection status information displayed at the second display region 124 of the cap 104 includes a light-based visual indication that a plug of a temperature probe is connected to a specific one of the probe jacks 118 of the temperature probe hub 100. In some examples, the probe selection status information displayed at the second display region 142 of the cap 104 includes a light-based visual indication that identifies a specific probe and/or a specific one of the probe jacks 118 associated with the cooking status information currently being displayed at the first display region 122 of the cap 104.

The base 106 of FIGS. 1-8 includes an example central portion 208, an example peripheral portion 210, and an example filler 212. In the illustrated example of FIGS. 1-8, the central portion 208 of the base 106 is spatially bounded by the peripheral portion 210 of the base 106. The central portion 208 of the base 106 is partially separated from the peripheral portion 210 of the base 106 by a gap formed between the central portion 208 and the peripheral portion 210 along three edges of the central portion 208 (e.g., the edges of the central portion 208 located proximate the first end wall 204, the first side wall 206, and the second side wall 112 of the housing 102). In the illustrated example of FIGS. 1-8, the gap is filled, covered and/or concealed by the filler 212 of the base 106. The filler 212 extends across the gap and is coupled (e.g., via a tongue-and-groove connection and/or a notch) to both the central portion 208 and the peripheral portion 210 of the base 106. The filler 212 additionally extends downwardly (e.g., in a direction away from the upper wall 108 of the housing 102 and toward the lower wall 202 of the housing 102) from both the central portion 208 and the peripheral portion 210 of the base 106. Thus, the filler 212 forms a portion of the lower wall 202 of the housing 102 of FIGS. 1-8.

In the illustrated example of FIGS. 1-8, the filler 212 is constructed and/or fabricated from a flexible and/or pliable material (e.g., a thermoplastic polymer). The filler 212 flexibly couples and/or flexibly connects the central portion 208 of the base 106 to the peripheral portion 210 of the base 106 along the three edges of the central portion 208 of the base 106 at which the above-described gap is formed. In some intended implementations of the temperature probe hub 100 of FIGS. 1-8, the filler 212 and/or, more generally, the lower wall 202 of the base 106 of the temperature probe hub 100 is placed on and/or is removably coupled to (e.g., via a magnetic connection) a rigid surface of an object (e.g., a side table of a grill). In such implementations, the filler 212 is configured to move and/or flex the central portion 208 of the base 106 in a first direction (e.g., in a direction moving from the lower wall 202 of the housing 102 toward the upper wall 108 of the housing 102) in response to a force applied in a second direction opposite the first direction (e.g., in a direction moving from the upper wall 108 of the housing 102 toward the lower wall 202 of the housing 102) to the cap 104 and/or the upper wall 108 of the housing 102. The above-described movement and/or flexure of the central portion 208 of the base 106 causes the central portion 208 of the base 106 to contact, compress and/or actuate a control button of the temperature probe hub 100 of FIGS. 1-8 located (e.g., mounted on a bottom surface of a main board) within the housing 102 of the temperature probe hub 100.

In some examples, contacting, compressing and/or actuating the control button via the central portion 208 of the base 106 for a first period of time causes the temperature probe hub 100 (including the light-emitting and/or light projecting devices thereof) to power on. For example, contacting, compressing and/or actuating the control button via the central portion 208 of the base 106 for a period of time greater than three seconds while the temperature probe hub 100 (including the light-emitting and/or light projecting devices thereof) is powered off may cause the temperature probe hub 100 (including the light-emitting and/or light projecting devices thereof) to be powered on.

In some examples, contacting, compressing and/or actuating the control button via the central portion 208 of the base 106 for a second period of time different from the first period of time causes the above-described light-emitting and/or light projecting devices of the temperature probe hub 100 to present data and/or information associated with a different one of the probe jacks 118 of the temperature probe hub 100 of FIGS. 1-8. For example, contacting, compressing and/or actuating the control button via the central portion 208 of the base 106 for a period of time less than three seconds while the light-emitting and/or light projecting devices of the temperature probe hub 100 are presenting data and/or information associated with a first one of the probe jacks 118 having a first probe operatively coupled thereto may cause the light-emitting and/or light projecting devices of the temperature probe hub 100 to present data and/or information associated with a second one of the probe jacks 118 having a second probe operatively coupled thereto.

The base 106 of FIGS. 1-8 further includes example drain outlets 214 (e.g., through holes) that are configured to align with, and/or to be in fluid communication with, the drain inlets 120 of the cap 104 of FIGS. 1-8 described above. Each of the drain outlets 214 is in fluid communication with a corresponding one of the drain inlets 120 via a drain that passes and/or extends through the housing 102 of the temperature probe hub 100 of FIGS. 1-8, as further described below. For example, fluid (e.g., from rain, snow, a spilled beverage, etc.) received at a first one of the drain inlets 120 travels through the first one of the drain inlets 120, through a first one of the drains, and is expelled from the first one of the drains via a first one of the drain outlets 214.

In the illustrated example of FIGS. 1-8, the drain outlets 214 are formed in the lower wall 202 of the housing 102 at respective locations within the peripheral boundaries of the filler 212 of base 106. In other examples, one or more of the drain outlets 214 can instead be formed in the lower wall 202 of the housing 102 at a location beyond the peripheral boundaries of the filler 212 of base 106. In the illustrated example of FIGS. 1-8, the base 106 includes four drain outlets 214. In other examples, the base 106 can include a different number (e.g., 1, 2, 3, 5, 6, etc.) of drain outlets 214. In the illustrated example of FIGS. 1-8, the number of drain outlets 214 is equal to the number of drain inlets 120. In other examples, the number of drain outlets 214 can instead be greater than or less than the number of drain inlets 120.

The base 106 of FIGS. 1-8 further includes an example reset opening 216 that is configured to receive a pin (e.g., a pointed end of a safety pin, a pointed end of a push pin, an end of a paper clip, etc.). The reset opening 216 of the base 106 is further configured to align with a reset button of the temperature probe hub 100 of FIGS. 1-8 located (e.g., mounted on a bottom surface of a main board) within the housing 102 of the temperature probe hub 100 such that a pin inserted into and/or through the reset opening 216 can contact, compress and/or actuate the reset button. In some examples, contacting, compressing and/or actuating the reset button via a pin inserted into and/or through the reset opening 216 for a first period of time causes the temperature probe hub 100 (including the electronic components thereof) to erase and/or clear information stored at the temperature probe hub 100 that may be associated with one or more remotely located device(s) with which the temperature probe hub 100 has wirelessly communicated. For example, contacting, compressing and/or actuating the reset button via a pin inserted into and/or through the reset opening 216 for a period of time greater than three seconds while the temperature probe hub 100 (including electronic components thereof) is powered on may cause the temperature probe hub 100 to erase and/or clear information stored at the temperature probe hub 100 that is associated with a remotely located smartphone with which the temperature probe hub 100 has wirelessly communicated.

The base 106 of FIGS. 1-8 further includes an example notch 218 formed in and extending across the filler 212 of the base 106. The notch 218 is configured to enable fluid expelled from the drain outlets 214 of the base 106 and located within the peripheral boundaries of the filler 212 to subsequently pass, flow, and/or be expelled outwardly beyond the peripheral boundaries of the filler 212. In some examples, the passage and/or expulsion of fluid from within the peripheral boundaries of the filler 212 via the notch 218 relieves and/or prevents the formation of a suction force between the filler 212 of the base 106 and an object that the base 106 of the temperature probe hub 100 is placed on and/or mounted to. In the illustrated example of FIGS. 1-8, the notch 218 is formed in the filler 212 proximate the second end wall 110 of the housing 102. In other examples, the notch 218 can instead be formed in the filler 212 proximate the first end wall 204, the first side wall 206, or the second side wall 112 of the housing 102. In the illustrated example of FIGS. 1-8, the base 106 includes one notch 218. In other examples, the base 106 can include a different number (e.g., 2, 3, 4, etc.) of notches configured in a manner substantially similar to the notch 218 of FIGS. 1-8, and formed in the filler 212 at different areas, regions and/or portions thereof.

The base 106 of FIGS. 1-8 further includes an example micro Universal Serial Bus (micro USB) jack opening 126 (e.g., a through hole) that is configured to receive and/or align with a micro USB jack 128 located within the housing 102 of the temperature probe hub 100. The micro USB jack opening 126 of the base 106 and/or the micro USB jack 128 of the temperature probe hub 100 is/are configured to receive a micro USB plug of a charging cable that is configured to be removably coupled and/or removably connected to the temperature probe hub 100 via the micro USB jack 128. In the illustrated example of FIGS. 1-8, the micro USB jack opening 126 is formed in (and the micro USB jack 128 is located at) the second end wall 110 of the housing 102. In other examples, the micro USB jack opening 126 can instead be formed in (and the micro USB jack 128 can instead be located at) the upper wall 108, the lower wall 202, the first end wall 204, the first side wall 206, or the second side wall 112 of the housing 102.

In some examples, a rechargeable battery located within the housing 102 of the temperature probe hub 100 provides electric power to one or more electronic components and/or processing boards of the temperature probe hub 100. In such examples, coupling and/or connecting the micro USB plug of the charging cable to the micro USB jack 128 of the temperature probe hub 100 while a power adapter of the charging cable is coupled and/or connected to a power source (e.g., household power, line power, mains electric power, etc.) causes the rechargeable battery of the temperature probe hub 100 to recharge (e.g., to increase its state of charge relative to a current state of charge).

The base 106 of FIGS. 1-8 further includes an example strap opening 220 that is configured to receive an end of a strap of the temperature probe hub 100. Coupling and/or connecting the end of the strap to the temperature probe hub 100 via the strap opening 220 enables the temperature probe hub 100 to be hung and/or suspended, via the strap, from an object (e.g., a hook, a knob, etc.) that is configured to fit within an opening of the strap. In the illustrated example of FIGS. 1-8, the strap opening 220 is formed in (and the strap is located at) the first end wall 204 of the housing 102. In other examples, the strap opening 220 can instead be formed in (and the strap can instead be located at) the upper wall 108, the lower wall 202, the second end wall 110, the first side wall 206, or the second side wall 112 of the housing 102.

Figure 9:
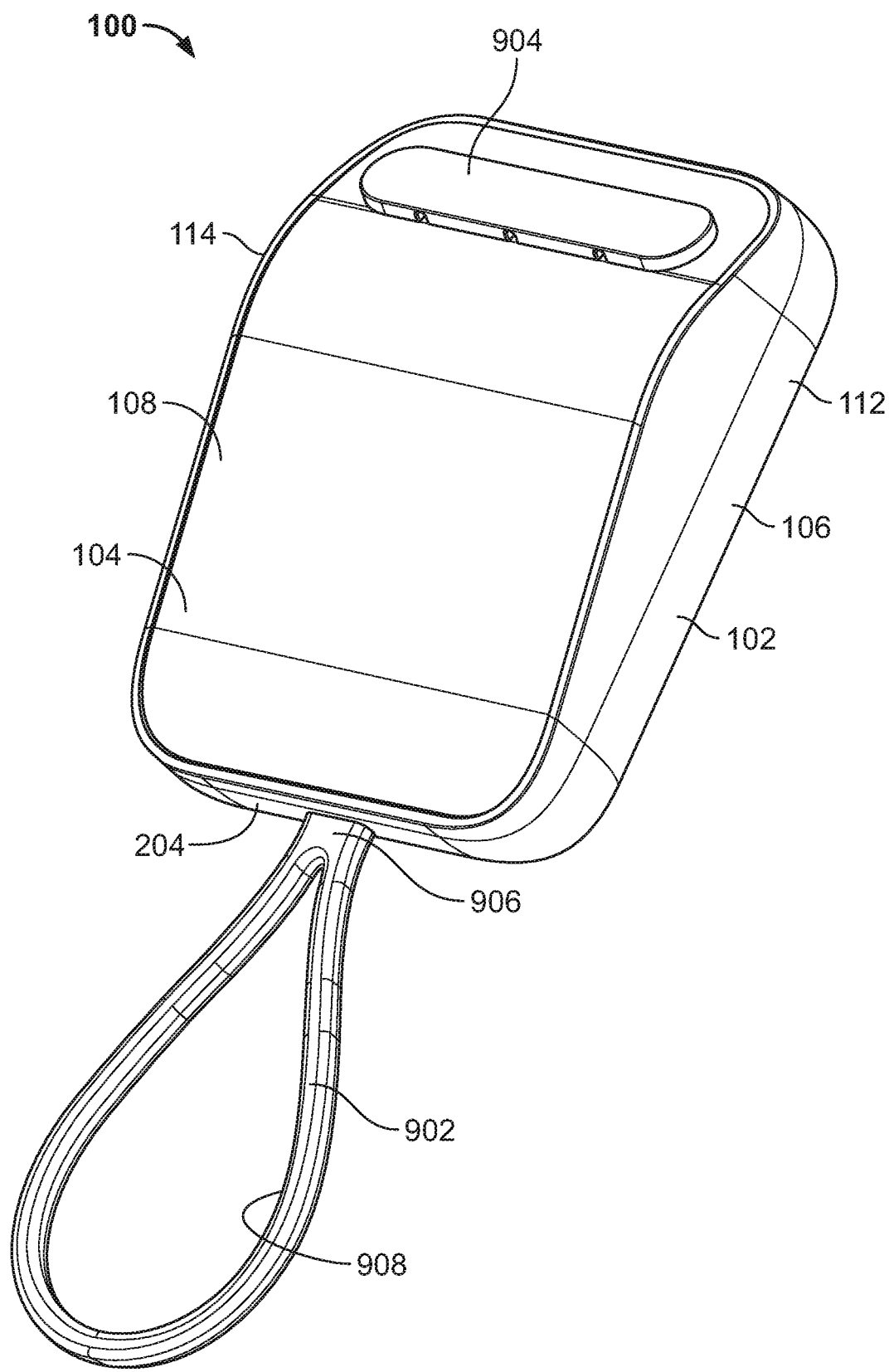
FIG. 9 is a third perspective view of the temperature probe hub of FIGS. 1-8 including an example strap and an example probe jack cover.

FIG. 9 is a third perspective view of the temperature probe hub 100 of FIGS. 1-8 including an example strap 902 and an example probe jack cover 904. The strap 902 of FIG. 9 is located along the first end wall 204 of the housing 102. In the illustrated example of FIG. 9, the strap 902 includes an example first end 906 and an example loop 908. The first end 906 of the strap 902 is coupled to the temperature probe hub 100 via the strap opening 220 described above. The loop 908 of the strap 902 is configured to slide and/or fit over an object (e.g., a hook, a knob, etc.) such that the temperature probe hub 100 can be hung and/or suspended from the object via the strap 902.

The probe jack cover 904 of FIG. 9 is configured to removably cover the probe jack openings 116 and/or drain inlets 120 of the cap 104 of FIGS. 1-8 described above, and/or to removably cover the probe jacks 118 located within the housing 102 of the temperature probe hub 100 of FIGS. 1-8 described above. For example, when the probe jack cover 904 is placed on the cap 104 of the temperature probe hub 100 over the probe jack openings 116 and/or drain inlets 120 of the temperature probe hub 100 (e.g., as shown in FIG. 9), the probe jack cover 904 restricts and/or prevents fluid (e.g., from rain, snow, a spilled beverage, etc.) received at, delivered to and/or accumulating on the cap 104 and/or the probe jack cover 904 from passing into the probe jacks 118 of the temperature probe hub 100.

Figure 10:
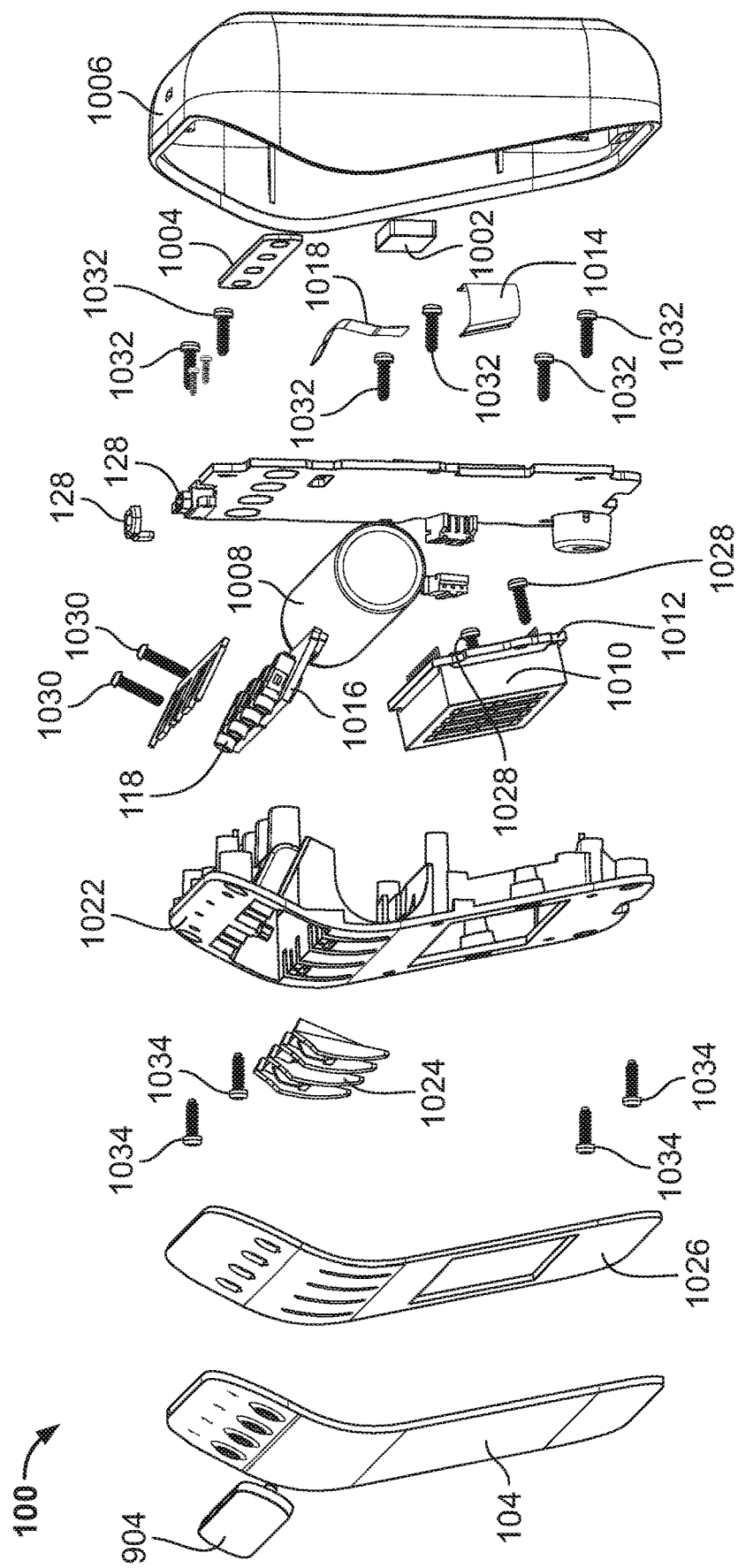
FIG. 10 is an exploded view of the temperature probe hub of FIGS. 1-8 including the probe jack cover of FIG. 9.

FIG. 10 is an exploded view of the temperature probe hub 100 of FIGS. 1-8 including the probe jack cover 904 of FIG. 9. As shown in FIG. 10, the temperature probe hub 100 includes the cap 104, the base 106, the probe jacks 118, the micro USB jack 128, and the probe jack cover 904 described above in connection with FIGS. 1-9, and further includes an example magnet 1002, a first example pressure sensitive adhesive (PSA) layer 1004, an example main board 1006, an example battery 1008, an example display 1010, an example display board 1012, a first example ribbon cable 1014, an example probe jack board 1016, a second example ribbon cable 1018, a second example PSA layer 1020, an example chassis 1022, an example light pipe 1024, a third example PSA layer 1026, first example fasteners 1028, second example fasteners 1030, third example fasteners 1032, and fourth example fasteners 1034.

Figure 11:
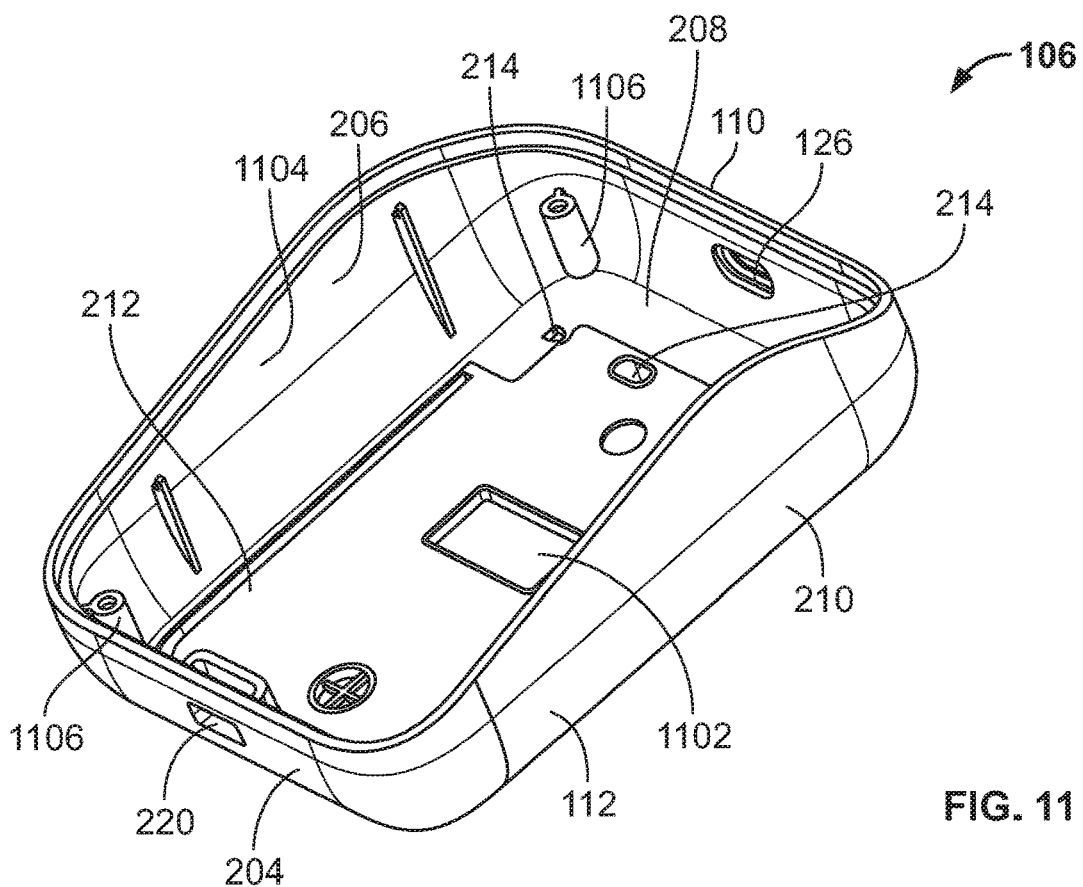
FIG. 11 is a first perspective view of the base of FIGS. 1-10.
Figure 12:
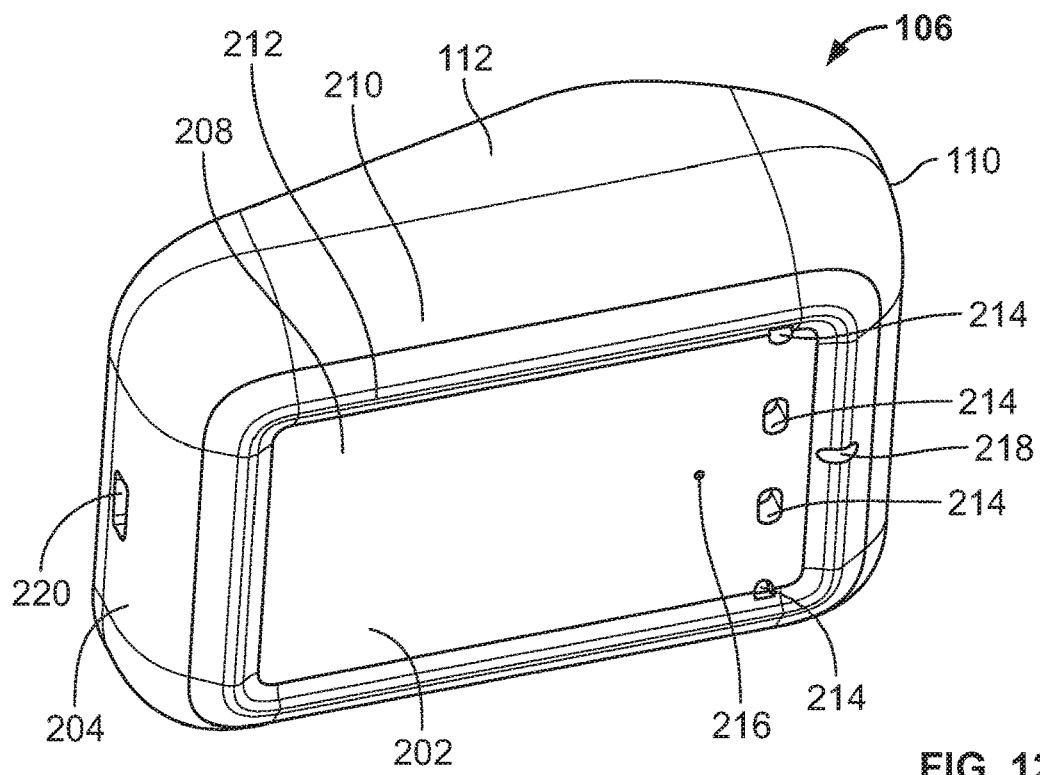
FIG. 12 is a second perspective view of the base of FIGS. 1-11.
Figure 13:
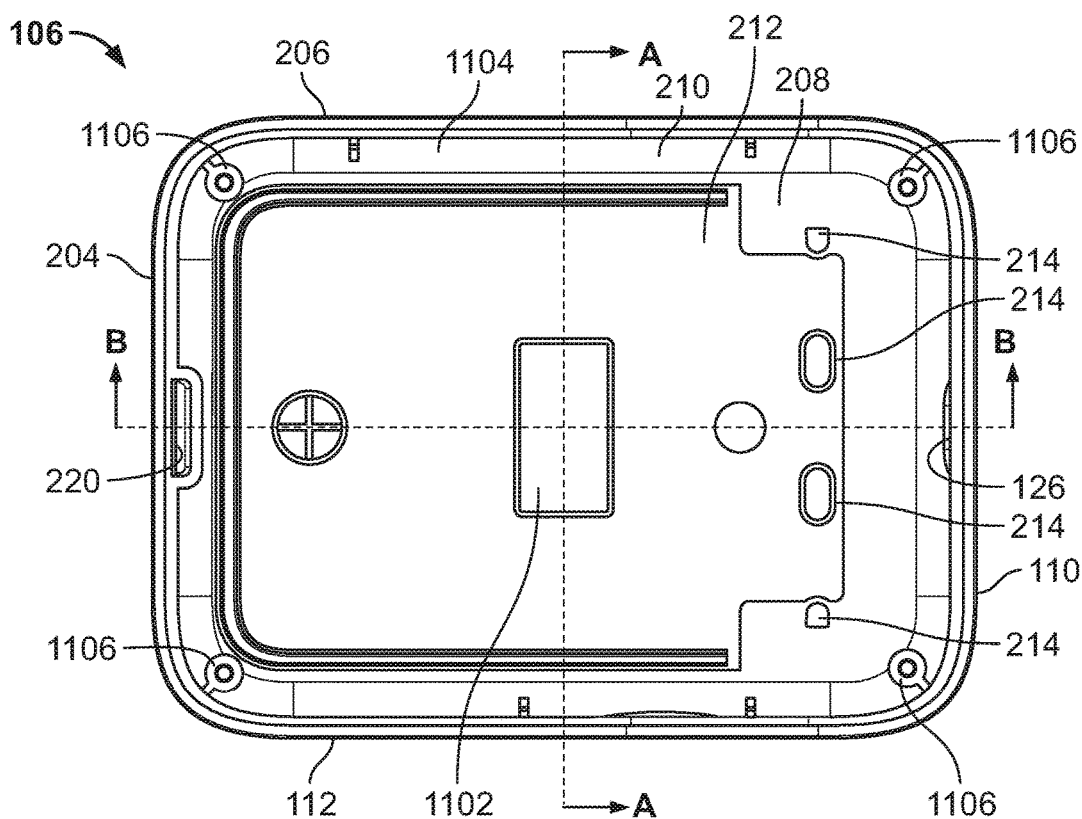
FIG. 13 is a top view of the base of FIGS. 1-12.
Figure 14:
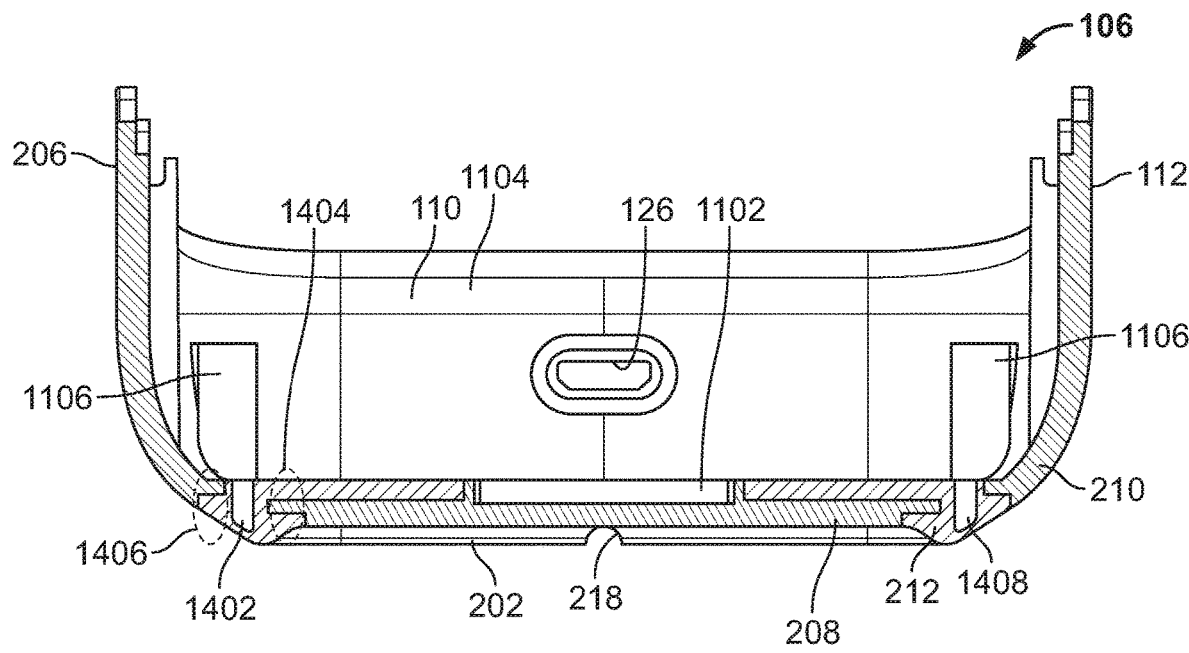
FIG. 14 is a cross-sectional view of the base of FIGS. 1-13 taken along section A-A of FIG. 13.
Figure 15:
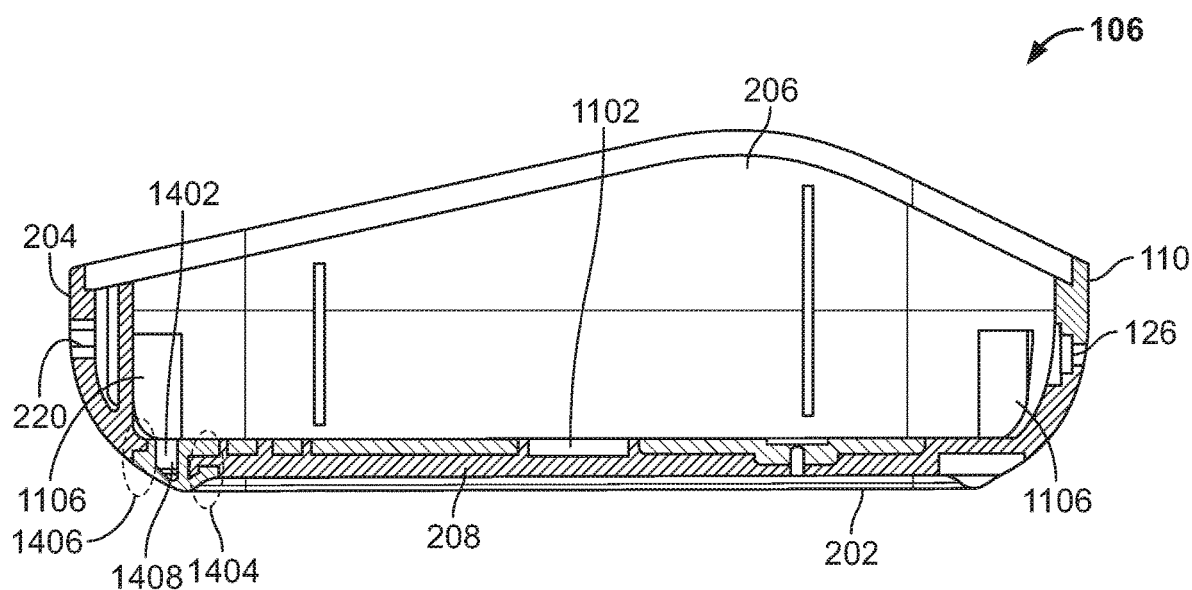
FIG. 15 is a cross-sectional view of the base of FIGS. 1-14 taken along section B-B of FIG. 13.

FIGS. 11-15 further illustrate the base 106 of the temperature probe hub 100 of FIGS. 1-10. More specifically, FIG. 11 is a first perspective view of the base 106 of FIGS. 1-10. FIG. 12 is a second perspective view of the base 106 of FIGS. 1-11. FIG. 13 is a top view of the base 106 of FIGS. 1-12. FIG. 14 is a cross-sectional view of the base 106 of FIGS. 1-13 taken along section A-A of FIG. 13. FIG. 15 is a cross-sectional view of the base 106 of FIGS. 1-14 taken along section B-B of FIG. 13.

As shown in FIGS. 11-15, the base 106 of the temperature probe hub 100 includes an example recess 1102 formed on and/or in an example interior surface 1104 of the base 106 along the central portion 208 of the base 106. The recess 1102 of the base 106 is configured to receive the magnet 1002 of the temperature probe hub 100. In the illustrated example of FIGS. 11-15, the base 106 includes one recess 1102. In other examples, the base 106 can include a different number (e.g., 2, 3, 4, etc.) of recesses configured in a manner substantially similar to the recess 1102, and formed on the interior surface 1104 of the base 106 at different areas, regions and/or portions thereof.

The magnet 1002 of the temperature probe hub 100 is configured to be disposed in the recess 1102 of the base 106 and coupled and/or connected (e.g., bonded) thereto. The magnet 1002 is configured to removably couple and/or removably connect the temperature probe hub 100 to an object having ferromagnetic properties. For example, the magnet 1002 can removably couple and/or removably connect the temperature probe hub 100, in any orientation (e.g., a horizontal orientation, a vertical orientation, etc.), to a ferromagnetic side table of a grill. In the illustrated example of FIG. 10, the temperature probe hub 100 includes one magnet 1002. In other examples, the temperature probe hub 100 can include a different number (e.g., 2, 3, 4, etc.) of magnets configured in a manner substantially similar to the magnet 1002, and coupled and/or connected (e.g., bonded) to different areas, regions and/or portions of the interior surface 1104 of the base 106.

As further shown in FIGS. 11-15, the base 106 of the temperature probe hub 100 further includes example bosses 1106. The bosses 1106 are formed on the interior surface 1104 of the base 106 along the peripheral portion 210 of the base 106. Each one of the bosses 1106 of the base 106 is configured to receive a corresponding one of the fourth fasteners 1034 of the temperature probe hub 100, as further described below. In the illustrated example of FIGS. 11-15, the base 106 includes four bosses 1106. In other examples, the base 106 can include a different number (e.g., 1, 2, 3, 5, 6, etc.) of bosses 1106 formed on the interior surface 1104 of the base 106 at different areas, regions and/or portions thereof.

As shown in FIGS. 14 and 15, the base 106 of the temperature probe hub 100 includes an example gap 1402 formed between the central portion 208 and the peripheral portion 210 of the base 106. The gap 1402 is formed along three edges of the central portion 208 (e.g., the edges of the central portion 208 located proximate the first end wall 204, the first side wall 206, and the second side wall 112 of the housing 102) of the base 106. The gap 1402 partially separates the central portion 208 of the base 106 from the peripheral portion 210 of the base 106. The gap 1402 is filled, covered and/or concealed by the filler 212 of the base 106, which extends across the gap 1402. The filler 212 is coupled and/or connected to the central portion 208 of the base 106 via an example tongue-and-groove connection 1404, and is further coupled and/or connected to the peripheral portion 210 of the base 106 via an example notch 1406.

As further shown in FIGS. 14 and 15, the filler 212 extends downwardly (e.g., in a direction away from the upper wall 108 of the housing 102 and toward the lower wall 202 of the housing 102) from both the central portion 208 and the peripheral portion 210 of the base 106. The filler 212 includes an example channel 1408 that increases the flexibility of the filler 212, and accordingly assists the filler 212 in moving the central portion 208 of the base 106 upwardly (e.g., in a direction moving from the lower wall 202 of the housing 102 toward the upper wall 108 of the housing 102) relative to the peripheral portion 210 of the base 106 in response to a force applied downwardly (e.g., in a direction moving from the upper wall 108 of the housing 102 toward the lower wall 202 of the housing 102) to the cap 104 and/or the upper wall 108 of the housing 102.

Figure 16:
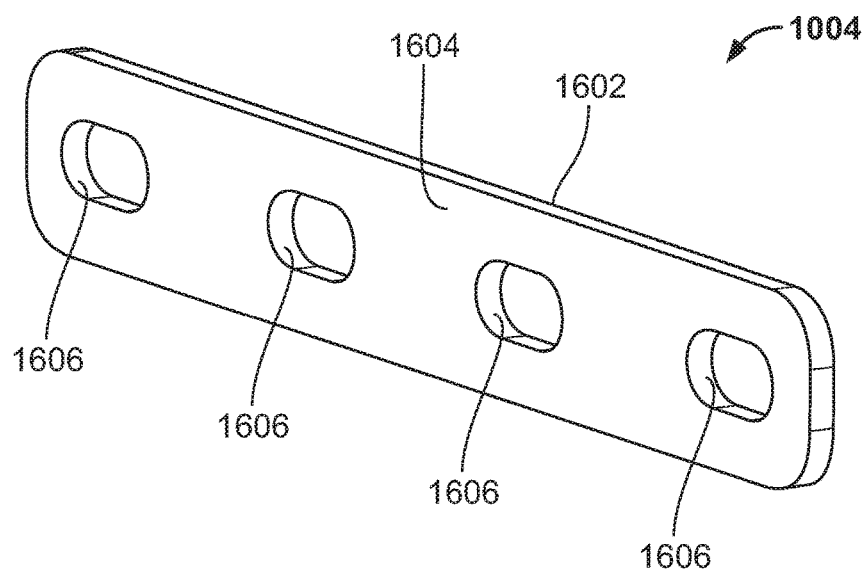
FIG. 16 is a perspective view of the first PSA layer of FIG. 10.

FIG. 16 further illustrates the first PSA layer 1004 of the temperature probe hub 100 of FIGS. 1-10. More specifically, FIG. 16 is a perspective view of the first PSA layer 1004 of FIG. 10. The first PSA layer 1004 includes an example first (e.g., lower) surface 1602, an example second (e.g., upper) surface 1604 located opposite the first surface 1602, and example drain pipe openings 1606 (e.g., through holes) extending through the first PSA layer 1004 from the first surface 1602 to the second surface 1604. The first surface 1602 and the second surface 1604 of the first PSA layer 1004 are coated with PSA that facilitates coupling and/or connecting (e.g., bonding) the first surface 1602 and the second surface 1604 of the first PSA layer 1004 to one or more other structure(s) and/or component(s) of the temperature probe hub 100.

The first surface 1602 of the first PSA layer 1004 of FIGS. 10 and 16 is configured to be coupled and/or connected (e.g., bonded via the PSA) to the interior surface 1104 of the base 106 of the temperature probe hub 100. The second surface 1604 of the first PSA layer 1004 of FIGS. 10 and 16 is configured to be coupled and/or connected (e.g., bonded via the PSA) to drain pipes formed by the chassis 1022 of the temperature probe hub 100, as further described below. In some examples, the first PSA layer 1004 reduces the ability of fluid passing through the drain pipes of the chassis 1022 into the drain outlets 214 of the base 106 from leaking into other internal areas, regions and/or portions of the housing 102 of the temperature probe hub 100.

The drain pipe openings 1606 of the first PSA layer 1004 correspond in number and spatial distribution to the drain outlets 214 of the base 106 described above. The drain pipe openings 1606 of the first PSA layer 1004 further correspond in number and spatial distribution to the drain pipes of the chassis 1022, as further described below. The drain pipe openings 1606 of the first PSA layer 1004 are configured to align with the drain outlets 214 of the base 106 and/or the drain pipes of the chassis 1022. As further described below in connection with FIGS. 46-51, each of the drain pipe openings 1606 of the first PSA layer 1004 circumscribes a corresponding one of the drain pipes of the chassis 1022, and/or is in fluid communication with a corresponding one of the drain outlets 214 of the base 106.

Figure 17:
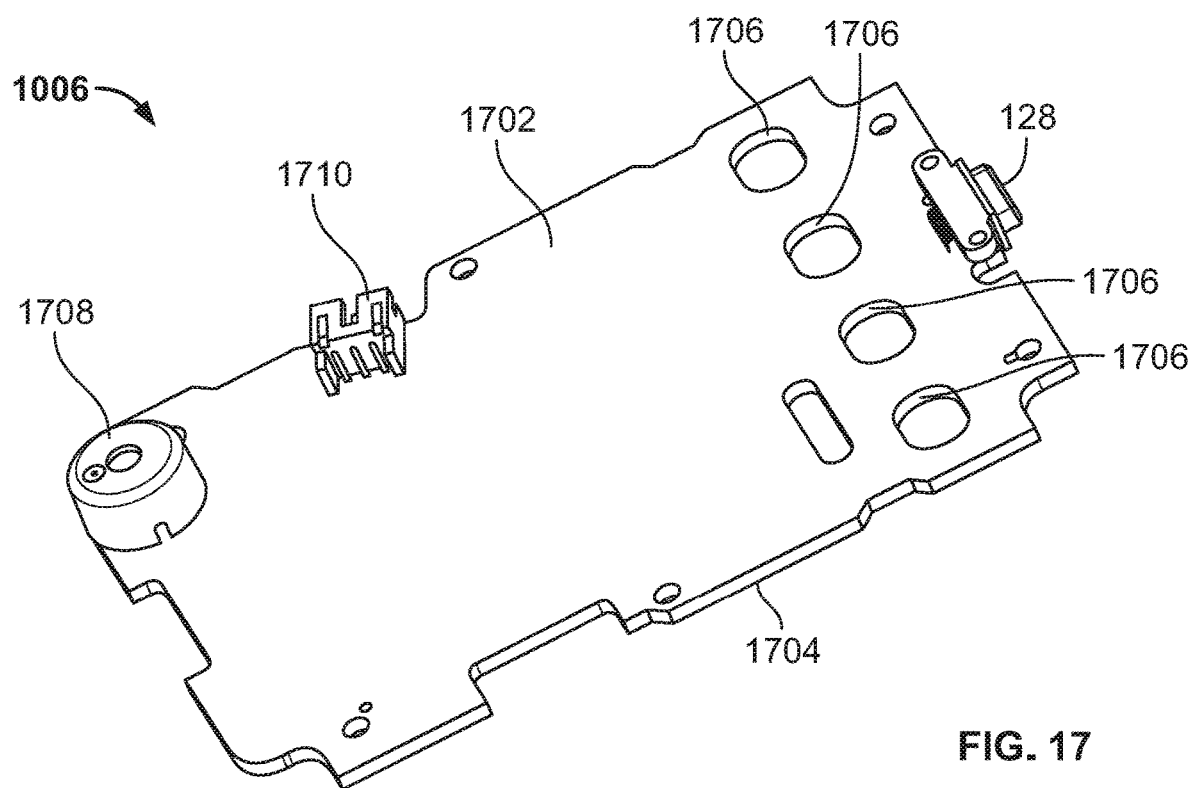
FIG. 17 is a first perspective view of the main board of FIG. 10.
Figure 18:
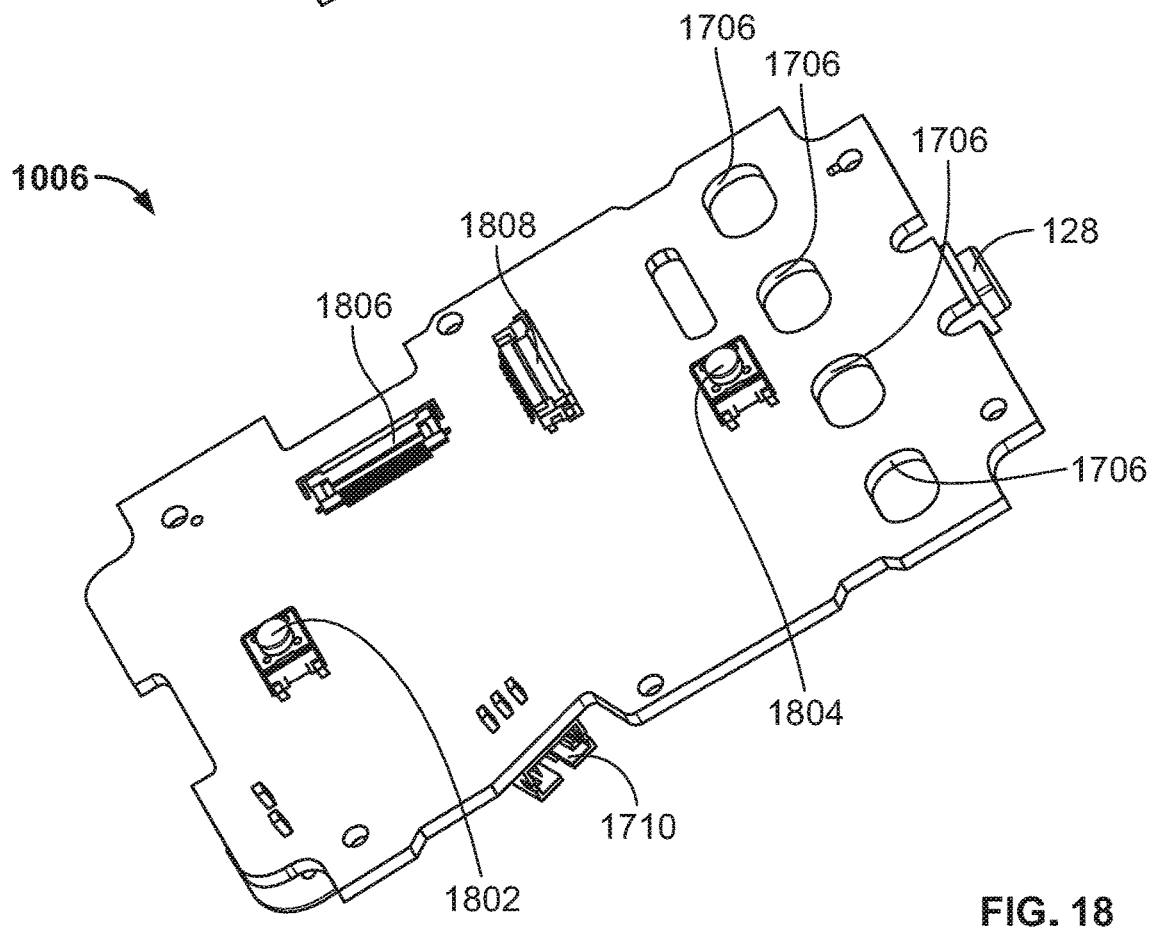
FIG. 18 is a second perspective view of the main board of FIGS. 10 and 17.
Figure 19:
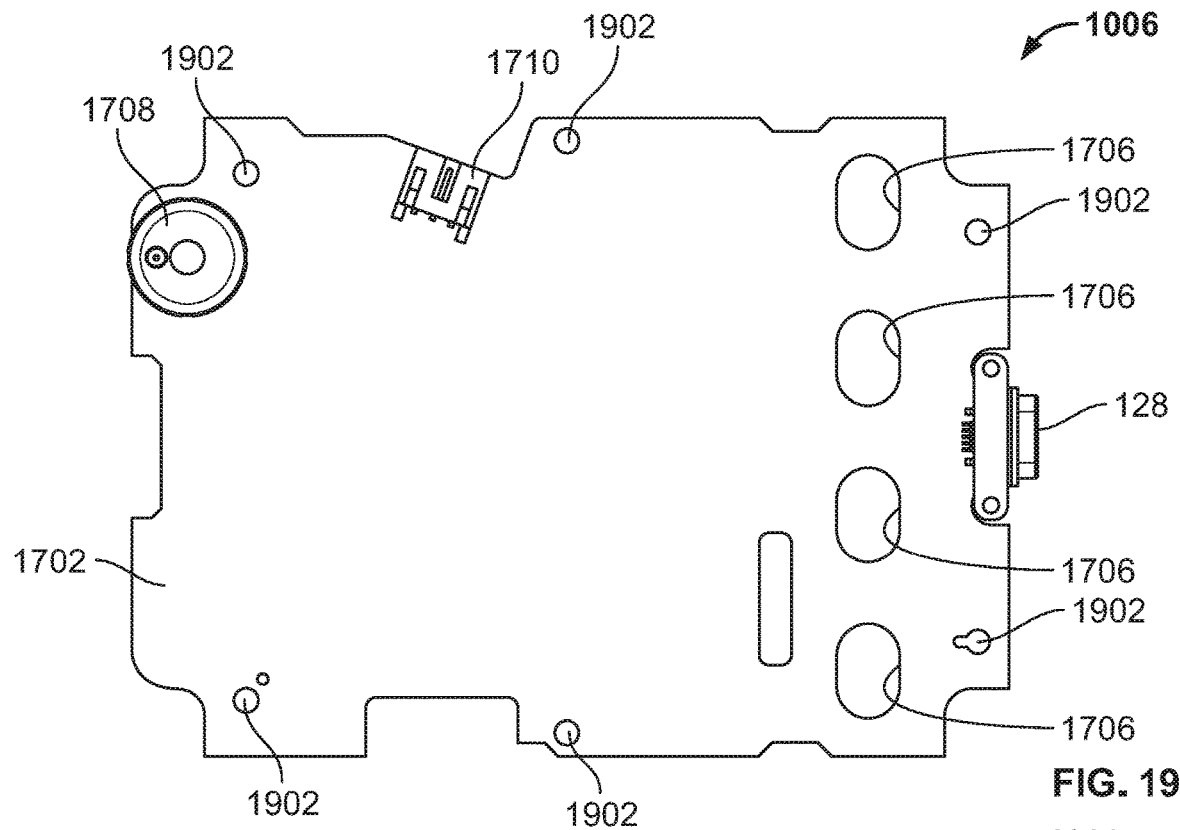
FIG. 19 a top view of the main board of FIGS. 10, 17 and 18.
Figure 20:
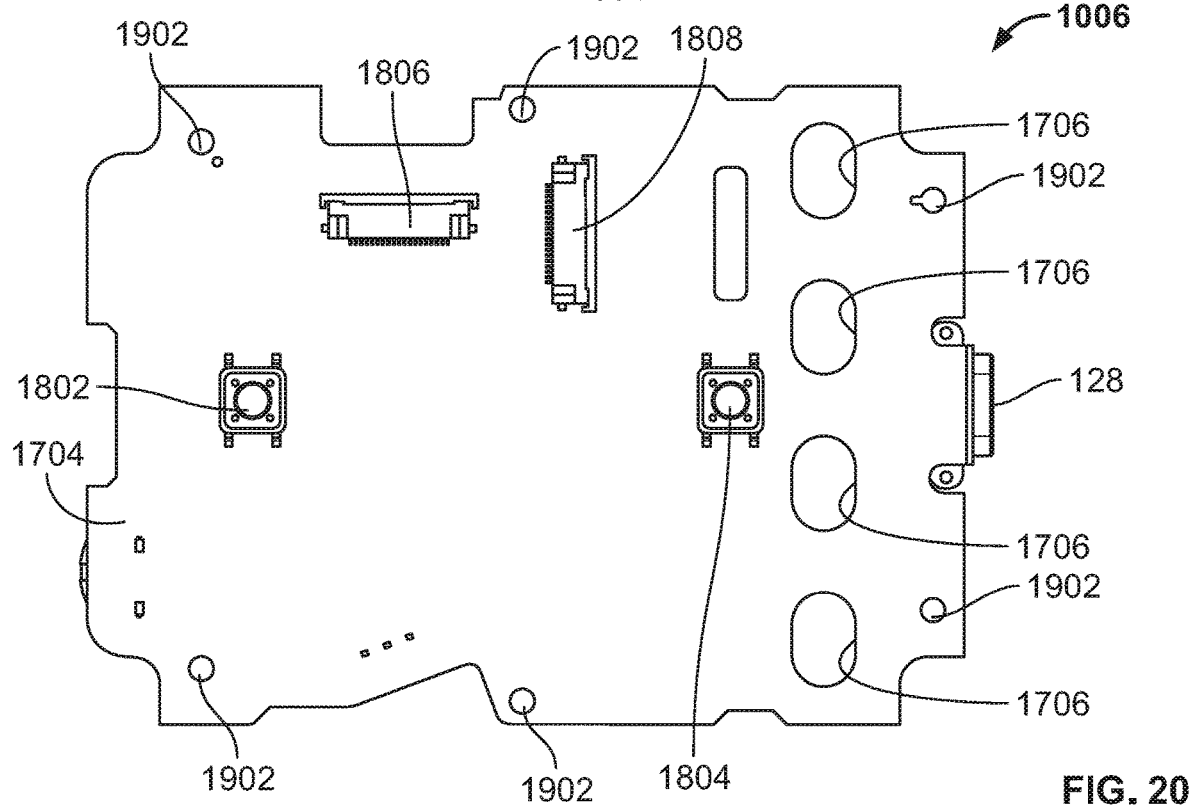
FIG. 20 is a bottom view of the main board of FIGS. 10 and 17-19.

FIGS. 17-20 further illustrate the main board 1006 of FIG. 10. More specifically, FIG. 17 is a first perspective view of the main board 1006 of FIG. 10. FIG. 18 is a second perspective view of the main board 1006 of FIGS. 10 and 17. FIG. 19 a top view of the main board 1006 of FIGS. 10, 17 and 18. FIG. 20 is a bottom view of the main board 1006 of FIGS. 10 and 17-19. The main board 1006 includes an example first (e.g., upper) surface 1702, an example second (e.g., lower) surface 1704 located opposite the first surface 1702, example drain pipe openings 1706 (e.g., through holes) extending through the main board 1006 from the first surface 1702 to the second surface 1704, and example fastener openings 1902 extending through the main board 1006 from the first surface 1702 to the second surface 1704. Each one of the fastener openings 1902 of the main board 1006 is configured to receive a corresponding one of the third fasteners 1032 of the temperature probe hub 100, as further described below.

The drain pipe openings 1706 of the main board 1006 correspond in number and spatial distribution to the drain outlets 214 of the base 106 and the drain pipe openings 1606 of the first PSA layer 1004, as described above. The drain pipe openings 1706 of the main board 1006 further correspond in number and spatial distribution to the drain pipes of the chassis 1022, as further described below. The drain pipe openings 1706 of the main board 1006 are configured to align with the drain outlets 214 of the base 106, the drain pipe openings 1606 of the first PSA layer 1004, and/or the drain pipes of the chassis 1022. As further described below in connection with FIGS. 46-51, each of the drain pipe openings 1706 of the main board 1006 circumscribes a corresponding one of the drain pipes of the chassis 1022.

One or more electronic component(s) (e.g., processor(s), microprocessor(s), controller(s), microcontroller(s), transmitter(s), receiver(s), sensor(s), memory device(s), circuit(s), etc.) is/are mounted on and/or connected to the first surface 1702 and/or the second surface 1704 of the main board 1006. For example, as shown in FIGS. 17-20, an example speaker 1708, an example battery cable connector 1710, and the micro USB jack 128 are mounted on and/or connected to the first surface 1702 of the main board 1006. The speaker 1708 is configured to present audible information associated with use and/or maintenance of the temperature probe hub 100. The battery cable connector 1710 is configured to receive a first end of a battery cable of the battery 1008 of FIG. 10 to operatively couple the battery 1008 to the main board 1006. The micro USB jack 128 is configured to receive a micro USB cable to facilitate charging and/or recharging the battery 1008 of FIG. 10.

As further shown in FIGS. 17-20, an example control button 1802, an example reset button 1804, a first example ribbon cable connector 1806, and a second example ribbon cable connector 1808 are mounted on and/or connected to the second surface 1704 of the main board 1006. The control button 1802 is configured to be actuated (e.g., via movement of the central portion 208 of the base 106 relative to the peripheral portion 210 of the base 106, as described above) to power on and/or power off the temperature probe hub 100, and/or to cause the above-described light-emitting and/or light projecting devices of the temperature probe hub 100 to present data and/or information associated with a different one of the probe jacks 118 of the temperature probe hub 100. The reset button 1804 is configured to be actuated (e.g., via insertion of a pin in the reset opening 216 of the base 106, as described above) to cause the temperature probe hub 100 (including the electronic components thereof) to reset and/or restart (e.g., to power off and subsequently power back on according to a reset and/or restart protocol). The first ribbon cable connector 1806 is configured to receive a first end of the first ribbon cable 1014 of FIG. 10 to facilitate operatively coupling the display board 1012 of FIG. 10 to the main board 1006. The second ribbon cable connector 1808 is configured to receive a first end of the second ribbon cable 1018 of FIG. 10 to facilitate operatively coupling the probe jack board 1016 of FIG. 10 to the main board 1006.

In some examples, an accelerometer is mounted on and/or connected to the first surface 1702 or the second surface 1704 of the main board 1006. In such examples, the accelerometer of the temperature probe hub 100 can be configured to sense, measure and/or detect the orientation of the main board 1006 and/or, more generally, the orientation of the temperature probe hub 100 relative to the Earth's surface. In some such examples, data sensed, measured and/or detected by the accelerometer may be utilized to determine a display orientation associated with cooking status information to be presented via the display 1010 of FIG. 10, as further described below.

In some examples, one or more communication module(s) (e.g., a Wi-Fi module, a Bluetooth module, etc.) is/are mounted on and/or connected to the first surface 1702 or the second surface 1704 of the main board 1006. In such examples, the communication module(s) of the temperature probe hub 100 can be configured to transmit and/or receive data (e.g., cooking status information) to and/or from a remotely located computing and/or communication device (e.g., a smartphone, a tablet, a laptop computer, a desktop computer, a server, a wireless access point, etc.).

In the illustrated example of FIG. 10, the battery 1008 is a rechargeable battery that is configured to be charged and/or recharged via the micro USB jack 128, as described above. The battery 1008 of FIG. 10 is configured to power one or more electronic component(s) and/or processing board(s) of the temperature probe hub 100 including, for example, the main board 1006, the display board 1012, and the probe jack board 1016 of the temperature probe hub 100, and electronic components mounted thereon and/or connected thereto.

Figure 21:
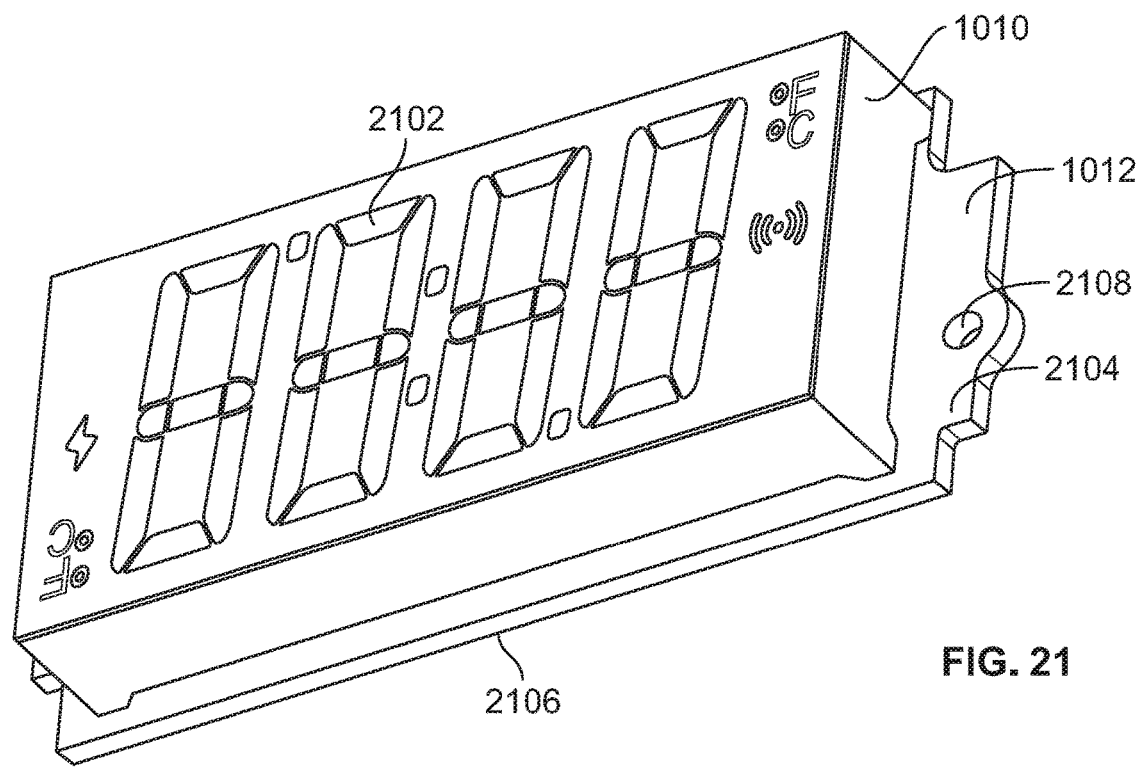
FIG. 21 is a first perspective view of the display amounted on the display board of FIG. 10.
Figure 22:
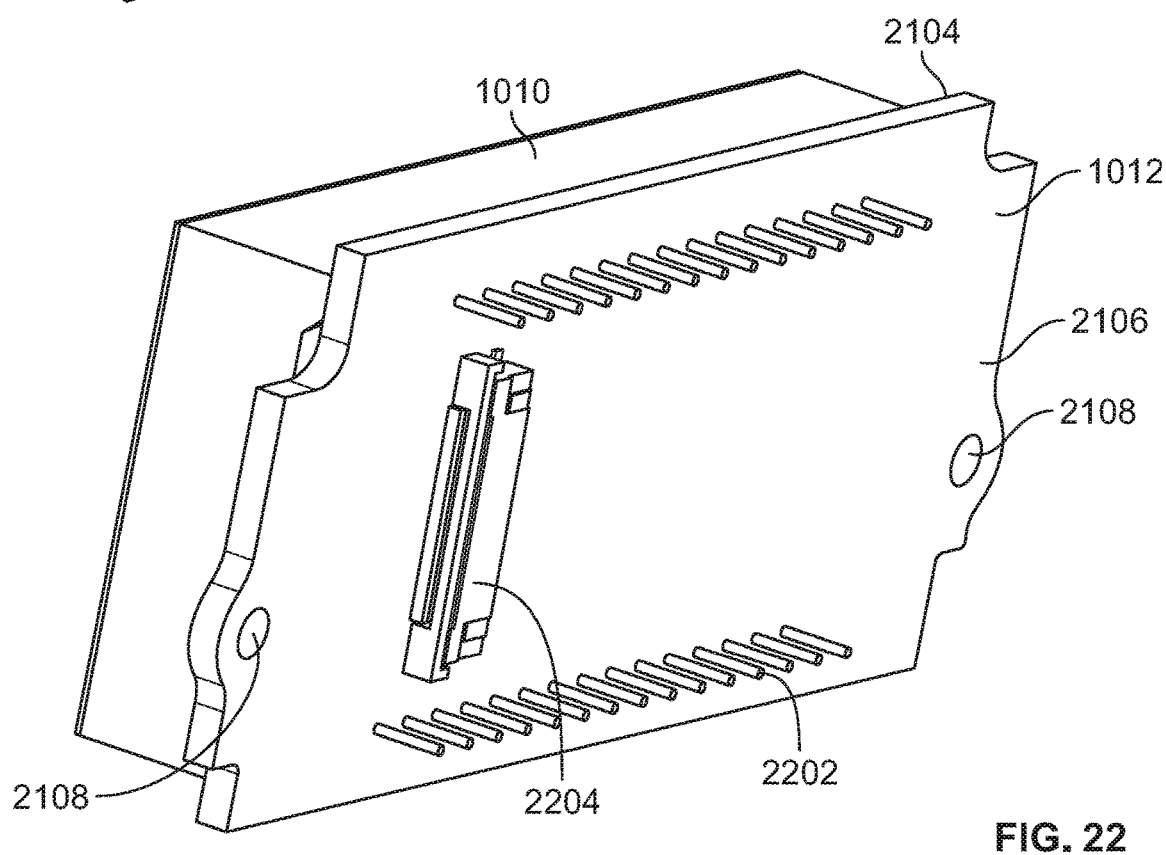
FIG. 22 is a second perspective view of the display mounted on the display board of FIGS. 10 and 21.
Figure 23:
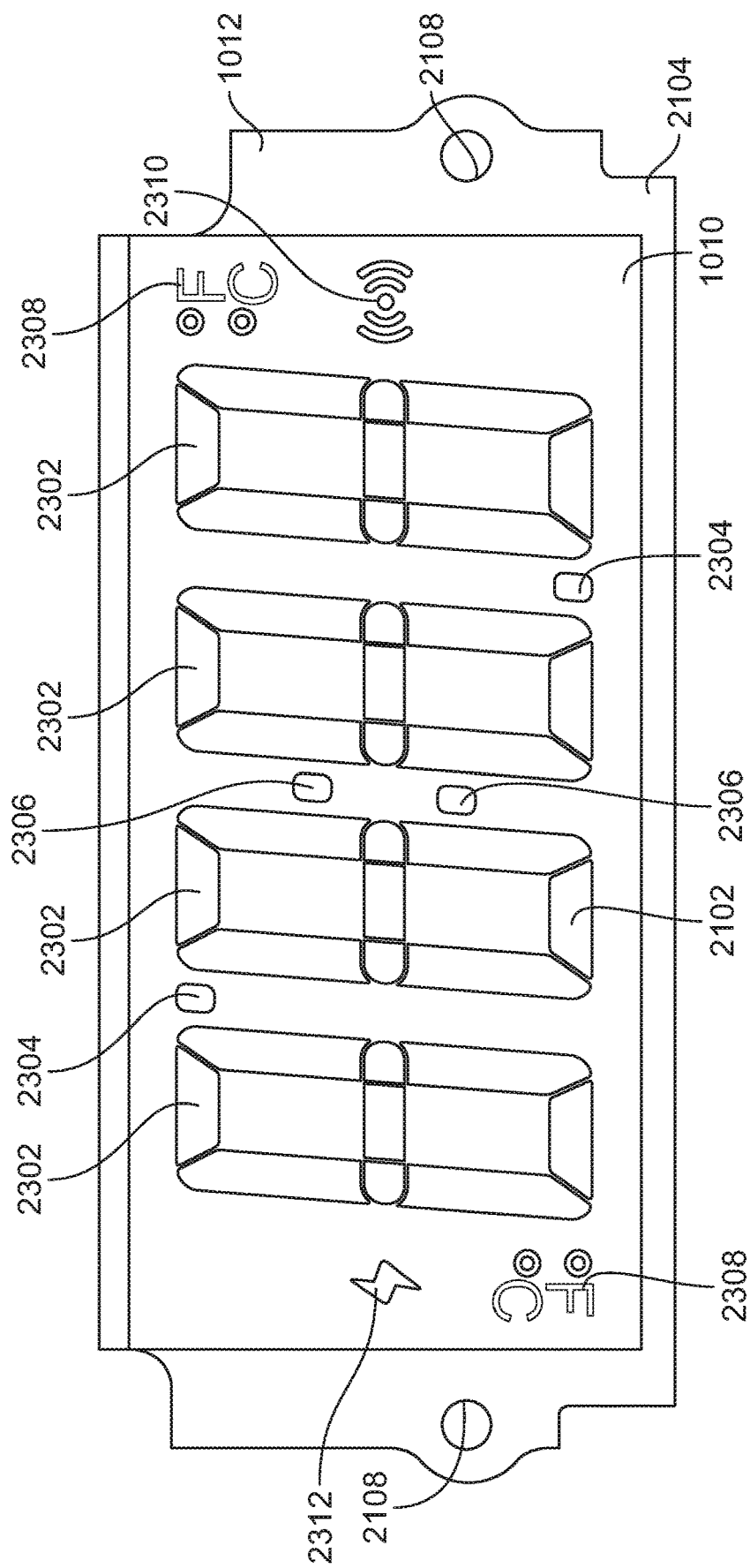
FIG. 23 is a top view of the display mounted on the display board of FIGS. 10, 21 and 22.

FIGS. 21-23 further illustrate the display 1010 and the display board 1012 of FIG. 10. More specifically, FIG. 21 is a first perspective view of the display 1010 mounted on the display board 1012 of FIG. 10. FIG. 22 is a second perspective view of the display 1010 mounted on the display board 1012 of FIGS. 10 and 21. FIG. 23 is a top view of the display 1010 mounted on the display board 1012 of FIGS. 10, 21 and 22. The display 1010 includes an example display interface 2102. The display board 1012 includes an example first (e.g., upper) surface 2104, an example second (e.g., lower) surface 2106 located opposite the first surface 2104, and example fastener openings 2108 (e.g., through holes) extending through the display board 1012 from the first surface 2104 to the second surface 2106. Each one of the fastener openings 2108 of the display board 1012 is configured to receive a corresponding one of the first fasteners 1028 of the temperature probe hub 100, as further described below.

The display 1010 is positioned and/or located on the first surface 2104 of the display board 1012. As shown in FIG. 22, the display 1010 is mounted on and/or connected to the display board 1012 via example data pins 2202 that extend from the display 1010 through the display board 1012. The display board 1012 further includes an example ribbon cable connector 2204 mounted on and/or connected to the second surface 2106 of the display board 1012. The ribbon cable connector 2204 is configured to receive a second end of the first ribbon cable 1014 of FIG. 10 to facilitate operatively coupling the display board 1012 of FIG. 10 to the main board 1006. As described above, the first end of the first ribbon cable 1014 of FIG. 10 is configured to be connected to the first ribbon cable connector 1806 of the main board 1006. The first ribbon cable 1014 operatively couples the display board 1012 to the main board 1006 when the first end of the first ribbon cable 1014 is connected to the first ribbon cable connector 1806 of the main board 1006 and the second end of the first ribbon cable 1014 is connected to the ribbon cable connector 2204 of the display board 1012.

The display interface 2102 of the display 1010 is configured to present visual information (e.g., cooking status information, connectivity status information, battery status information, etc.) to a user. As shown in FIG. 23, the display interface 2102 of the display 1010 includes four example numeric outputs 2302, two example decimal outputs 2304, an example colon output 2306, two example temperature unit outputs 2308, an example connectivity status output 2310, and an example battery status output 2312, each of which is selectively displayable. Each of the four example numeric outputs 2302 has nine selectively-displayable segments.

The display 1010 is configured such that no more than one of the two decimal outputs 2304, and no more than one of the two temperature unit outputs 2308, will be displayed (e.g., illuminated) via the display interface 2102 at any given time. The display 1010 is further configured such that the decimal output(s) 2304 and the colon output 2306 will not be simultaneously displayed (e.g., illuminated) via the display interface 2102. For example, the decimal output(s) 2304 may be displayed in connection with the display interface 2102 of the display 1010 presenting food temperature information (e.g., a temperature of "140.5"), and the colon output 2306 may be displayed in connection with the display interface 2102 of the display 1010 presenting cooking time information (e.g., a remaining cooking time of "10:30").

The numeric outputs 2302, the decimal outputs 2304, the colon output 2306, and the temperature unit outputs 2308 of the display interface 2102 are respectively configured to enable the display interface 2102 and/or, more generally, the display 1010 to be multi-directional and/or reversible. For example, when the temperature probe hub 100 is positioned in a first orientation in which the second end wall 110 of the housing 102 is elevated above the first end wall 204 of the housing 102, the display 1010 causes the display interface 2102 to orient presented information in a first orientation (e.g., right side up and readable running left to right from the connectivity status output 2310 toward the battery status output 2312). When the temperature probe hub 100 is positioned in a second orientation in which the first end wall 204 of the housing 102 is elevated above the second end wall 110 of the housing 102, the display 1010 causes the display interface 2102 to orient presented information in a second orientation (e.g., right side up and readable running left to right from the battery status output 2312 toward the connectivity status output 2310) that is flipped and/or reversed relative to the first orientation described above. Information projected, presented and/or displayed by the display interface 2102 of the display 1010 is projected, presented and/or displayed at the first display region 122 of the cap 104 of the temperature probe hub 100.

Figure 24:
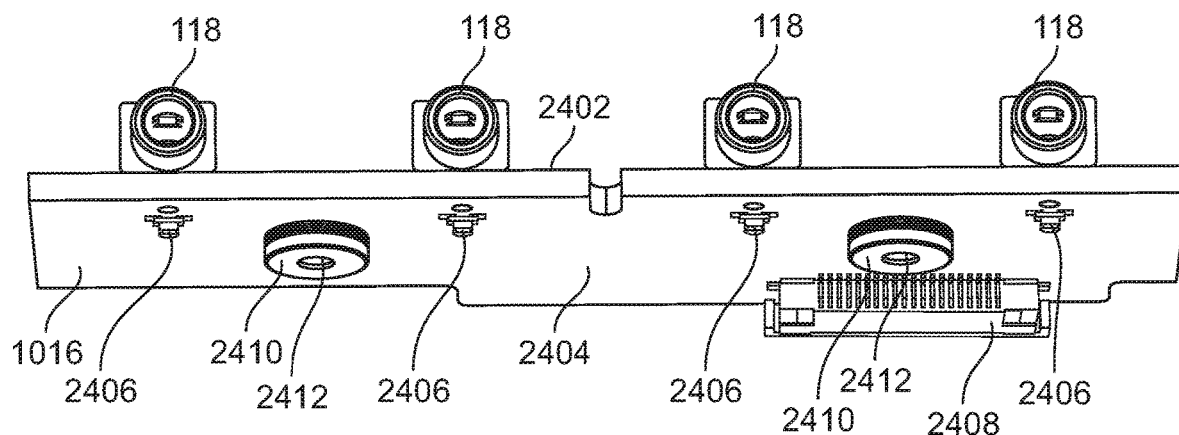
FIG. 24 is a first perspective view of the probe jacks mounted on the probe jack board of FIG. 10.
Figure 25:
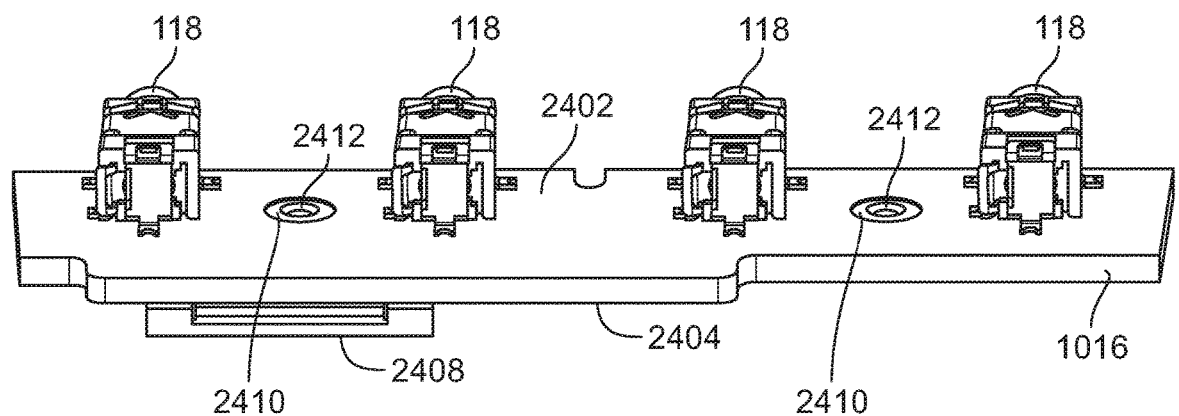
FIG. 25 is a second perspective view of the probe jacks mounted on the probe jack board of FIGS. 10 and 24.

FIGS. 24 and 25 further illustrate the probe jacks 118 mounted on the probe jack board 1016 of FIG. 10. More specifically, FIG. 24 is a first perspective view of the probe jacks 118 mounted on the probe jack board 1016 of FIG. 10. FIG. 25 is a second perspective view of the probe jacks 118 mounted on the probe jack board 1016 of FIGS. 10 and 24. The probe jack board 1016 includes an example first surface 2402 and an example second surface 2404 located opposite the first surface 2402. The probe jacks 118 are positioned and/or located on the first surface 2402 of the probe jack board 1016.

The probe jack board 1016 further includes example light-emitting diodes (LEDs) 2406 mounted on and/or connected to the second surface 2404 of the probe jack board 1016. The LEDs 2406 correspond in number and spatial distribution to the probe jacks 118. In some examples, each of the LEDs 2406 is configured to illuminate in response to a probe jack being inserted into a corresponding one of the probe jacks 118 aligned with the one of the LEDs 2406. In other examples, each of the LEDs 2406 is additionally or alternatively configured to illuminate in response to an instruction and/or command provided by the probe jack board 1016.

The probe jack board 1016 further includes an example ribbon cable connector 2408 mounted on and/or connected to the second surface 2404 of the probe jack board 1016. The ribbon cable connector 2408 is configured to receive a second end of the second ribbon cable 1018 of FIG. 10 to facilitate operatively coupling the probe jack board 1016 of FIG. 10 to the main board 1006. As described above, the first end of the second ribbon cable 1018 of FIG. 10 is configured to be connected to the second ribbon cable connector 1808 of the main board 1006. The second ribbon cable 1018 operatively couples the probe jack board 1016 to the main board 1006 when the first end of the second ribbon cable 1018 is connected to the second ribbon cable connector 1808 of the main board 1006 and the second end of the second ribbon cable 1018 is connected to the ribbon cable connector 2408 of the probe jack board 1016.

The probe jack board 1016 further includes example swage nuts 2410 mounted on and/or connected to the second surface 2404 of the probe jack board 1016. Each one of the swage nuts 2410 of the probe jack board 1016 is configured to receive a corresponding one of the second fasteners 1030 of the temperature probe hub 100, as further described below. In the illustrated example of FIGS. 24 and 25, the probe jack board 1016 includes two swage nuts 2410. In other examples, the probe jack board 1016 can include a different number (e.g., 1, 3, etc.) of swage nuts 2410.

The probe jack board 1016 further includes example fastener openings 2412 (e.g., through holes) extending through the probe jack board 1016 from the first surface 2402 to the second surface 2404, with each of the fastener openings 2412 additionally extending through a corresponding one of the swage nuts 2410 of the probe jack board 1016. Thus, the fastener openings 2412 of the probe jack board 1016 correspond in number and spatial distribution to the swage nuts 2410 of the probe jack board 1016. Each one of the fastener openings 2412 of the probe jack board 1016 is configured to receive a corresponding one of the second fasteners 1030 of the temperature probe hub 100, as further described below.

Figure 26:
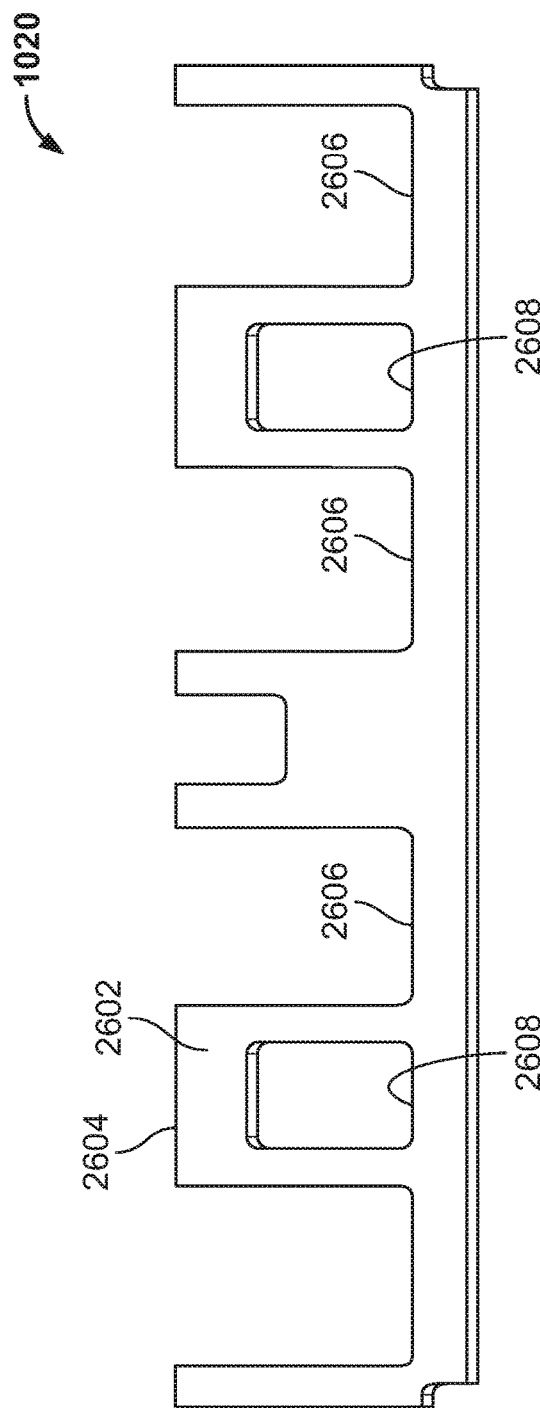
FIG. 26 is a first perspective view of the second PSA layer of FIG. 10.
Figure 27:
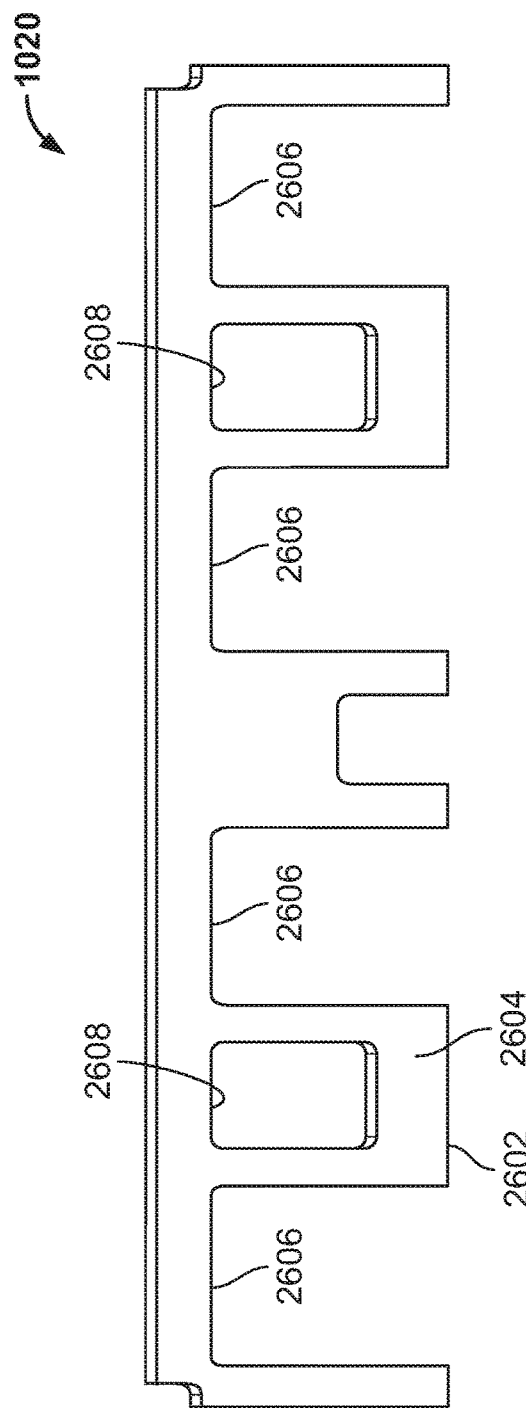
FIG. 27 is a second perspective view of the second PSA layer of FIGS. 10 and 26.

FIGS. 26 and 27 further illustrate the second PSA layer 1020 of FIG. 10. More specifically, FIG. 26 is a first perspective view of the second PSA layer 1020 of FIG. 10. FIG. 27 is a second perspective view of the second PSA layer 1020 of FIGS. 10 and 26. The second PSA layer 1020 includes an example first surface 2602, an example second surface 2604 located opposite the first surface 2602, example probe jack receptacle cutouts 2606 extending through the second PSA layer 1020 from the first surface 2602 to the second surface 2604, and example fastener openings 2608 (e.g., through holes) extending through the second PSA layer 1020 from the first surface 2602 to the second surface 2604. The first surface 2602 and the second surface 2604 of the second PSA layer 1020 are coated with PSA that facilitates coupling and/or connecting (e.g., bonding) the first surface 2602 and the second surface 2604 of the second PSA layer 1020 to one or more other structure(s) and/or component(s) of the temperature probe hub 100.

The first surface 2602 of the second PSA layer 1020 of FIGS. 10, 26 and 27 is configured to be coupled and/or connected (e.g., bonded via the PSA) to the first surface 2402 of the probe jack board 1016 of the temperature probe hub 100. The second surface 2604 of the second PSA layer 1020 of FIGS. 10, 26 and 27 is configured to be coupled and/or connected (e.g., bonded via the PSA) to probe jack receptacles formed by the chassis 1022 of the temperature probe hub 100, as further described below. In some examples, the second PSA layer 1020 reduces the ability of fluid passing through the probe jack receptacles of the chassis 1022 from leaking into other internal areas, regions and/or portions of the housing 102 of the temperature probe hub 100.

The probe jack receptacle cutouts 2606 of the second PSA layer 1020 correspond in number and spatial distribution to the probe jacks 118 mounted on and/or connected to the probe jack board 1016, as described above. The probe jack receptacle cutouts 2606 of the second PSA layer 1020 further correspond in number and spatial distribution to the probe jack receptacles of the chassis 1022, as further described below. The probe jack receptacle cutouts 2606 of the second PSA layer 1020 are configured to align with the probe jacks 118 of the probe jack board 1016 and/or the probe jack receptacles of the chassis 1022. The fastener openings 2608 of the second PSA layer 1020 correspond in number and spatial distribution to the fastener openings 2412 of the probe jack board 1016, as described above. The fastener openings 2608 of the second PSA layer 1020 are configured to align with the fastener openings 2412 of the probe jack board 1016.

Figure 28:
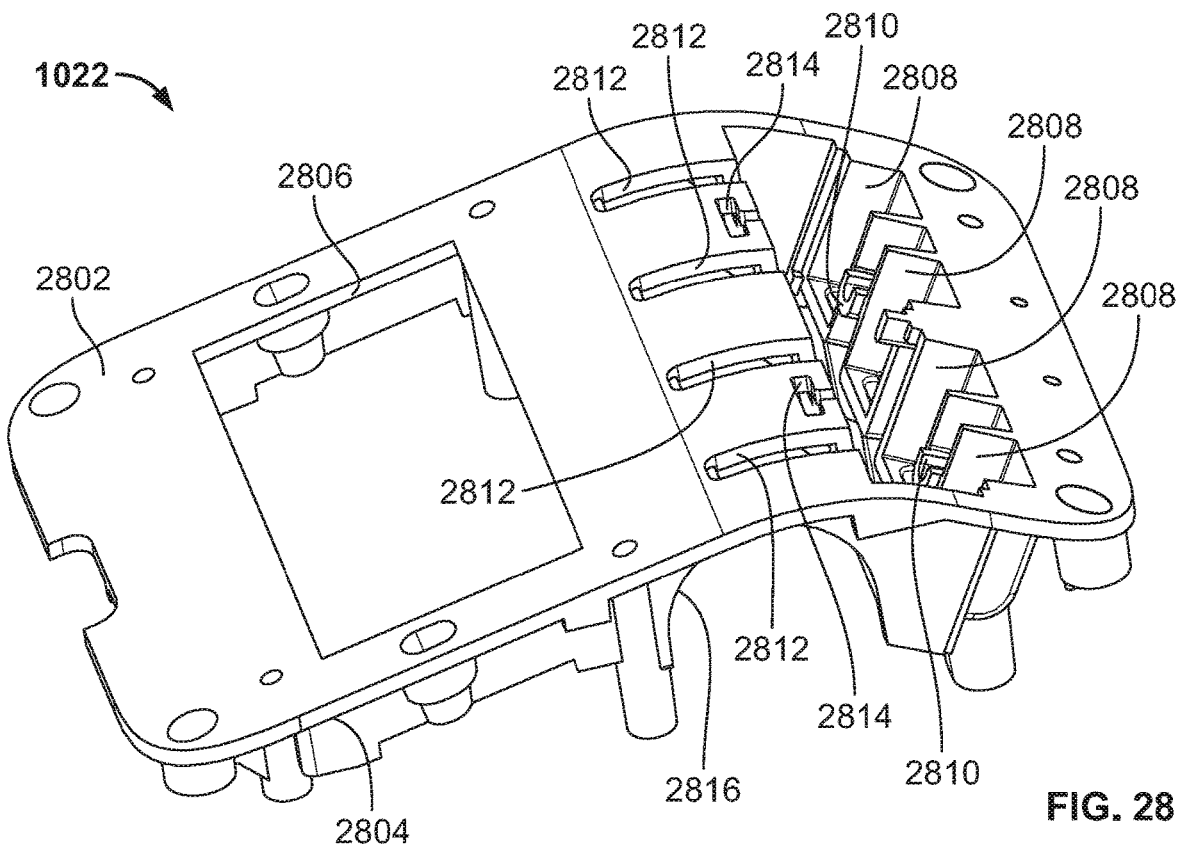
FIG. 28 is a first perspective view of the chassis of FIG. 10.
Figure 29:
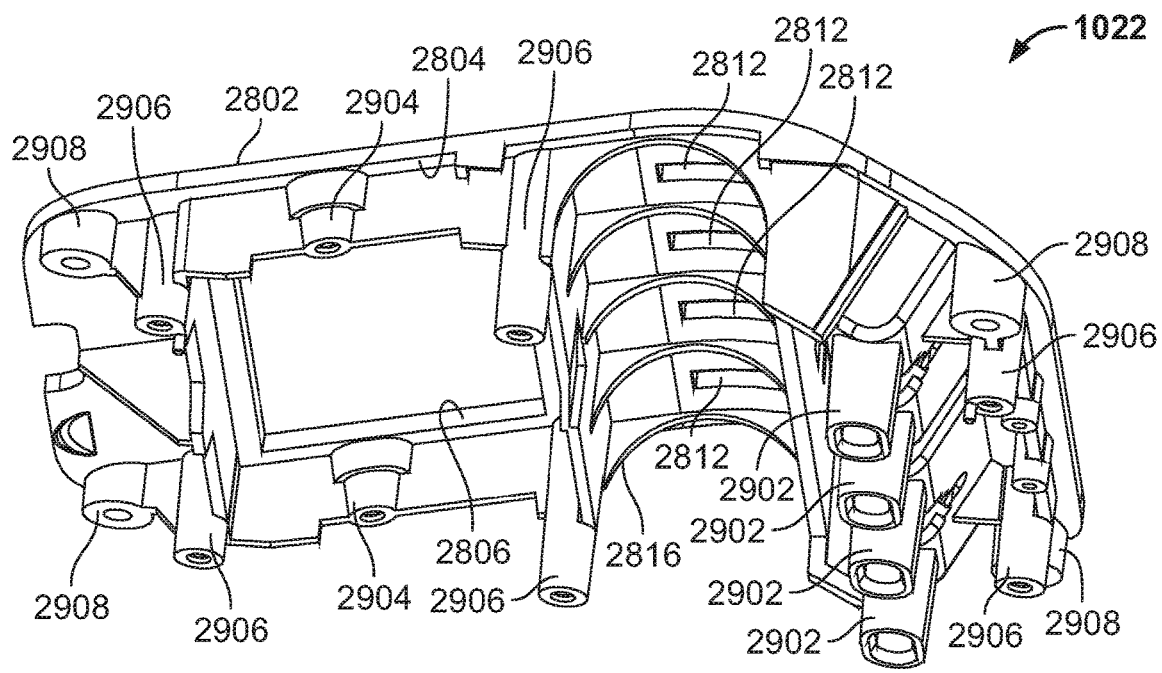
FIG. 29 is a second perspective view of the chassis of FIGS. 10 and 28.
Figure 30:
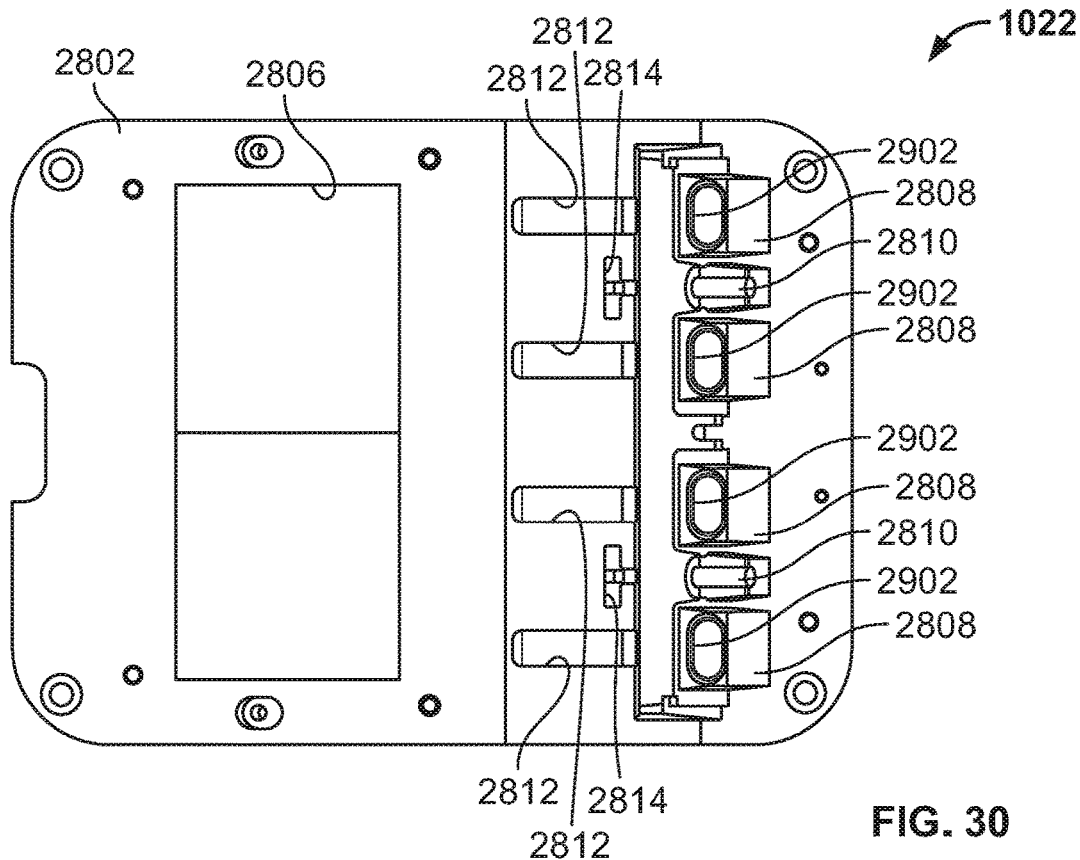
FIG. 30 is a top view of the chassis of FIGS. 10, 28 and 29.
Figure 31:
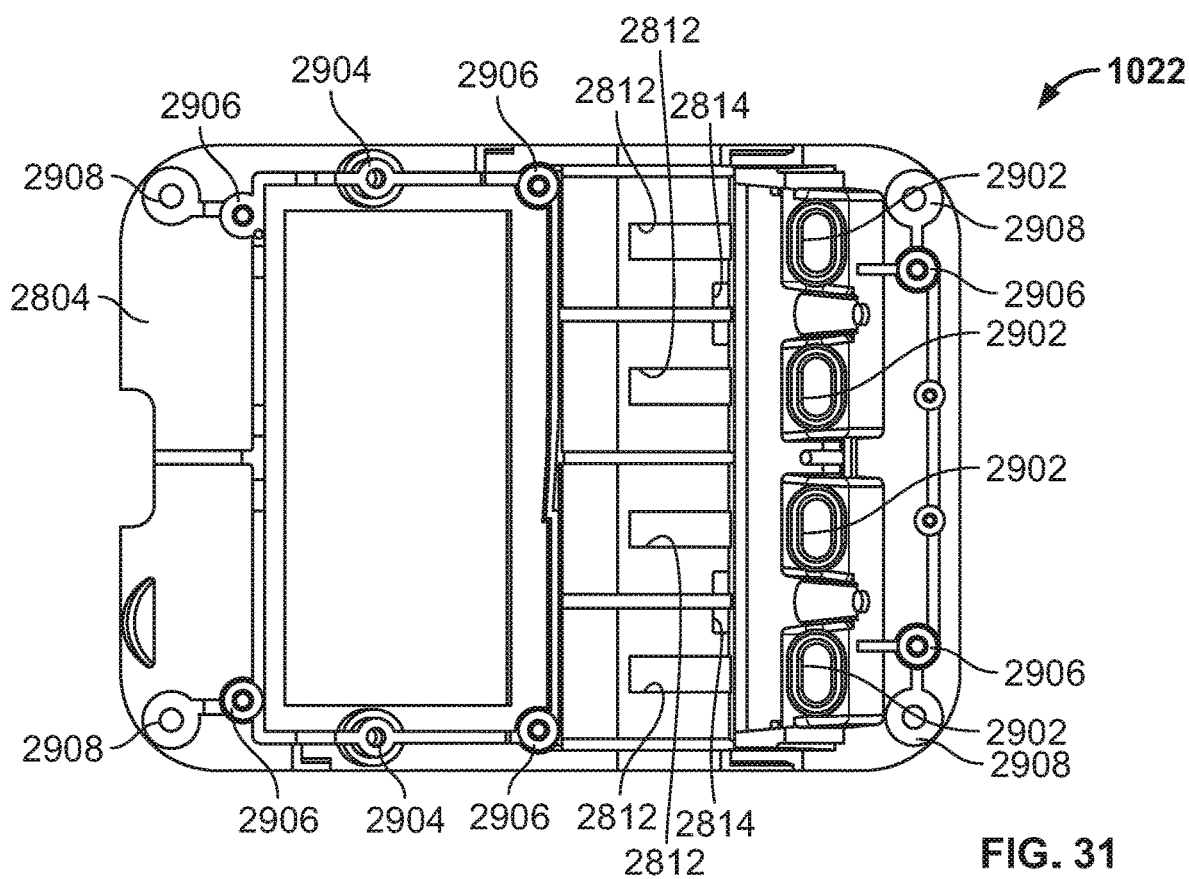
FIG. 31 is a bottom view of the chassis of FIGS. 10 and 28-30.
Figure 32:
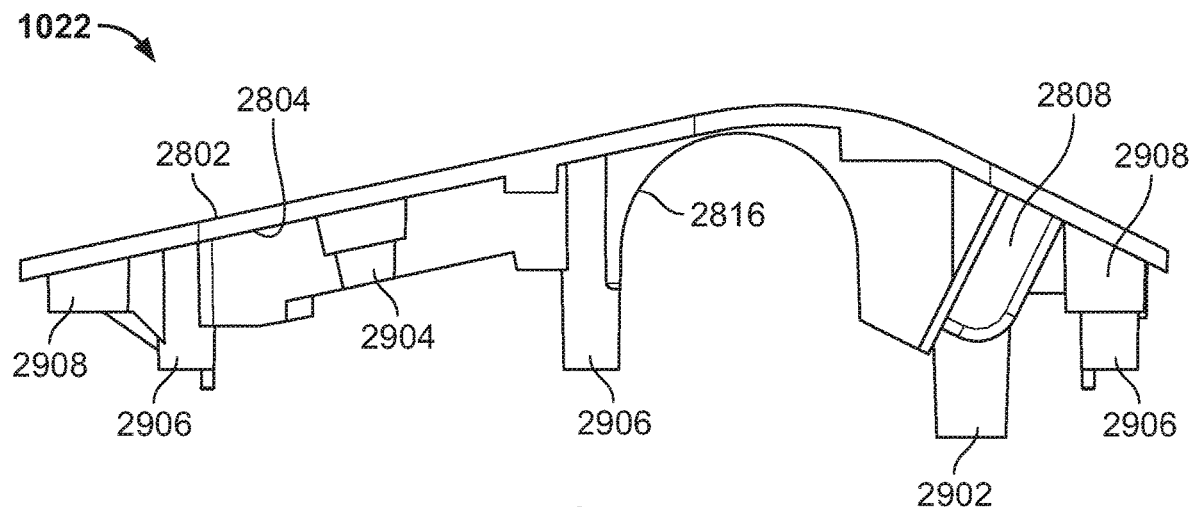
FIG. 32 is a side view of the chassis of FIGS. 10 and 28-31.
Figure 33:
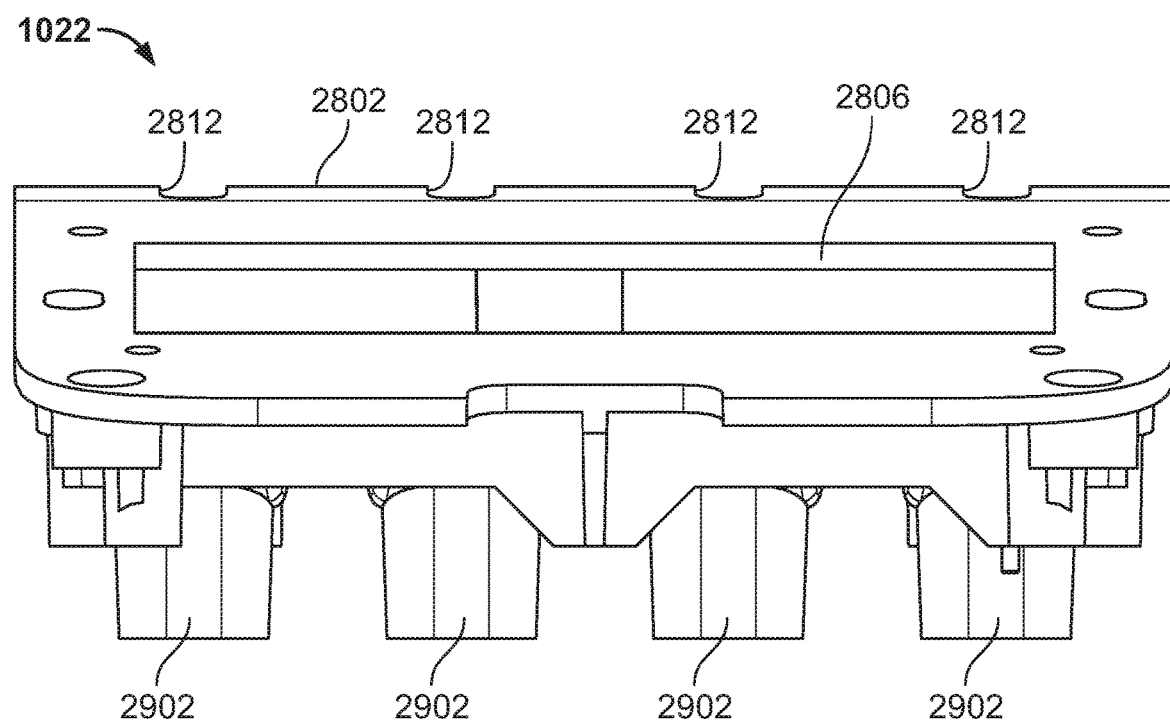
FIG. 33 is an end view of the chassis of FIGS. 10 and 28-32.

FIGS. 28-33 further illustrate the chassis 1022 of FIG. 10. More specifically, FIG. 28 is a first perspective view of the chassis 1022 of FIG. 10. FIG. 29 is a second perspective view of the chassis 1022 of FIGS. 10 and 28. FIG. 30 is a top view of the chassis 1022 of FIGS. 10, 28 and 29. FIG. 31 is a bottom view of the chassis 1022 of FIGS. 10 and 28-30. FIG. 32 is a side view of the chassis 1022 of FIGS. 10 and 28-31. FIG. 33 is an end view of the chassis 1022 of FIGS. 10 and 28-32. The chassis 1022 includes an example first (e.g., upper) surface 2802, an example second (e.g., lower) surface 2804 located opposite the first surface 2802, and an example display opening 2806 (e.g., a through hole) extending through the chassis 1022 from the first surface 2802 to the second surface 2804. The display opening 2806 of the chassis 1022 corresponds in spatial location to the display 1010, as described above. The display opening 2806 of the chassis 1022 is configured to align with and/or to receive the display 1010. For example, the display opening 2806 of the chassis 1022 can circumscribe the display 1010.

The chassis 1022 further includes example probe jack receptacles 2808 extending downwardly from the second surface 2804 of the chassis 1022. The probe jack receptacles 2808 of the chassis 1022 correspond in number and spatial distribution to the probe jacks 118 connected to the probe jack board 1016, as described above. For example, each one of the probe jack receptacles 2808 of the chassis 1022 is configured to align with and/or to receive a corresponding one of the probe jacks 118 connected to the probe jack board 1016. The probe jack receptacles 2808 of the chassis 1022 further correspond in number and spatial distribution to the probe jack openings 116 and/or drain inlets 120 of the cap 104, as described above. The probe jack receptacles 2808 of the chassis 1022 are configured to align with and/or to be in fluid communication with the probe jack openings 116 and/or drain inlets 120 of the cap 104, and/or the probe jacks 118 connected to the probe jack board 1016.

The chassis 1022 further includes example fastener supports 2810 formed in the chassis 1022 at a location below the second surface 2804 of the chassis 1022. The fastener supports 2810 of the chassis 1022 correspond in number and spatial distribution to the swage nuts 2410 connected to the probe jack board 1016, as described above. For example, each one of the fastener supports 2810 is configured to align with a corresponding one of the swage nuts 2410 connected to the probe jack board 1016. Furthermore, each one of the fastener supports 2810 of the chassis 1022 is configured to receive a corresponding one of the second fasteners 1030 of the temperature probe hub 100, as further described below. In the illustrated example of FIGS. 28-33, the chassis 1022 includes two fastener supports 2810. In other examples, the chassis 1022 can include a different number (e.g., 1, 3, 4, etc.) of fastener supports 2810.

The chassis 1022 further includes example light pipe leg openings 2812 (e.g., through holes) extending through the chassis 1022 from the first surface 2802 to the second surface 2804. The light pipe leg openings 2812 of the chassis 1022 correspond in number and spatial distribution to legs of the light pipe 1024 of FIG. 10, as further described below. The light pipe leg openings 2812 of the chassis 1022 are configured to align with and/or to receive legs of the light pipe 1024 of FIG. 10, as further described below. For example, each one of the light pipe leg openings 2812 of the chassis 1022 can circumscribe a corresponding one of the legs of the light pipe 1024.

The chassis 1022 further includes example light pipe arm openings 2814 (e.g., through holes) extending through the chassis 1022 from the first surface 2802 to the second surface 2804. The light pipe arm openings 2814 of the chassis 1022 correspond in number and spatial distribution to arms of the light pipe 1024 of FIG. 10, as further described below. The light pipe arm openings 2814 of the chassis 1022 are configured to align with and/or to receive arms of the light pipe 1024 of FIG. 10, as further described below. For example, each one of the light pipe arm openings 2814 of the chassis 1022 can circumscribe a corresponding one of the arms of the light pipe 1024.

The chassis 1022 further includes an example battery support 2816 extending downwardly from the second surface 2804 of the chassis 1022. The battery support 2816 of the chassis 1022 is configured to receive the battery 1008 of FIG. 10, and is further configured to support, hold, and/or otherwise fix the location of the battery 1008 relative to the chassis 1022 and/or within the housing 102 of the temperature probe hub 100.

The chassis 1022 further includes example drain pipes 2902 extending downwardly from the probe jack receptacles 2808 of the chassis 1022. The drain pipes 2902 of the chassis 1022 correspond in number and spatial distribution to the probe jack receptacles 2808 of the chassis, as described above. The drain pipes 2902 of the chassis 1022 further correspond in number and spatial distribution to the probe jack openings 116 and/or drain inlets 120 of the cap 104, to the probe jacks 118 connected to the probe jack board 1016, to the drain pipe openings 1706 of the main board 1006, to the drain pipe openings 1606 of the first PSA layer 1004, and/or to the drain outlets 214 of the base 106, as described above. The drain pipes 2902 of the chassis 1022 are configured to align with and/or to be in fluid communication with the probe jack openings 116 and/or drain inlets 120 of the cap 104, the probe jacks 118 connected to the probe jack board 1016, the drain pipe openings 1706 of the main board 1006, the drain pipe openings 1606 of the first PSA layer 1004, and/or the drain outlets 214 of the base 106.

The chassis 1022 further includes first example bosses 2904, second example bosses 2906, and third example bosses 2908, all extending downwardly from the second surface 2804 of the chassis 1022. Each one of the first bosses 2904 of the chassis 1022 is configured to receive a corresponding one of the first fasteners 1028 of the temperature probe hub 100, as further described below. In the illustrated example of FIGS. 28-33, the chassis 1022 includes two first bosses 2904. In other examples, the chassis 1022 can include a different number (e.g., 1, 3, 4, etc.) of first bosses 2904. Each one of the second bosses 2906 of the chassis 1022 is configured to receive a corresponding one of the third fasteners 1032 of the temperature probe hub 100, as further described below. In the illustrated example of FIGS. 28-33, the chassis 1022 includes six second bosses 2906. In other examples, the chassis 1022 can include a different number (e.g., 2, 3, 4, etc.) of second bosses 2906. Each one of the third bosses 2908 of the chassis 1022 is configured to receive a corresponding one of the fourth fasteners 1034 of the temperature probe hub 100, as further described below. In the illustrated example of FIGS. 28-33, the chassis 1022 includes four third bosses 2908. In other examples, the chassis 1022 can include a different number (e.g., 2, 6, 8, etc.) of third bosses 2908.

Figure 34:
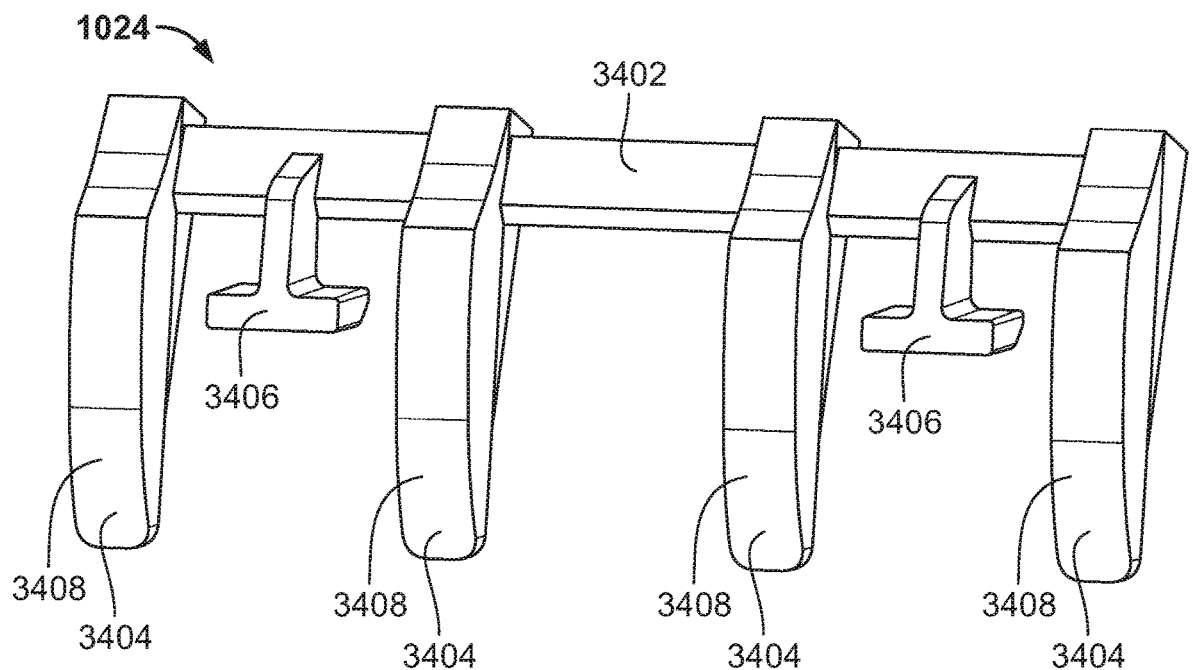
FIG. 34 is a first perspective view of the light pipe of FIG. 10.
Figure 35:
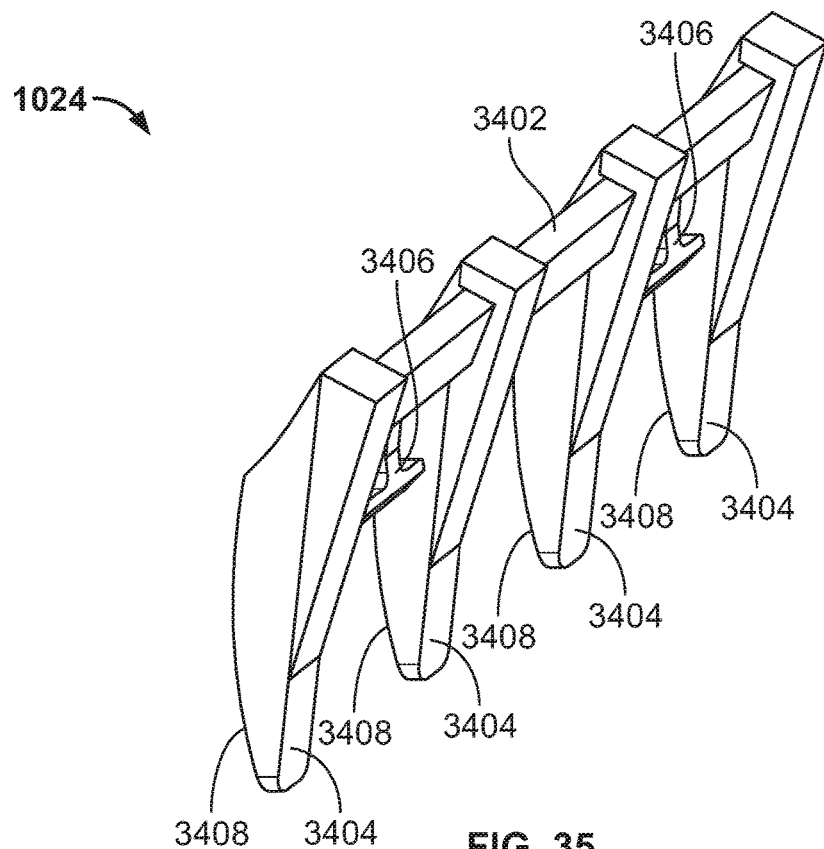
FIG. 35 is a second perspective view of the light pipe of FIGS. 10 and 34.

FIGS. 34 and 35 further illustrate the light pipe 1024 of FIG. 10. More specifically, FIG. 34 is a first perspective view of the light pipe 1024 of FIG. 10. FIG. 35 is a second perspective view of the light pipe 1024 of FIGS. 10 and 34. The light pipe 1024 includes an example base 3402, example legs 3404 extending from the base 3402, and example arms 3406 extending from the base 3402. The legs 3404 of the light pipe 1024 correspond in number and spatial distribution to the LEDs 2406 of the probe jack board 1016, as described above. The legs 3404 of the light pipe 1024 are configured to align with the LEDs 2406 of the probe jack board 1016 to transfer and/or project light produced by the LEDs 2406. Light transferred to and/or projected to the legs 3404 of the light pipe 1024 is projected and/or displayed at the second display region 124 of the cap 104 of the temperature probe hub 100.

The light pipe 1024 is configured to be positioned and/or located within the chassis 1022 such that an example contoured face 3408 of each leg 3404 of the light pipe 1024 projects outwardly from the chassis 1022 of the temperature probe hub 100 in a direction toward the third PSA layer 1026 and/or the cap 104 of the temperature probe hub 100. Each of the legs 3404 of the light pipe 1024 is configured to be positioned and/or located in a corresponding one of the light pipe leg openings 2812 of the chassis 1022, and each of the arms 3406 of the light pipe 1024 is configured to be positioned and/or located in a corresponding one of the light pipe arm openings 2814 of the chassis 1022.

Figure 36:
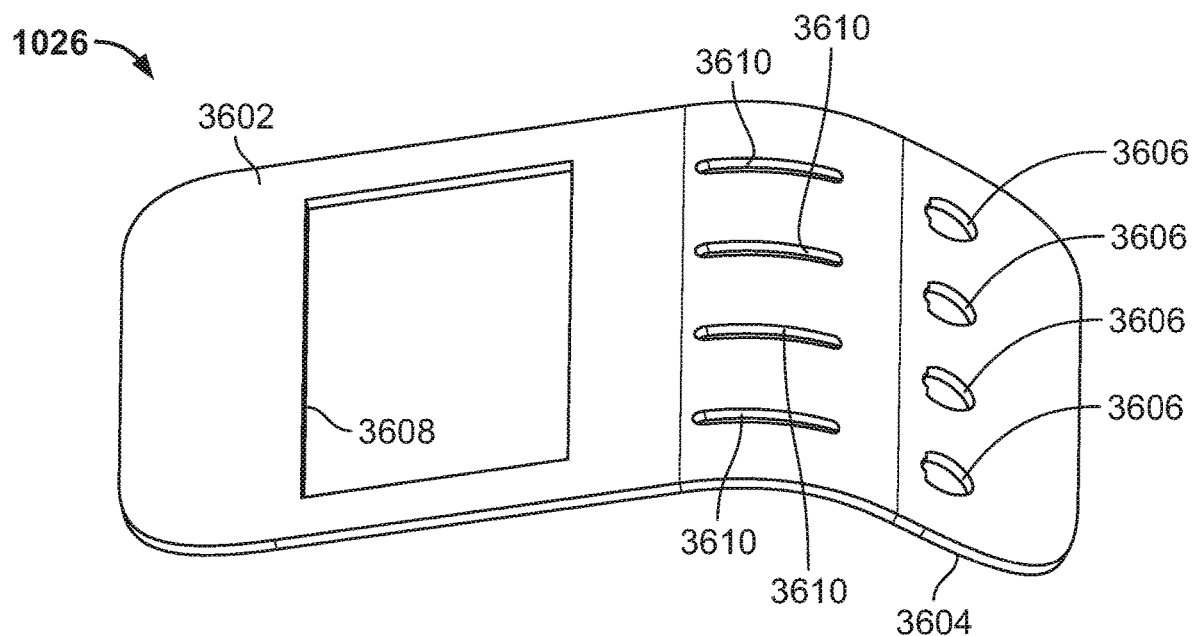
FIG. 36 is a first perspective view of the third PSA layer of FIG. 10.
Figure 37:
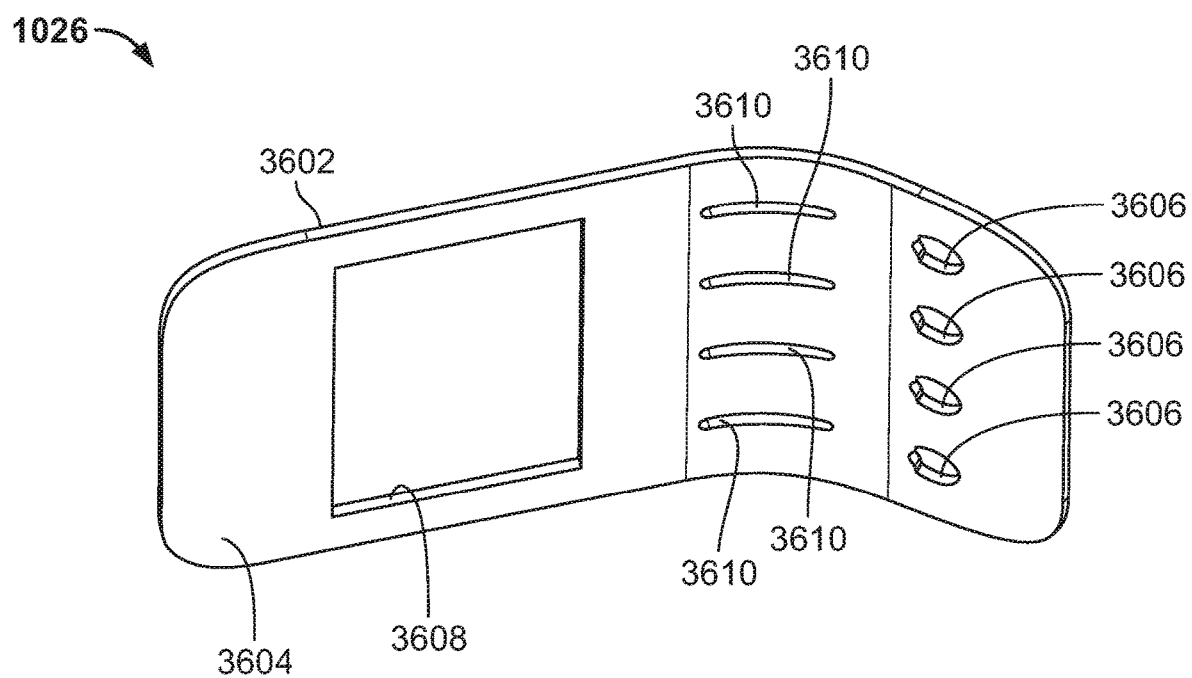
FIG. 37 is a second perspective view of the third PSA layer of FIGS. 10 and 36.

FIGS. 36 and 37 further illustrate the third PSA layer 1026 of FIG. 10. More specifically, FIG. 36 is a first perspective view of the third PSA layer 1026 of FIG. 10. FIG. 37 is a second perspective view of the third PSA layer 1026 of FIGS. 10 and 36. The third PSA layer 1026 includes an example first (e.g., upper) surface 3602, an example second (e.g., lower) surface 3604 located opposite the first surface 3602, example drain inlet openings 3606 (e.g., through holes) extending through the third PSA layer 1026 from the first surface 3602 to the second surface 3604, an example display opening 3608 (e.g., a through hole) extending through the third PSA layer 1026 from the first surface 3602 to the second surface 3604, and example light pipe leg openings 3610 (e.g., through holes) extending through the third PSA layer 1026 from the first surface 3602 to the second surface 3604. The first surface 3602 and the second surface 3604 of the third PSA layer 1026 are coated with PSA that facilitates coupling and/or connecting (e.g., bonding) the first surface 3602 and the second surface 3604 of the third PSA layer 1026 to one or more other structure(s) and/or component(s) of the temperature probe hub 100.

The first surface 3602 of the third PSA layer 1026 of FIGS. 10, 36 and 37 is configured to be coupled and/or connected (e.g., bonded via the PSA) to the cap 104 of the temperature probe hub 100. The second surface 3604 of the third PSA layer 1026 of FIGS. 10, 36 and 37 is configured to be coupled and/or connected (e.g., bonded via the PSA) to the chassis 1022 of the temperature probe hub 100. In some examples, the third PSA layer 1026 reduces the ability of fluid passing through the probe jack openings 116 and/or drain inlets 120 of the cap 104 of the temperature probe hub 100 from leaking into other internal areas, regions and/or portions of the housing 102 of the temperature probe hub 100. In some examples, the third PSA layer 1026 reduces the ability of fluid from entering the housing 102 of the temperature probe hub 100 at edge locations between the cap 104 and the base 106 of the housing 102. In some examples, the third PSA layer 1026 reduces the ability of light projecting from one of the legs 3404 of the light pipe 1024 of the temperature probe hub 100 from leaking and/or passing to other ones of the legs 3403 of the light pipe 1024.

The drain inlet openings 3606 of the third PSA layer 1026 correspond in number and spatial distribution to the drain inlet 120 of the cap 104, as described above. The drain inlet openings 3606 of the third PSA layer 1026 are configured to align with and/or to receive the probe jack openings 116 and/or the drain inlets 120 of the cap 104. For example, each one of the drain inlet openings 3606 of the third PSA layer 1026 can circumscribe a corresponding one of the probe jack openings 116 and/or drain inlets 120 of the cap 104. The display opening 3608 of the third PSA layer 1026 corresponds in spatial location to the display 1010, as described above. The display opening 3608 of the third PSA layer 1026 is configured to align with and/or to receive the display 1010. For example, the display opening 3608 of the third PSA layer 1026 can circumscribe the display 1010. The light pipe leg openings 3610 of the third PSA layer 1026 correspond in number and spatial distribution to the legs 3404 of the light pipe 1024, as described above. The light pipe leg openings 3610 of the third PSA layer 1026 are configured to align with and/or to receive the legs 3403 of the light pipe 1024. For example, each one of the light pipe leg openings 3610 of the third PSA layer 1026 can circumscribe a corresponding one of the legs 3404 of the light pipe 1024.

Figure 38:
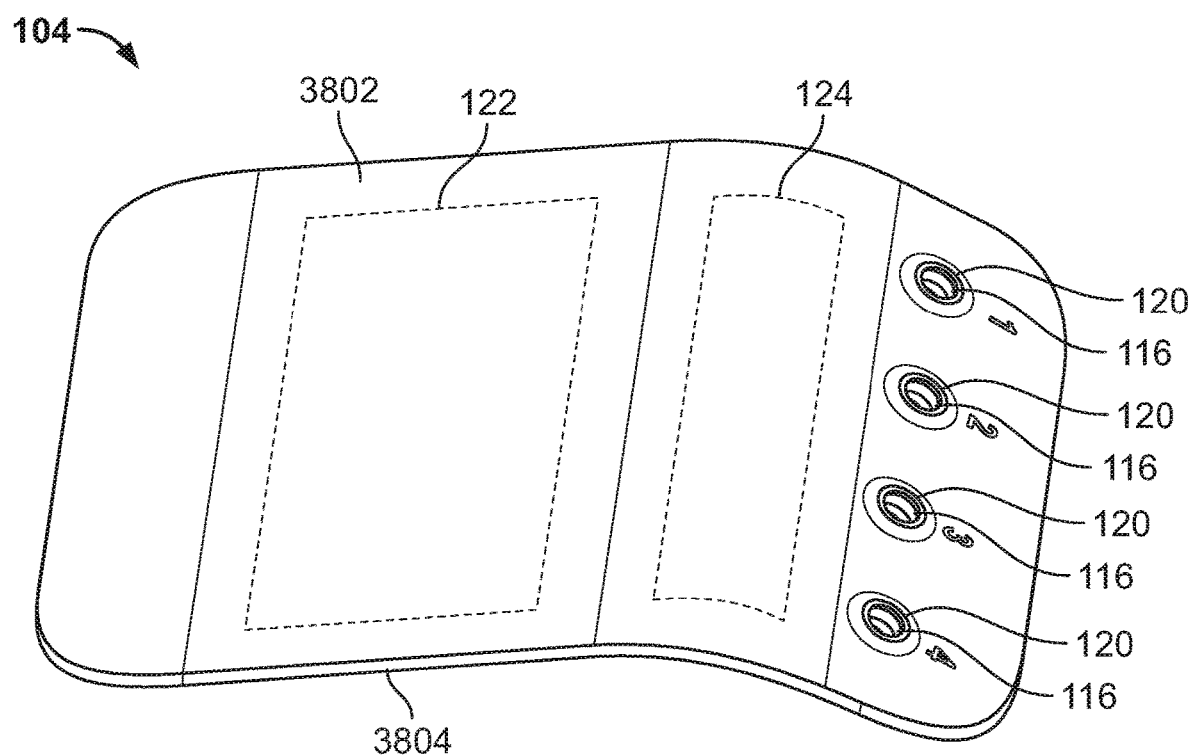
FIG. 38 is a first perspective view of the cap of FIGS. 1-10.
Figure 39:
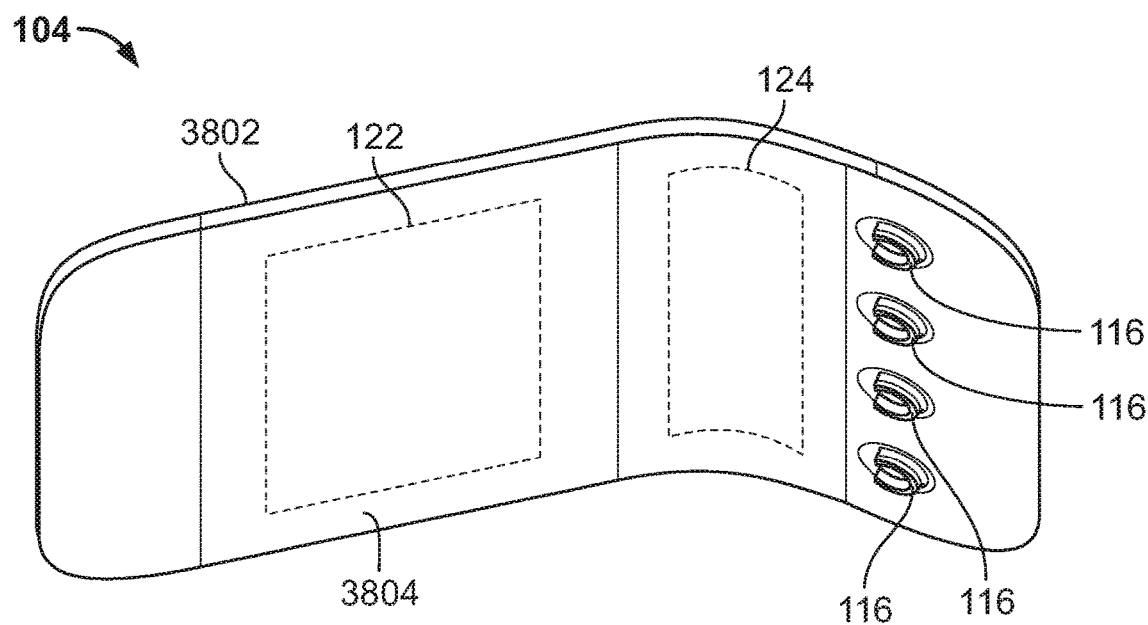
FIG. 39 is a second perspective view of the cap of FIGS. 1-10 and 39.

FIGS. 38 and 39 further illustrate the cap 104 of the temperature probe hub of FIGS. 1-10. More specifically, FIG. 38 is a first perspective view of the cap 104 of FIGS. 1-10. FIG. 39 is a second perspective view of the cap 104 of FIGS. 1-10 and 39. The cap 104 includes an example first (e.g., upper) surface 3802 and an example second (e.g., lower) surface 3804 located opposite the first surface 3802.

The cap 104 of the temperature probe hub 100 is bonded to the chassis 1022 of the temperature probe hub 100 via the third PSA layer 1026 of the temperature probe hub 100 described above. For example, the second surface 3804 of the cap 104 is bonded to the first surface 3602 of the third PSA layer 1026, and the second surface 3604 of the third PSA layer 1026 is bonded to the first surface 2802 of the chassis 1022. The cap 104 further includes the first display region 122 and the second display region 124, as described above. The first display region 122 of the cap 104 is configured to align with the display opening 3608 of the third PSA layer 1026, and/or with the display 1010. The second display region 124 of the cap is configured to align with the light pipe leg openings 3610 of the third PSA layer 1026, and/or with the legs 3404 of the light pipe 1024.

The first example fasteners 1028 of FIG. 10 are configured to fasten, couple and/or connect the display board 1012 of the temperature probe hub 100 to the chassis 1022 of the temperature probe hub 100. More specifically, each one of the first fasteners 1028 is configured to pass through a corresponding one of the fastener openings 2108 of the display board 1012 and into a corresponding one of the first bosses 2904 of the chassis 1022 to fasten, couple and/or connect the display board 1012 to the chassis 1022.

The second example fasteners 1030 of FIG. 10 are configured to fasten, couple and/or connect the probe jack board 1016 of the temperature probe hub 100 to the chassis 1022 of the temperature probe hub 100. More specifically, each one of the second fasteners 1030 is configured to pass through a corresponding one of the fastener openings 2608 of the second PSA layer 1020, through a corresponding one of the fastener openings 2414 of the probe jack board 1016, and into a corresponding one of the fastener supports 2810 of the chassis 1022 to fasten, couple and/or connect the probe jack board 1016 to the chassis 1022.

The third example fasteners 1032 of FIG. 10 are configured to fasten, couple and/or connect the main board 1006 of the temperature probe hub 100 to the chassis 1022 of the temperature probe hub 100. More specifically, each one of the third fasteners 1032 is configured to pass through a corresponding one of the fastener openings 1902 of the main board 1006 and into a corresponding one of the second bosses 2906 of the chassis 1022 to fasten, couple and/or connect the main board 1006 to the chassis 1022.

The fourth example fasteners 1034 of FIG. 10 are configured to fasten, couple and/or connect the chassis 1022 of the temperature probe hub 100 to the base 106 of the temperature probe hub 100. More specifically, each one of the fourth fasteners 1034 is configured to pass through a corresponding one of the third bosses 2908 of the chassis 1022 and into a corresponding one of the bosses 1106 of the base 106 to fasten, couple and/or connect the chassis 1022 to the base 106.

Figure 40:
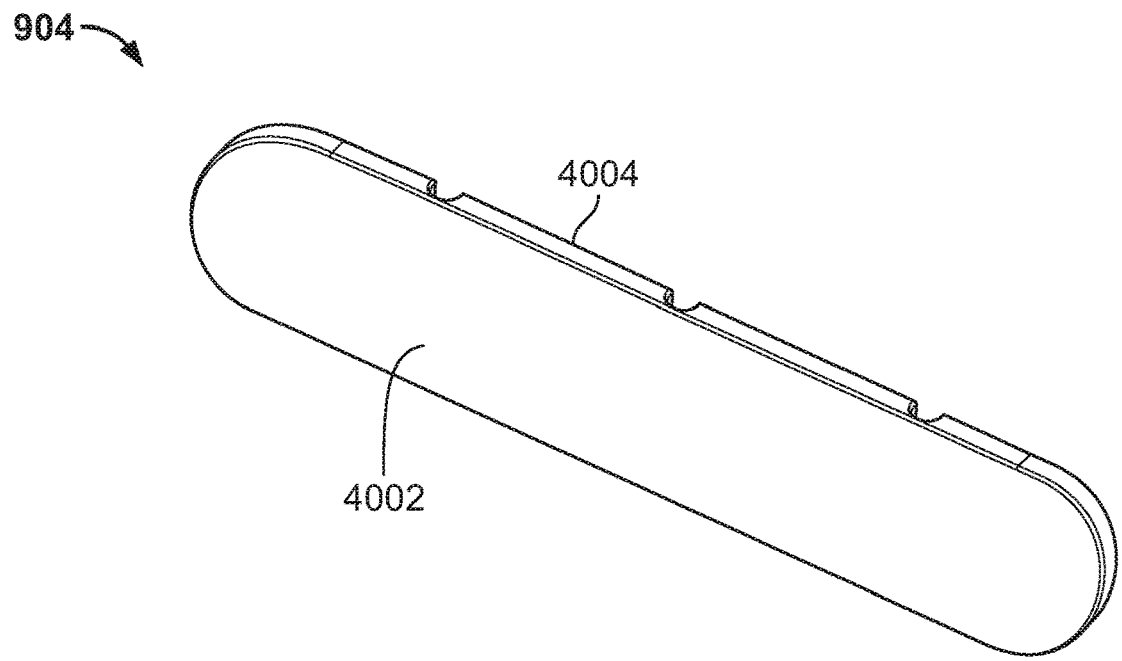
FIG. 40 is a first perspective view of the probe jack cover of FIGS. 9 and 10.
Figure 41:
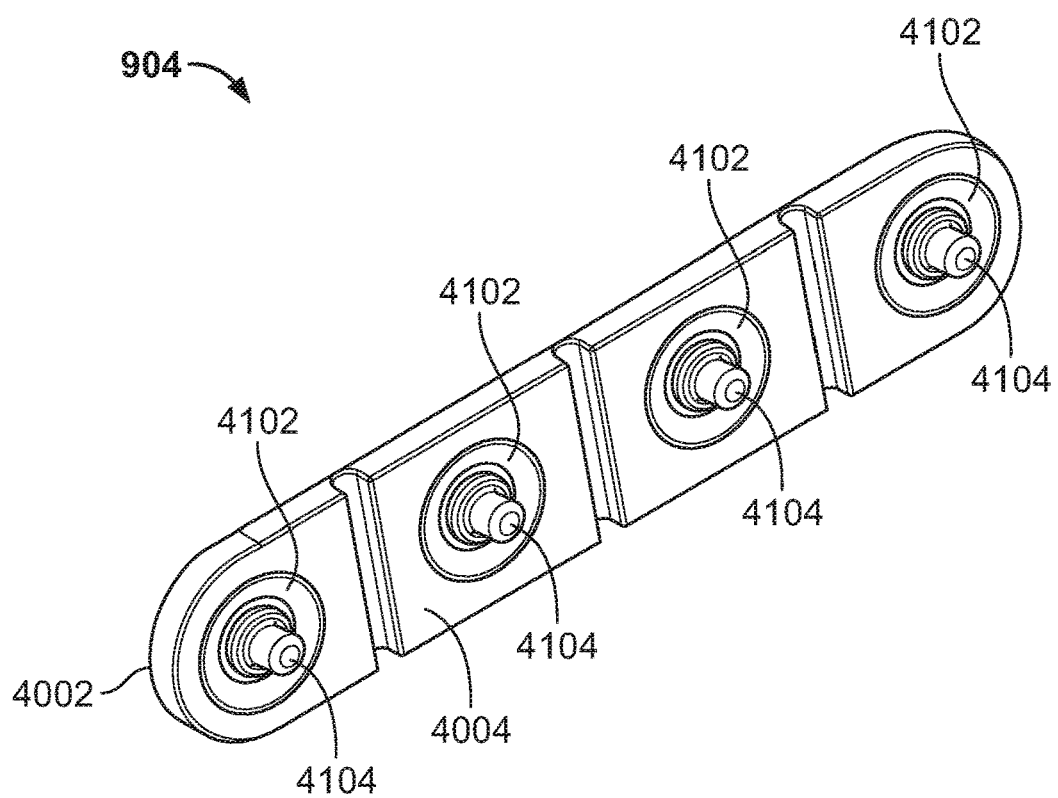
FIG. 41 is a second perspective view of the probe jack cover of FIGS. 9, 10 and 40.

FIGS. 40 and 41 further illustrate the probe jack cover 904 of FIGS. 9 and 10. More specifically, FIG. 40 is a first perspective view of the probe jack cover 904 of FIGS. 9 and 10. FIG. 41 is a second perspective view of the probe jack cover 904 of FIGS. 9, 10 and 40. The probe jack cover 904 of FIG. 9 is configured to removably cover the probe jack openings 116 and/or drain inlets 120 of the cap 104, and/or to removably cover the probe jacks 118 located within the housing 102 of the temperature probe hub 100. When the probe jack cover 904 is placed on the cap 104 of the temperature probe hub 100 over the probe jack openings 116 and/or drain inlets 120, the probe jack cover 904 restricts and/or prevents fluid (e.g., from rain, snow, a spilled beverage, etc.) received at, delivered to and/or accumulating on the cap 104 and/or the probe jack cover 904 from passing into the probe jacks 118.

The probe jack cover 904 includes an example first (e.g., upper) surface 4002 and an example second (e.g., lower) surface 4004 located opposite the first surface 4002. The probe jack cover 904 further includes example recesses 4102 formed on the second surface 4004 of the probe jack cover 904. The recesses 4102 of the probe jack cover 904 correspond in number and spatial distribution to the drain inlets 120 of the cap 104 described above. The recesses 4102 of the probe jack cover 904 are configured to align with and/or to receive the drain inlets 120 of the cap 104. The probe jack cover 904 further includes example plugs 4104 that extend outwardly from the recesses 4102 in a direction away from the second surface of the probe jack cover 904. The plugs 4104 of the probe jack cover 904 correspond in number and spatial distribution to the probe jack openings 116 and/or the probe jacks 118 described above. The plugs 4104 of the probe jack cover 904 are configured to align with and/or to plug the probe jack openings 116 and/or the probe jacks 118 to restrict and/or prevent fluid (e.g., from rain, snow, a spilled beverage, etc.) received at, delivered to and/or accumulating on the cap 104 and/or the probe jack cover 904 from passing into the probe jacks 118.

Figure 42:
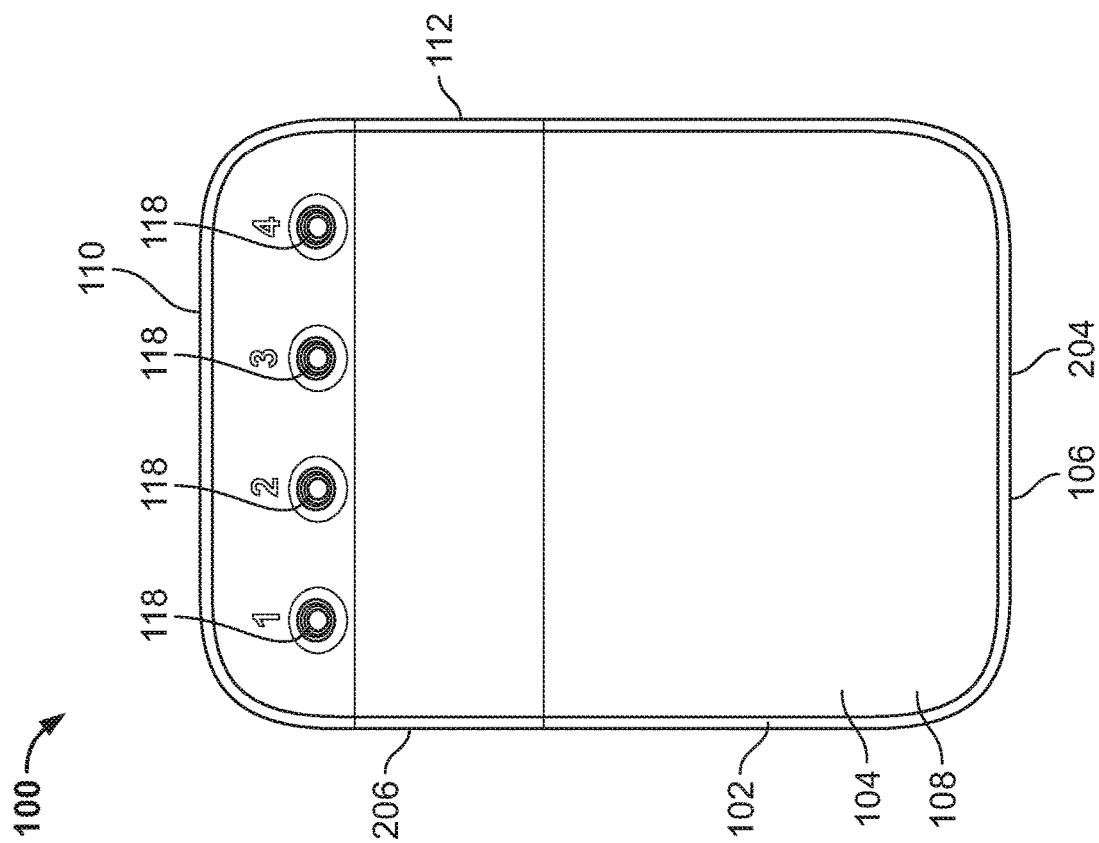
FIG. 42 is a top view of the temperature probe hub of FIGS. 1-10 with the display and the light pipe in non-illuminated states.

FIG. 42 is a top view of the temperature probe hub 100 of FIGS. 1-10 with the display 1010 and the light pipe 1024 in example non-illuminated states. More specifically, as shown in FIG. 42, none of the numeric outputs 2302, the decimal outputs 2304, the colon output 2306, the temperature unit outputs 2308, the connectivity status output 2310, and the battery status output 2312 of the display interface 2102 of the display 1010 are illuminated. As further shown in FIG. 42, none of the legs 3404 of the light pipe 1024 are illuminated. In some examples, the non-illuminated states of the display 1010 and/or the light pipe 1024 shown in FIG. 42 may occur when the temperature probe hub 100 is powered off, and/or when the temperature probe hub 100 is powered on and in a dormant (e.g., sleep) state intended to conserve battery energy.

Figure 43:
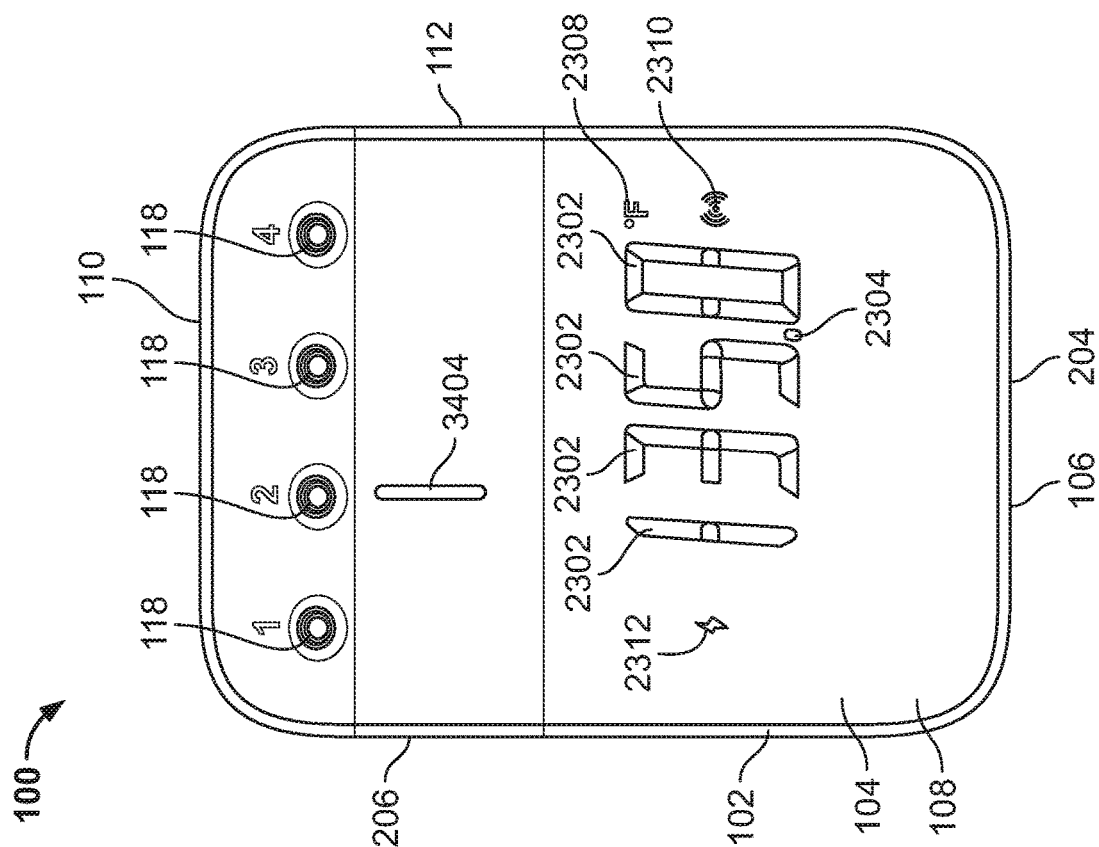
FIG. 43 is a top view of the temperature probe hub of FIGS. 1-10 and 42 with the display and the light pipe in illuminated states.
Figure 44:
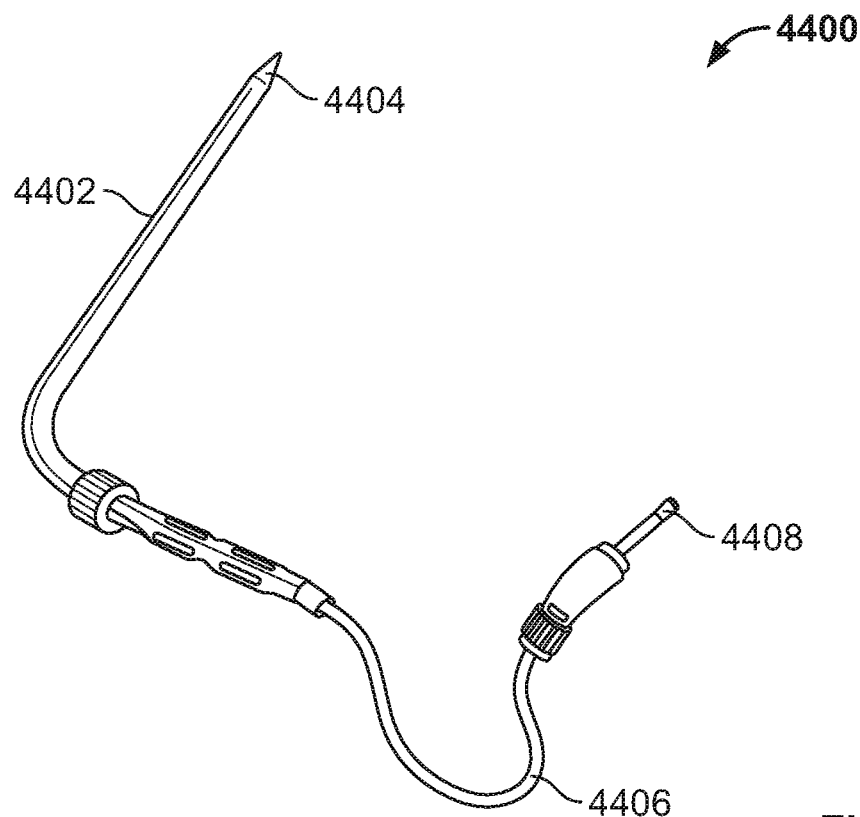
FIG. 44 is an example food temperature probe configured to be implemented with the temperature probe hub of FIGS. 1-10.

FIG. 43 is a top view of the temperature probe hub of FIGS. 1-10 and 42 with the display 1010 and the light pipe 1024 in example illuminated states. More specifically, as shown in FIG. 43, four of the numeric outputs 2302, one of the decimal outputs 2304, one of the temperature unit outputs 2308, the connectivity status output 2310, and the battery status output 2312 of the display interface 2102 of the display 1010 are illuminated. As further shown in FIG. 43, one of the legs 3404 of the light pipe 1024 is illuminated. In some examples, the illuminated states of the display 1010 and/or the light pipe 1024 shown in FIG. 43 may occur in response to a temperature probe being initially connected to the one of the probe jacks 118 that is aligned with the illuminated one of the legs 3404 of the light pipe 1024, and/or in response to a user input indicting that an output of cooking status information associated with a temperature probe that is connected to the one of the probe jacks 118 that is aligned with the illuminated one of the legs 3403 of the light pipe 1024 is to be presented and/or displayed, FIG. 44 is an example food temperature probe 4400 configured to be implemented with the temperature probe hub 100 of FIGS. 1-10. The food temperature probe 4400 of FIG. 44 includes an example probe shaft 4402 having an example free end 4404. The free end 4404 of the probe shaft 4402 has a pointed and/or spiked tip that facilitates inserting the probe shaft 4402, free end 4404 first, into an item of food (e.g., a piece of meat). The food temperature probe 4400 of FIG. 44 further includes an example probe cable 4406 connected to the probe shaft 4402, and an example jack plug 4408 that is configured to be plugged into any one of the probe jacks 118 of the temperature probe hub 100. The probe cable 4406 of the food temperature probe 4400 of FIG. 44 can be of any length. The temperature probe hub 100 of FIGS. 1-10 is configured to connect to and/or monitor multiple ones (e.g., 2, 3 or 4) of the food temperature probe 4400 of FIG. 44 at any given time.

Figure 45:
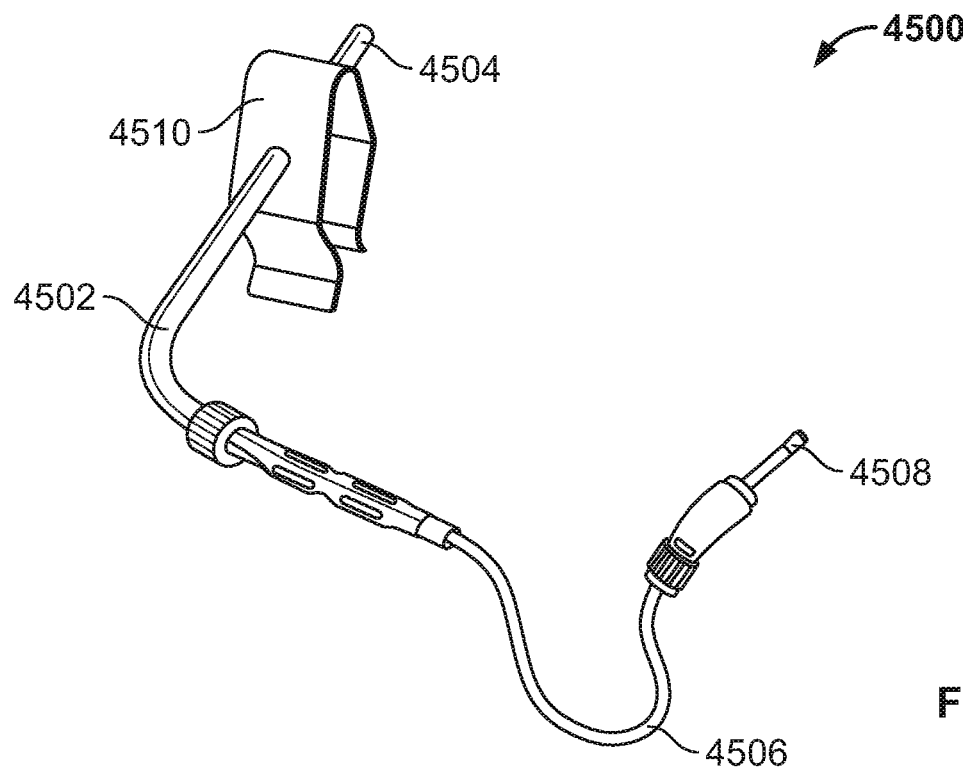
FIG. 45 is an example ambient temperature probe configured to be implemented with the temperature probe hub of FIGS. 1-10.

FIG. 45 is an example ambient temperature probe 4500 configured to be implemented with the temperature probe hub 100 of FIGS. 1-10. The ambient temperature probe 4500 of FIG. 45 includes an example probe shaft 4502 having an example free end 4504. The free end 4504 of the probe shaft 4502 has a rounded tip that is not intended for insertion into an item of food. The ambient temperature probe 4500 of FIG. 45 further includes an example probe cable 4506 connected to the probe shaft 4502, and an example jack plug 4508 that is configured to be plugged into any one of the probe jacks 118 of the temperature probe hub 100. The probe cable 4506 of the ambient temperature probe 4500 of FIG. 45 can be of any length. The ambient temperature probe 4500 of FIG. 45 further includes an example clip 4510 connected to the probe shaft 4502, with the clip 4510 being configured to be connected to a grate and/or rack of a cooking device (e.g., a grill, an oven, etc.) to fix the position of the probe shaft 4502 within a cooking chamber of the cooking device. The temperature probe hub 100 of FIGS. 1-10 is configured to connect to and/or monitor the ambient temperature probe 4500 of FIG. 45 concurrently with one or more (e.g., 1, 2 or 3) of the food temperature probe 4400 of FIG. 44.

In some examples, the temperature probe hub 100 is configured to determine a remaining cooking time for an item of food connected to the food temperature probe 4400 of FIG. 44 by comparing food temperature data obtained from the food temperature probe 4400 of FIG. 44 connected to the temperature probe hub 100 with ambient temperature data (e.g., cooking chamber temperature data) obtained from the ambient temperature probe 4500 of FIG. 45 connected to the temperature probe hub 100. The calculated remaining cooking time of the item of food can subsequently be presented and/or displayed via the display interface 2102 of the display 1010 of the temperature probe hub 100.

Figure 46:
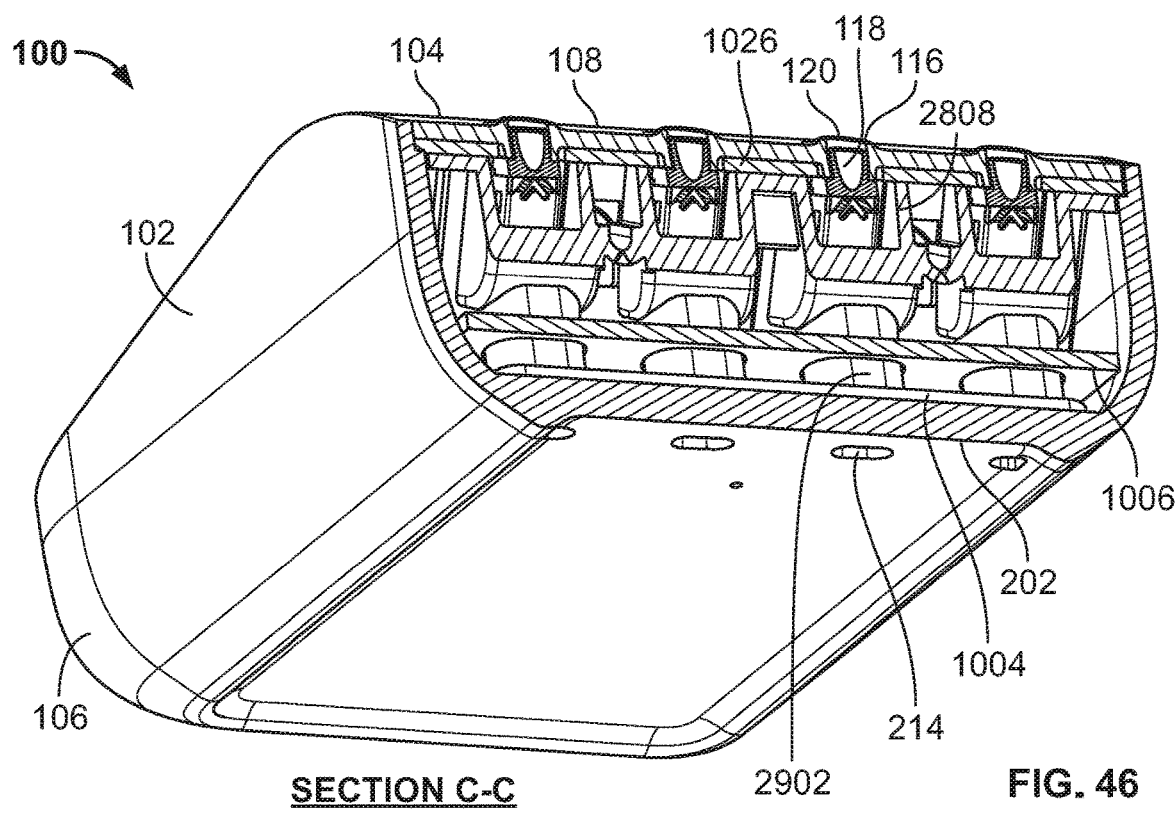
FIG. 46 is a perspective cross-sectional view of the temperature probe hub of FIGS. 1-10 taken along section C-C of FIG. 3.
Figure 47:
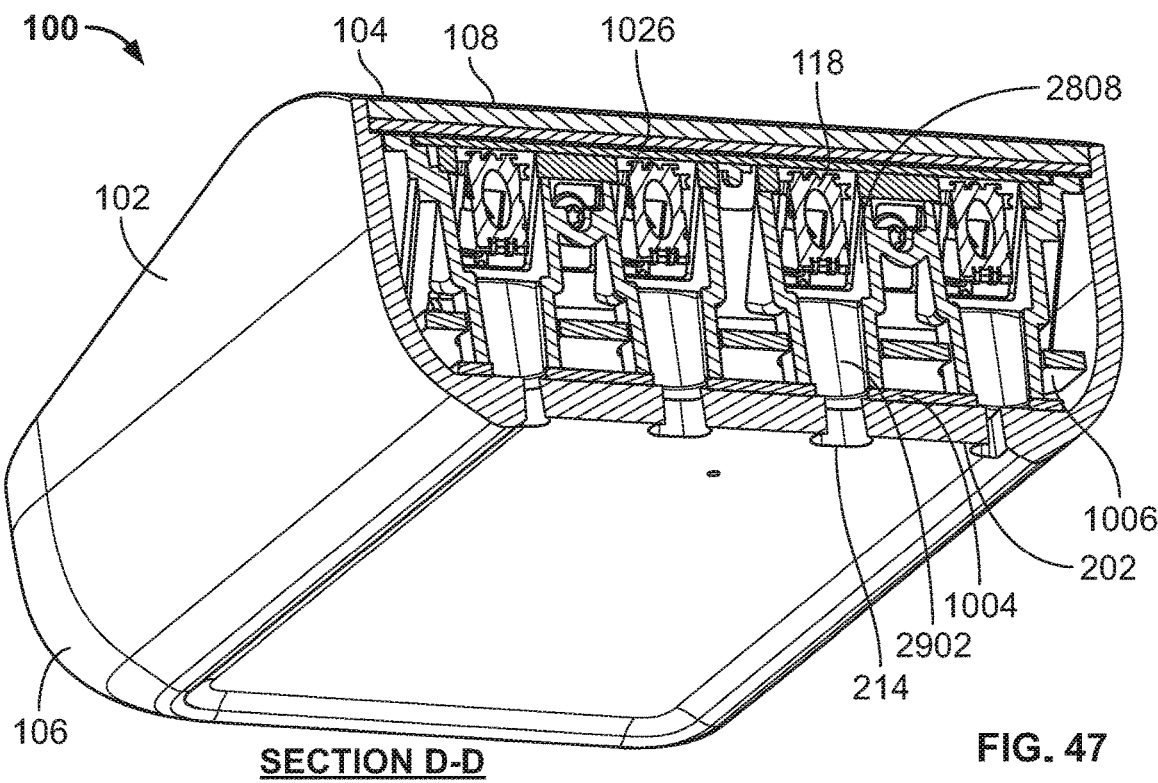
FIG. 47 is a perspective cross-sectional view of the temperature probe hub of FIGS. 1-10 and 46 taken along section D-D of FIG. 3.
Figure 48:
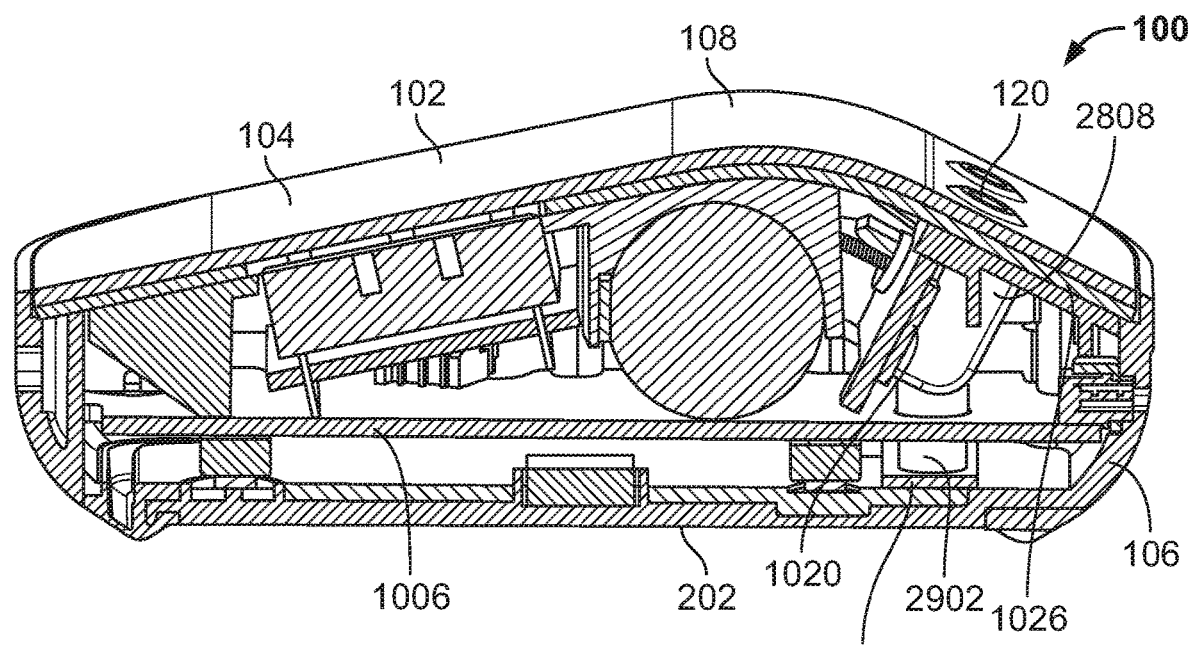
FIG. 48 is a first perspective cross-sectional view of the temperature probe hub of FIGS. 1-10, 46 and 47 taken along section E-E of FIG. 3.
Figure 49:
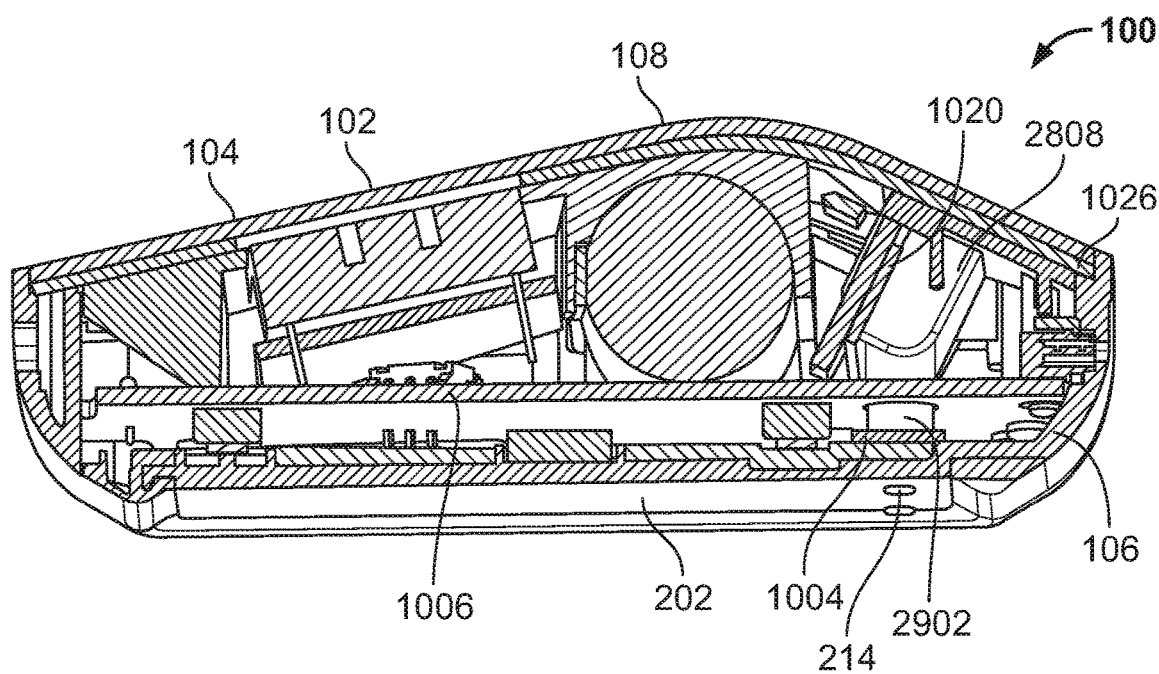
FIG. 49 is a second perspective cross-sectional view of the temperature probe hub of FIGS. 1-10 and 46-48 taken along section E-E of FIG. 3.
Figure 50:
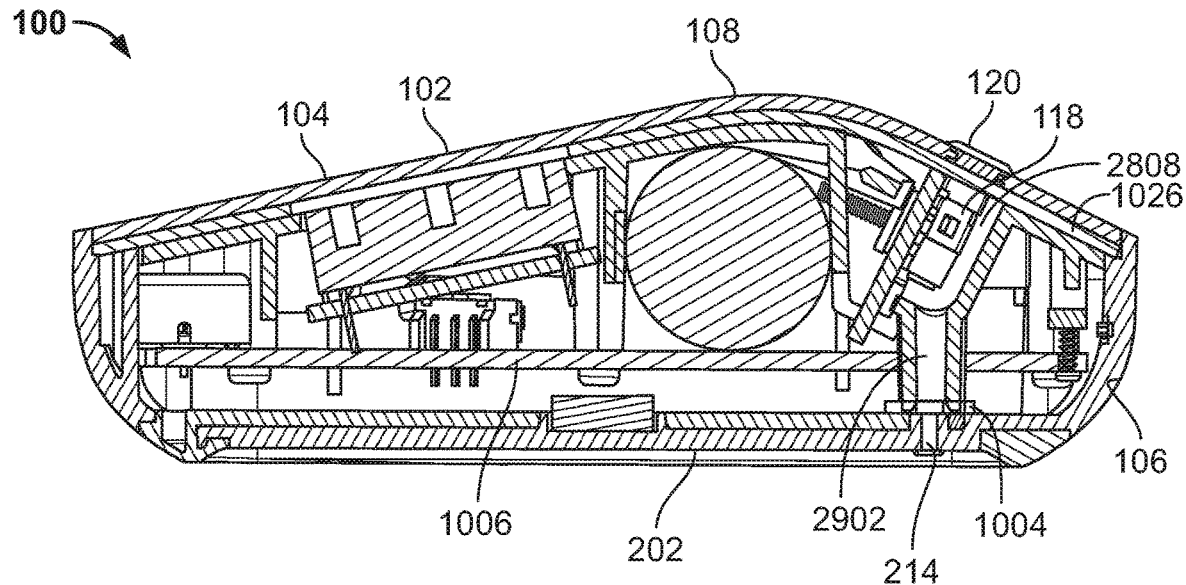
FIG. 50 is a cross-sectional view of the temperature probe hub of FIGS. 1-10 and 46-49 taken along section F-F of FIG. 3.
Figure 51:
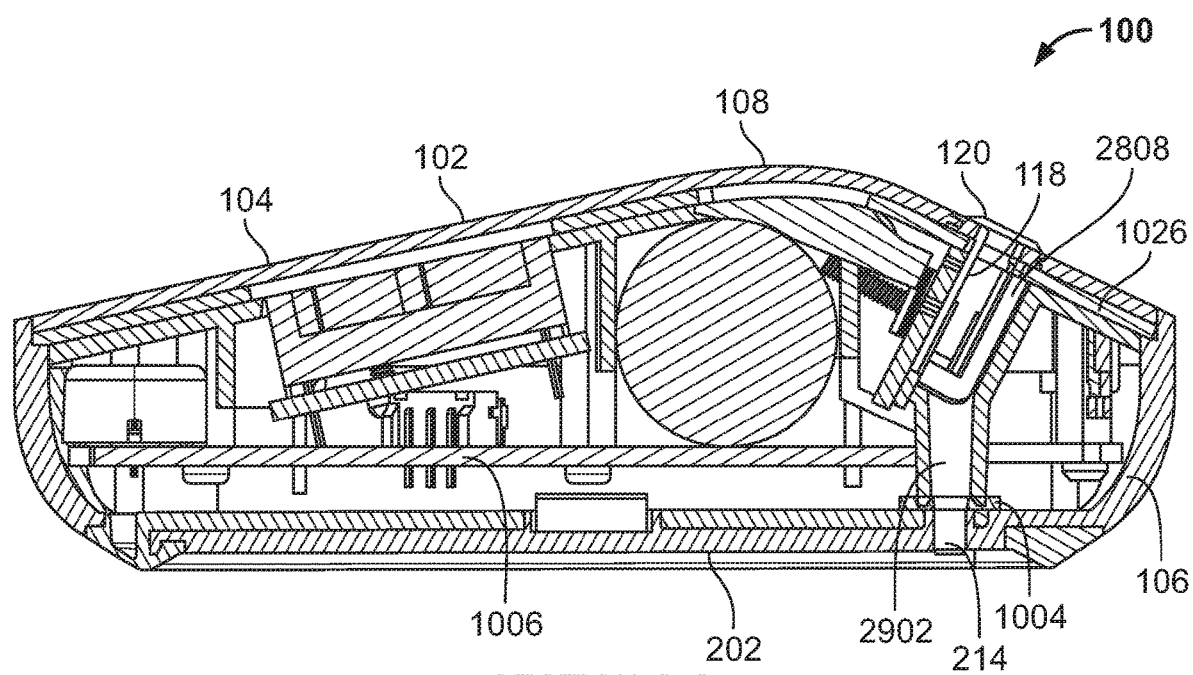
FIG. 51 is a cross-sectional view of the temperature probe hub of FIGS. 1-10 and 46-50 taken along section G-G of FIG. 3.

FIGS. 46-51 further illustrate example drains of the temperature probe hub 100 of FIGS. 1-10. FIG. 46 is a perspective cross-sectional view of the temperature probe hub 100 of FIGS. 1-10 taken along section C-C of FIG. 3. FIG. 47 is a perspective cross-sectional view of the temperature probe hub 100 of FIGS. 1-10 and 46 taken along section D-D of FIG. 3. FIG. 48 is a first perspective cross-sectional view of the temperature probe hub 100 of FIGS. 1-10, 46 and 47 taken along section E-E of FIG. 3. FIG. 49 is a second perspective cross-sectional view of the temperature probe hub 100 of FIGS. 1-10 and 46-48 taken along section E-E of FIG. 3. FIG. 50 is a cross-sectional view of the temperature probe hub 100 of FIGS. 1-10 and 46-49 taken along section F-F of FIG. 3. FIG. 51 is a cross-sectional view of the temperature probe hub 100 of FIGS. 1-10 and 46-50 taken along section G-G of FIG. 3.

In the illustrated example of FIGS. 46-51 the temperature probe hub 100 includes four drains extending through the housing 102 of the temperature probe hub 100. In other examples, the temperature probe hub 100 can includes a different number (e.g., 1, 2, 3, 5, etc.) of drains extending through the housing 102 of the temperature probe hub. Each drain of the temperature probe hub 100 includes a probe jack opening 116 and/or drain inlet 120, a probe jack receptacle 2808 aligned with and/or in fluid communication with the probe jack opening 116 and/or drain inlet 120, a drain pipe 2902 aligned with and/or in fluid communication with the probe jack receptacle 2808, and a drain outlet 214 aligned with and/or in fluid communication with the drain pipe 2902. A probe jack 118 is positioned and/or located within the probe jack receptacle 2808 of the drain, and is in fluid communication therewith. In the illustrated example of FIGS. 46-51, fluid (e.g., from rain, snow, a spilled beverage, etc.) received at a probe jack opening 116 and/or drain inlet 120 of a drain of the temperature probe hub 100 travels through the drain inlet 120 to a probe jack receptacle 2808 of the drain and/or a probe jack 118 located within the probe jack receptacle 2808 of the drain, through the probe jack 118 and/or the probe jack receptacle 2808 to a drain pipe 2902 of the drain, through the drain pipe 2902 to a drain outlet 214 of the drain, and from the drain outlet 214 out of the temperature probe hub 100.

In some examples the probe jack opening 116 and/or drain inlet 120 of the drain is formed by and/or within the cap 104 of the temperature probe hub 100, the probe jack receptacle 2808 of the drain is formed by and/or within the chassis 1022 of the temperature probe hub 100, the drain pipe 2902 of the drain is formed by and/or within the chassis 1022 of the temperature probe hub 100, and the drain outlet 214 of the drain is formed by and/or within the base 106 of the temperature probe hub 100. In some examples, the probe jack opening 116 and/or drain inlet 120 of the drain extends through the third PSA layer 1026 of the temperature probe hub 100 such that a drain inlet opening of the third PSA layer 1026 (e.g., one of the drain inlet openings 3606 described above) circumscribes the probe jack opening 116 and/or drain inlet 120, and/or, more generally, circumscribes the drain. In some examples, the drain pipe 2902 of the drain extends through the main board 1006 of the temperature probe hub 100 such that a drain pipe opening of the main board 1006 (e.g., one of the drain pipe openings 1706 described above) circumscribes the drain pipe 2902, and/or, more generally, circumscribes the drain. In some examples, the drain pipe 2902 of the drain extends through the first PSA layer 1004 of the temperature probe hub 100 such that a drain pipe opening of the first PSA layer 1004 (e.g., one of the drain pipe openings 1606 described above) circumscribes the drain pipe 2902, and/or, more generally, circumscribes the drain.

Figure 52:
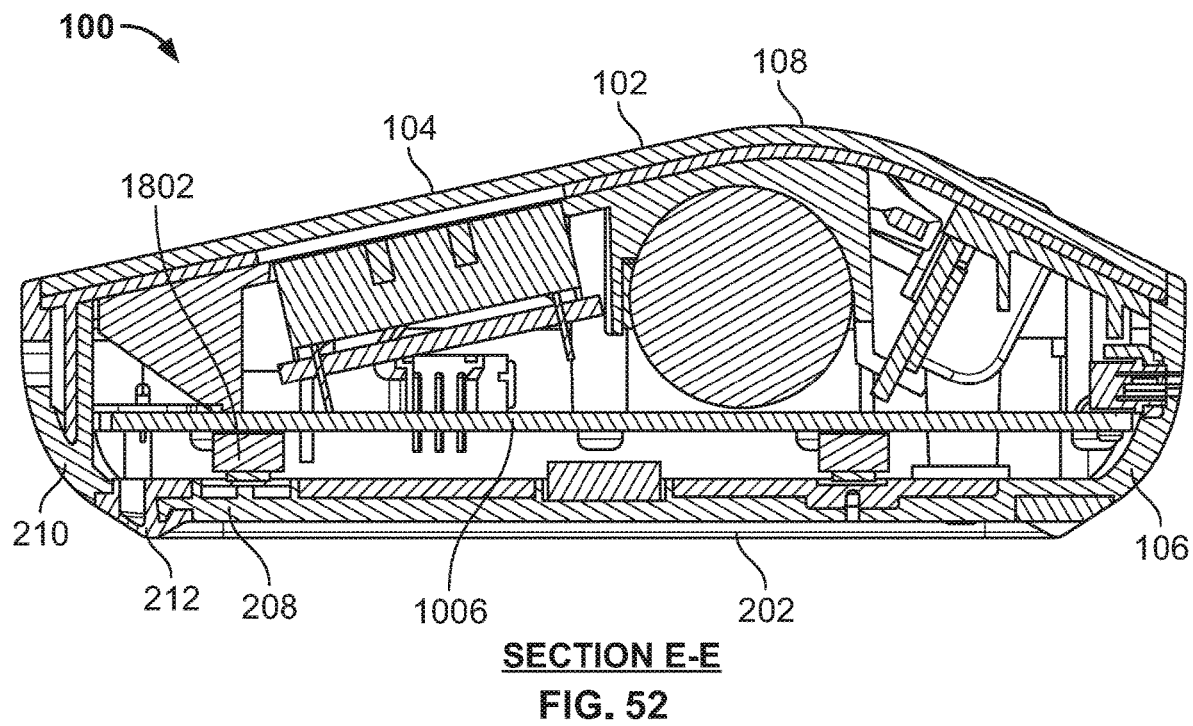
FIG. 52 is a cross-sectional view of the temperature probe hub of FIGS. 1-10 taken along section E-E of FIG. 3 showing the filler of the base in an uncompressed state.
Figure 53:
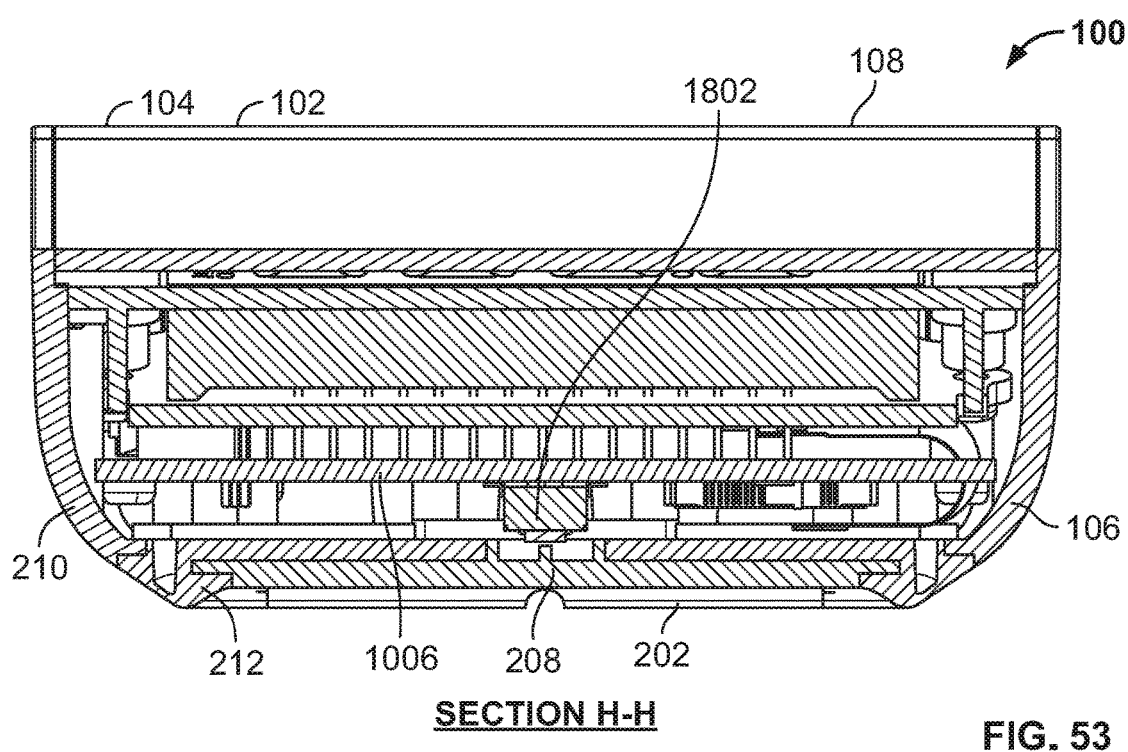
FIG. 53 is a cross-sectional view of the temperature probe hub of FIGS. 1-10 and 52 taken along section H-H of FIG. 3 showing the filler of the base in an uncompressed state.
Figure 54:
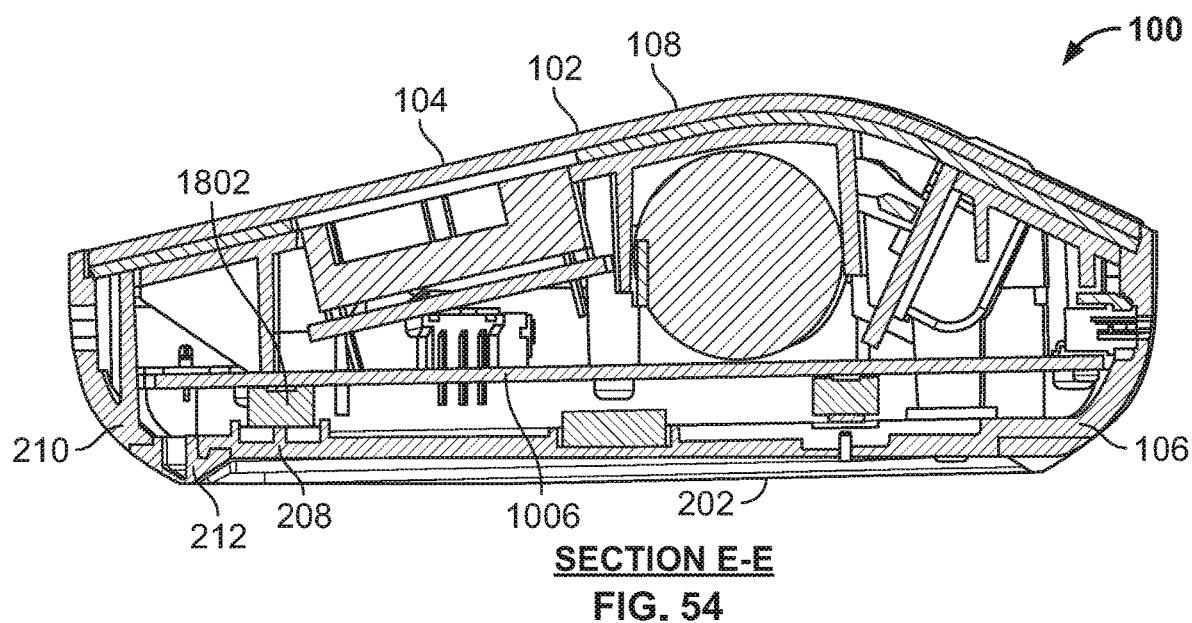
FIG. 54 is a cross-sectional view of the temperature probe hub of FIGS. 1-10, 52 and 53 taken along section E-E of FIG. 3 showing the filler of the base in a compressed state.
Figure 55:
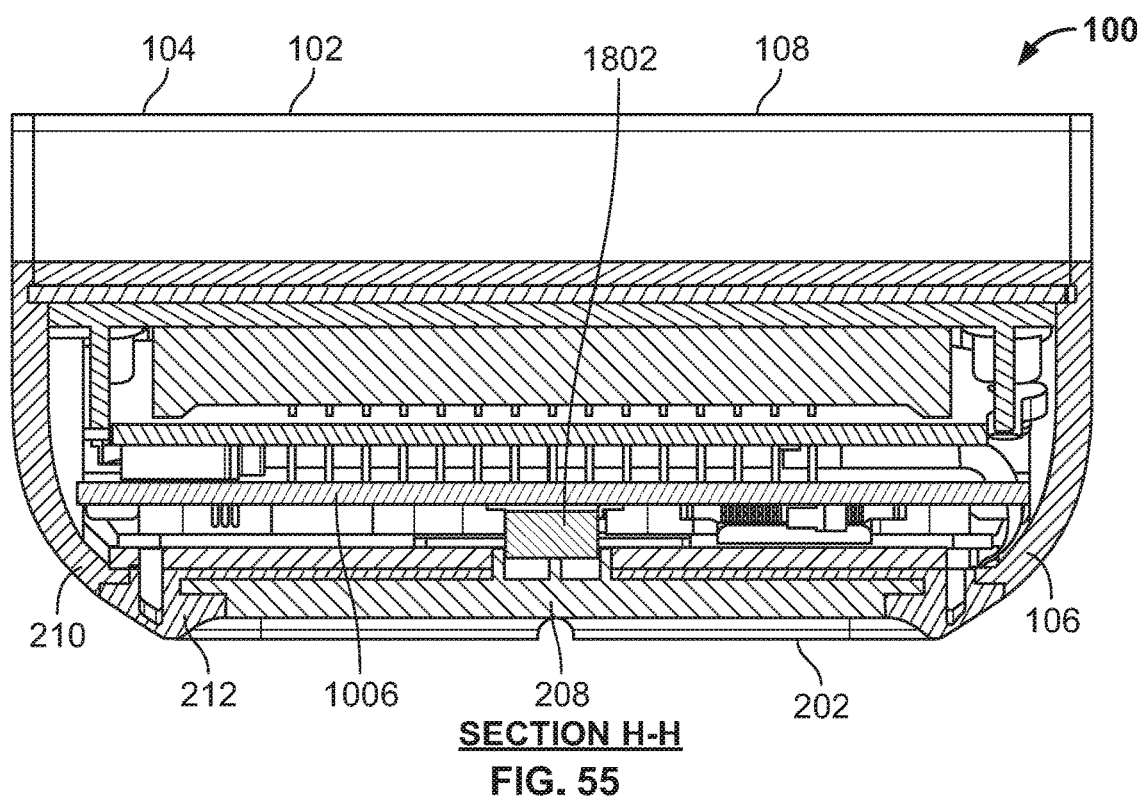
FIG. 55 is a cross-sectional view of the temperature probe hub of FIGS. 1-10 and 52-54 taken along section H-H of FIG. 3 showing the filler of the base in a compressed state.

FIGS. 52-55 further illustrate movement of the filler 212 of the temperature probe hub 100 of FIGS. 1-10 between an uncompressed state and a compressed state. FIG. 52 is a cross-sectional view of the temperature probe hub 100 of FIGS. 1-10 taken along section E-E of FIG. 3 showing the filler 212 in an uncompressed state. FIG. 53 is a cross-sectional view of the temperature probe hub 100 of FIGS. 1-10 and 52 taken along section H-H of FIG. 3 showing the filler 212 in an uncompressed state. FIG. 54 is a cross-sectional view of the temperature probe hub 100 of FIGS. 1-10, 52 and 53 taken along section E-E of FIG. 3 showing the filler 212 in a compressed state. FIG. 55 is a cross-sectional view of the temperature probe hub 100 of FIGS. 1-10 and 52-54 taken along section H-H of FIG. 3 showing the filler 212 in a compressed state.

When the filler 212 of the temperature probe hub 100 is in the uncompressed state shown in FIGS. 52 and 53, the central portion 208 of the base 106 of the housing 102 of the temperature probe hub 100 fails to contact, compress and/or actuate the control button 1802 mounted and/or connected to the lower surface of the main board 1006 of the temperature probe hub 100. The filler 212 of the temperature probe hub 100 transitions from the uncompressed state shown in FIGS. 52 and 53 to the compressed state shown in FIGS. 54 and 55 in response to a force applied in a direction moving from the upper wall 108 of the housing 102 toward the lower wall 202 of the housing 102) to the cap 104 and/or the upper wall 108 of the housing 102. More specifically, as shown in FIGS. 54 and 55, the filler 212 moves and/or flexes the central portion 208 of the base 106 in a first direction (e.g., in a direction moving from the lower wall 202 of the housing 102 toward the upper wall 108 of the housing 102) in response to a force applied in a second direction opposite the first direction (e.g., in a direction moving from the upper wall 108 of the housing 102 toward the lower wall 202 of the housing 102) to the cap 104 and/or the upper wall 108 of the housing 102. The above-described movement and/or flexure of the central portion 208 of the base 106 causes the central portion 208 of the base 106 to contact, compress and/or actuate the control button 1802 mounted and/or connected to the lower surface of the main board 1006 of the temperature probe hub 100, as shown in FIGS. 54 and 55.

In some examples, contacting, compressing and/or actuating the control button 1802 via the central portion 208 of the base 106 (e.g., as shown in FIGS. 54 and 55) for a first period of time causes the temperature probe hub 100 (including the light-emitting and/or light projecting devices thereof) to power on. For example, contacting, compressing and/or actuating the control button 1802 via the central portion 208 of the base 106 for a period of time greater than three seconds while the temperature probe hub 100 (including the light-emitting and/or light projecting devices thereof) is powered off may cause the temperature probe hub 100 (including the light-emitting and/or light projecting devices thereof) to be powered on.

In some examples, contacting, compressing and/or actuating the control button 1802 via the central portion 208 of the base 106 for a second period of time different from the first period of time causes the above-described light-emitting and/or light projecting devices of the temperature probe hub 100 to present data and/or information associated with a different one of the probe jacks 118 of the temperature probe hub 100. For example, contacting, compressing and/or actuating the control button 1802 via the central portion 208 of the base 106 for a period of time less than three seconds while the light-emitting and/or light projecting devices of the temperature probe hub 100 are presenting data and/or information associated with a first one of the probe jacks 118 having a first probe operatively coupled thereto may cause the light-emitting and/or light projecting devices of the temperature probe hub 100 to present data and/or information associated with a second one of the probe jacks 118 having a second probe operatively coupled thereto.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A temperature probe hub, comprising:
 a housing including a cap and a base, the cap coupled to the base, the cap forming an upper wall of the housing, the base forming a lower wall of the housing located opposite and spaced apart from the upper wall, the base having a central portion, a peripheral portion bounding the central portion, and a filler extending between the central portion and the peripheral portion, the filler forming a portion of the lower wall that extends downwardly from the central portion and the peripheral portion such that the filler is to contact a surface of an object onto which the lower wall of the base is to be positioned, the filler configured to move the central portion upwardly relative to the peripheral portion in response to a downward compressive force applied to the cap while the filler is in contact with the surface of the object; and a control button located within the housing between the upper wall and the lower wall, the control button configured to be actuated in response to upward movement of the central portion of the housing relative to the peripheral portion of the housing.

2. The temperature probe hub of claim 1, wherein the filler is flexible.

3. The temperature probe hub of claim 1, wherein the filler flexibly couples the central portion to the peripheral portion.

4. The temperature probe hub of claim 1, wherein the filler includes an open channel configured to facilitate flexing of the filler.

5. The temperature probe hub of claim 1, wherein the central portion is partially separated from the peripheral portion by a gap, and wherein the filler extends across the gap.

6. The temperature probe hub of claim 5, wherein the filler conceals the gap from being externally viewable.

7. The temperature probe hub of claim 5, wherein the gap is formed along a total of three edges of the central portion.

8. The temperature probe hub of claim 1, wherein the filler is coupled to the central portion via a tongue-and-groove connection.

9. The temperature probe hub of claim 1, wherein the filler is coupled to the peripheral portion via a notch.

10. The temperature probe hub of claim 1, further comprising a display located within the housing and viewable through the cap, wherein the display is configured to perform a control operation in response to actuation of the control button.

11. The temperature probe hub of claim 10, wherein the control operation includes powering on or powering off the display.

12. The temperature probe hub of claim 10, wherein the control operation includes presenting information associated with a specific probe jack from among a plurality of probe jacks of the temperature probe hub.

13. The temperature probe hub of claim 1, further comprising a main board located within the housing, wherein the control button is mounted on the main board.

14. A temperature probe hub, comprising:
a housing including a cap and a base, the cap coupled to the base, the cap forming an upper wall of the housing, the base forming a lower wall of the housing located opposite and spaced apart from the upper wall, the base having a central portion, a peripheral portion bounding the central portion, and a flexible filler extending between the central portion and the peripheral portion, the flexible filler forming a portion of the lower wall that extends downwardly from the central portion and the peripheral portion such that the flexible filler is to contact a surface of an object onto which the lower wall of the base is to be positioned, the flexible filler configured to move the central portion upwardly relative to the peripheral portion in response to a downward compressive force applied to the cap while the flexible filler is in contact with the surface of the object, the flexible filler to transition from an uncompressed state into a compressed state in response to the downward compressive force; and a control button located within the housing between the upper wall and the lower wall, the control button configured to be actuated when the flexible filler is in the compressed state and not actuated when the flexible filler is in the uncompressed state.

15. The temperature probe hub of claim 14, wherein the flexible filler includes an open channel configured to facilitate flexing of the flexible filler.

16. The temperature probe hub of claim 14, wherein the central portion is partially separated from the peripheral portion by a gap, the flexible filler extending across the gap such that the flexible filler conceals the gap from being externally viewable.

17. The temperature probe hub of claim 16, wherein the gap is formed along a total of three edges of the central portion.

18. The temperature probe hub of claim 14, wherein the flexible filler is coupled to the central portion via a tongue-and-groove connection, and wherein the flexible filler is coupled to the peripheral portion via a notch.

19. The temperature probe hub of claim 14, further comprising a display located within the housing and viewable through the cap, wherein the display is configured to perform a control operation in response to actuation of the control button.

20. The temperature probe hub of claim 19, wherein the control operation includes powering on or powering off the display.

21. The temperature probe hub of claim 19, wherein the control operation includes presenting information associated with a specific probe jack from among a plurality of probe jacks of the temperature probe hub.

22. The temperature probe hub of claim 14, further comprising a main board located within the housing, wherein the control button is mounted on the main board.

* * * * *